United States Patent
Underkoffler et al.

(10) Patent No.: US 9,779,131 B2
(45) Date of Patent: *Oct. 3, 2017

(54) DETECTING, REPRESENTING, AND INTERPRETING THREE-SPACE INPUT: GESTURAL CONTINUUM SUBSUMING FREESPACE, PROXIMAL, AND SURFACE-CONTACT MODES

(71) Applicant: Oblong Industries, Inc., Los Angeles, CA (US)

(72) Inventors: John S. Underkoffler, Los Angeles, CA (US); Kwindla Hultman Kramer, Los Angeles, CA (US)

(73) Assignee: Oblong Industries, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/276,093

(22) Filed: May 13, 2014

(65) Prior Publication Data

US 2015/0100593 A1 Apr. 9, 2015

Related U.S. Application Data

(63) Continuation of application No. 12/773,667, filed on May 4, 2010, now Pat. No. 8,723,795, and a
(Continued)

(51) Int. Cl.
*G09G 5/08* (2006.01)
*G06F 17/30* (2006.01)
(Continued)

(52) U.S. Cl.
CPC ........ *G06F 17/30412* (2013.01); *G06F 3/017* (2013.01); *G06F 17/2705* (2013.01)

(58) Field of Classification Search
CPC ........ G06F 3/017; G06F 3/033; G06F 3/0325; G06K 2009/3225; G06K 9/00973; G06K 9/00355; G06K 9/00375
(Continued)

(56) References Cited

U.S. PATENT DOCUMENTS 4,843,568 A 6/1989 Krueger et al.
5,454,043 A 9/1995 Freeman
(Continued)

FOREIGN PATENT DOCUMENTS

EP 1883238 B1 4/2014
WO 8909972 A1 10/1989
(Continued)

OTHER PUBLICATIONS

Addison-Wesley: "Inside Macintosh—vol. I", vol. I Chapter 1-8, Jan. 1, 1985 (Jan. 1, 1985), pp. 1-58.
(Continued)

*Primary Examiner* — Vijay Shankar
(74) *Attorney, Agent, or Firm* — Jeffrey Schox

(57) ABSTRACT

Systems and methods for detecting, representing, and interpreting three-space input are described. Embodiments of the system, in the context of an SOE, process low-level data from a plurality of sources of spatial tracking data and analyze these semantically uncorrelated spatiotemporal data and generate high-level gestural events according to dynamically configurable implicit and explicit gesture descriptions. The events produced are suitable for consumption by interactive systems, and the embodiments provide one or more mechanisms for controlling and effecting event distribution to these consumers. The embodiments further provide to the consumers of its events a facility for transforming gestural events among arbitrary spatial and semantic frames of reference.

57 Claims, 31 Drawing Sheets

Related U.S. Application Data continuation-in-part of application No. 12/572,689, filed on Oct. 2, 2009, now Pat. No. 8,866,740, and a continuation-in-part of application No. 12/109,263, filed on Apr. 24, 2008, now Pat. No. 8,407,725, and a continuation-in-part of application No. 12/553,845, filed on Sep. 3, 2009, now Pat. No. 8,531,396.

(60) Provisional application No. 61/175,374, filed on May 4, 2009.

(51) Int. Cl.
*G06F 17/27* (2006.01)
*G06F 3/01* (2006.01)

(58) Field of Classification Search
USPC ............... 345/156–178; 178/18.01–18.09, 178/20.01–20.04
See application file for complete search history.

(56) References Cited

U.S. PATENT DOCUMENTS

| | | |
|---|---|---|
| 5,581,276 A | 12/1996 | Cipolla et al. |
| 5,594,469 A | 1/1997 | Freeman et al. |
| 5,651,107 A | 7/1997 | Frank et al. |
| 5,982,352 A | 11/1999 | Pryor |
| 6,002,808 A | 12/1999 | Freeman |
| 6,043,805 A | 3/2000 | Hsieh |
| 6,049,798 A | 4/2000 | Bishop et al. |
| 6,072,494 A | 6/2000 | Nguyen |
| 6,075,895 A | 6/2000 | Qiao et al. |
| 6,191,773 B1 | 2/2001 | Maruno et al. |
| 6,198,485 B1 | 3/2001 | Mack et al. |
| 6,215,890 B1 | 4/2001 | Matsuo et al. |
| 6,222,465 B1 | 4/2001 | Kumar et al. |
| 6,256,033 B1 | 7/2001 | Nguyen |
| 6,351,744 B1 | 2/2002 | Landresse |
| 6,385,331 B2 | 5/2002 | Harakawa et al. |
| 6,456,728 B1 | 9/2002 | Doi et al. |
| 6,501,515 B1 | 12/2002 | Iwamura |
| 6,515,669 B1 | 2/2003 | Mohri |
| 6,703,999 B1 | 3/2004 | Iwanami et al. |
| 6,819,782 B1 | 11/2004 | Imagawa et al. |
| 7,034,807 B2 | 4/2006 | Maggioni |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,109,970 B1 | 9/2006 | Miller |
| 7,129,927 B2 | 10/2006 | Mattsson |
| 7,145,551 B1 | 12/2006 | Bathiche et al. |
| 7,170,492 B2 | 1/2007 | Bell |
| 7,227,526 B2 | 6/2007 | Hildreth et al. |
| 7,229,017 B2 | 6/2007 | Richley et al. |
| 7,259,747 B2 | 8/2007 | Bell |
| 7,340,077 B2 | 3/2008 | Gokturk et al. |
| 7,348,963 B2 | 3/2008 | Bell |
| 7,366,368 B2 | 4/2008 | Morrow et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,421,093 B2 | 9/2008 | Hildreth et al. |
| 7,428,542 B1 | 9/2008 | Fink et al. |
| 7,430,312 B2 | 9/2008 | Gu |
| 7,466,308 B2 | 12/2008 | Dehlin |
| 7,559,053 B2 | 7/2009 | Krassovsky et al. |
| 7,598,942 B2 | 10/2009 | Underkoffler et al. |
| 7,665,041 B2 | 2/2010 | Wilson et al. |
| 7,834,846 B1 | 11/2010 | Bell |
| 7,850,526 B2 | 12/2010 | Zalewski et al. |
| 7,979,850 B2 | 7/2011 | Ivanov et al. |
| 8,059,089 B2 | 11/2011 | Daniel |
| 8,212,550 B2 | 7/2012 | Katsurahira et al. |
| 8,363,098 B2 | 1/2013 | Rosener et al. |
| 8,370,383 B2 | 2/2013 | Kramer et al. |
| 8,407,725 B2 | 3/2013 | Kramer et al. |
| 8,531,396 B2 | 9/2013 | Underkoffler et al. |
| 8,537,111 B2 | 9/2013 | Underkoffler et al. |
| 8,537,112 B2 | 9/2013 | Underkoffler et al. |
| 8,625,849 B2 | 1/2014 | Hildreth et al. |
| 8,669,939 B2 | 3/2014 | Underkoffler et al. |
| 8,681,098 B2* | 3/2014 | Underkoffler et al. ....... 345/158 |
| 8,723,795 B2* | 5/2014 | Underkoffler et al. ....... 345/158 |
| 8,745,541 B2 | 6/2014 | Wilson et al. |
| 8,866,740 B2 | 10/2014 | Underkoffler et al. |
| 2002/0041327 A1 | 4/2002 | Hildreth et al. |
| 2002/0065950 A1 | 5/2002 | Katz et al. |
| 2002/0085030 A1 | 7/2002 | Ghani |
| 2002/0126876 A1 | 9/2002 | Paul et al. |
| 2002/0184401 A1 | 12/2002 | Kadel et al. |
| 2002/0186200 A1 | 12/2002 | Green |
| 2002/0186221 A1 | 12/2002 | Bell |
| 2002/0194393 A1 | 12/2002 | Hrischuk et al. |
| 2003/0048280 A1 | 3/2003 | Russell |
| 2003/0076293 A1 | 4/2003 | Mattsson |
| 2003/0103091 A1 | 6/2003 | Wong et al. |
| 2003/0169944 A1 | 9/2003 | Dowski et al. |
| 2004/0125076 A1 | 7/2004 | Green |
| 2004/0145808 A1 | 7/2004 | Cathey et al. |
| 2004/0161132 A1 | 8/2004 | Cohen et al. |
| 2004/0183775 A1 | 9/2004 | Bell |
| 2004/0193413 A1 | 9/2004 | Wilson et al. |
| 2005/0006154 A1 | 1/2005 | Back et al. |
| 2005/0031166 A1 | 2/2005 | Fujimura et al. |
| 2005/0212753 A1 | 9/2005 | Marvit et al. |
| 2005/0257013 A1 | 11/2005 | Ma |
| 2006/0010400 A1 | 1/2006 | Dehlin et al. |
| 2006/0055684 A1 | 3/2006 | Rimas-Ribikauskas et al. |
| 2006/0098873 A1 | 5/2006 | Hildreth et al. |
| 2006/0138225 A1 | 6/2006 | Richley et al. |
| 2006/0173929 A1 | 8/2006 | Wilson |
| 2006/0177103 A1 | 8/2006 | Hildreth |
| 2006/0187196 A1 | 8/2006 | Underkoffler et al. |
| 2006/0208169 A1 | 9/2006 | Breed et al. |
| 2006/0269145 A1 | 11/2006 | Roberts |
| 2006/0281453 A1 | 12/2006 | Jaiswal et al. |
| 2007/0021208 A1 | 1/2007 | Mao et al. |
| 2007/0112714 A1 | 5/2007 | Fairweather |
| 2007/0121125 A1 | 5/2007 | Dodge et al. |
| 2007/0139541 A1 | 6/2007 | Fein et al. |
| 2007/0266310 A1 | 11/2007 | Sasaki et al. |
| 2007/0282951 A1 | 12/2007 | Selimis et al. |
| 2007/0288467 A1 | 12/2007 | Strassner et al. |
| 2008/0018595 A1 | 1/2008 | Hildreth et al. |
| 2008/0030460 A1 | 2/2008 | Hildreth et al. |
| 2008/0056536 A1 | 3/2008 | Hildreth et al. |
| 2008/0059578 A1 | 3/2008 | Albertson et al. |
| 2008/0062123 A1 | 3/2008 | Bell |
| 2008/0112592 A1 | 5/2008 | Wu et al. |
| 2008/0114873 A1 | 5/2008 | Chakravarty et al. |
| 2008/0137913 A1 | 6/2008 | Hildreth |
| 2008/0166022 A1 | 7/2008 | Hildreth |
| 2008/0187178 A1 | 8/2008 | Shamaie |
| 2008/0199071 A1 | 8/2008 | Gu |
| 2008/0205701 A1 | 8/2008 | Shamaie et al. |
| 2008/0208517 A1 | 8/2008 | Shamaie |
| 2008/0219502 A1 | 9/2008 | Shamaie |
| 2008/0222660 A1 | 9/2008 | Tavi et al. |
| 2008/0235965 A1 | 10/2008 | Jaiswal et al. |
| 2008/0267447 A1 | 10/2008 | Kelusky et al. |
| 2008/0273755 A1 | 11/2008 | Hildreth |
| 2009/0003686 A1 | 1/2009 | Gu |
| 2009/0027337 A1 | 1/2009 | Hildreth |
| 2009/0031240 A1 | 1/2009 | Hildreth |
| 2009/0040215 A1 | 2/2009 | Afzulpurkar et al. |
| 2009/0051648 A1 | 2/2009 | Shamaie et al. |
| 2009/0052785 A1 | 2/2009 | Shamaie |
| 2009/0079813 A1 | 3/2009 | Hildreth |
| 2010/0013905 A1 | 1/2010 | Kumar et al. |
| 2010/0060568 A1 | 3/2010 | Fisher et al. |
| 2010/0063813 A1 | 3/2010 | Richter et al. |
| 2010/0066821 A1 | 3/2010 | Rosener et al. |
| 2010/0090946 A1 | 4/2010 | Underkoffler et al. |
| 2010/0128062 A1 | 5/2010 | Kramer et al. |

(56) References Cited

U.S. PATENT DOCUMENTS

| | | | |
|---|---|---|---|
| 2010/0131549 A1 | 5/2010 | Kramer et al. |
| 2010/0188328 A1 | 7/2010 | Dodge et al. |
| 2010/0207607 A1 | 8/2010 | Katsurahira et al. |
| 2010/0306713 A1 | 12/2010 | Geisner et al. |
| 2010/0315439 A1 | 12/2010 | Huang et al. |
| 2011/0025598 A1 | 2/2011 | Underkoffler et al. |
| 2011/0173632 A1 | 7/2011 | Arimilli et al. |
| 2012/0054671 A1 | 3/2012 | Thompson et al. |
| 2012/0069168 A1 | 3/2012 | Huang et al. |
| 2012/0200494 A1 | 8/2012 | Perski et al. |
| 2012/0206337 A1 | 8/2012 | Hildreth et al. |
| 2012/0229383 A1 | 9/2012 | Hamilton et al. |
| 2012/0239396 A1 | 9/2012 | Johnston et al. |
| 2014/0325373 A1 | 10/2014 | Kramer et al. |
| 2015/0077326 A1 | 3/2015 | Kramer et al. |

FOREIGN PATENT DOCUMENTS

| | | |
|---|---|---|
| WO | 9935633 A3 | 9/1999 |
| WO | 2008134452 A2 | 11/2008 |
| WO | 2010030822 A1 | 3/2010 |

OTHER PUBLICATIONS

Bacon J., et al., "Using Events to Build Distributed Applications", Second International Workshop on Services in Distributed and Networked Environments, 1995, pp. 148-155.
European Search Report for Application No. EP09014670, mailed on Jan. 4, 2013, 20 pages.
Form PCT/ISA/210, PCT/US06/04497, "PCT International Search Report," 1 page.
Form PCT/ISA/210, PCT/US08/61457, "PCT International Search Report," 2 pages.
Form PCT/ISA/210, PCT/US09/39285, "PCT International Search Report," 2 pages.
Form PCT/ISA/220, PCT/US06/04497, "PCT Notification of Transmittal of the International Search Report and the Written Opinion of the International Searching Authority, or the Declaration," 1 page.
Form PCT/ISA/220, PCT/US08/61457, "PCT Notification of Transmittal of the International Search Report and the Written Opinion of the International Searching Authority, or the Declaration," 1 page.
Form PCT/ISA/220, PCT/US09/39285, "PCT Notification of Transmittal of the International Search Report and the Written Opinion of the International Searching Authority, or the Declaration," 1 page.
Form PCT/ISA/237, PCT/US06/04497, "PCT Written Opinion of the International Searching Authority," 3 pages.
Form PCT/ISA/237, PCT/US08/61457, "PCT Written Opinion of the International Searching Authority," 6 pages.
Form PCT/ISA/237, PCT/US09/39285, "PCT Written Opinion of the International Searching Authority," 6 pages.
Form/IB/373, PCT/US06/04497, "International Report on Patentability," 1 page.

International Search Report and Written Opinion for Application No. PCT/US2013/067129, mailed on Mar. 27, 2014, 5 pages.
International Search Report and Written Opinion for Application No. PCT/US2013/069725, mailed on Mar. 27, 2014, 5 pages.
Jiang H., et al., "Demis: A Dynamic Event Model for Interactive Systems", Proceedings of the Acm Symposium on Virtual Reality Software and Technology, 2002, pp. 97-104.
Johanson B., et al., "The Event Heap: A Coordination Infrastructure for Interactive Workspaces", Proceedings Fourth IEEE Workshop on Mobile Computing Systems and Applications, 2002, pp. 83-93.
Johanson B., et al., "The Interactive Workspaces Project: Experiences with Ubiquitous Computing Rooms", IEEE Pervasive Computing, 2002, vol. 1 (2), pp. 67-74.
Mansouri-Samani M., et al., "A Configurable Event Service for Distributed Systems", Third International Conference on Annapolis Configurable Distributed Systems, 1996, pp. 210-217.
Michael J Carey., et al., "The Architecture of the Exodus Extensible Dbms", Proceeding OODS, 1986, pp. 52-65.
Partial European Search Report for Application No. EP09014670, mailed on Aug. 3, 2012, 7 pages.
Partial European Search Report for Application No. EP10781229, mailed on Dec. 3, 2014, 6 pages.
Rubine D., "Specifying Gestures by Example", Computer Graphics, 1991, vol. 25 (4), pp. 329-337.
Supplementary European Search Report for Application No. EP06720525, mailed on Jul. 22, 2010, 6 pages.
Supplementary European Search Report for Application No. EP09728557, mailed on Sep. 29, 2014, 11 pages.
Supplementary European Search Report for Application No. EP09767774, mailed on Feb. 27, 2013, 11 pages.
Supplementary European Search Report for Application No. EP09812234, mailed on Sep. 6, 2011, 6 pages.
Supplementary European Search Report for Application No. EP09821219, mailed on Oct. 2, 2014, 8 pages.
Supplementary European Search Report for Application No. EP10772727, mailed on Nov. 26, 2012, 5 pages.
Supplementary European Search Report for Application No. EP10781229, mailed on Mar. 23, 2015, 11 pages.
Supplementary European Search Report for Application No. EP12802574, mailed on May 19, 2015, 6 pages.
Velipasalar S., et al., "Specifying, Interpreting and Detecting High-level, Spatio-Temporal Composite Events in Single and Multi-Camera Systems", Conference on Computer Vision and Pattern Recognition Workshop, 2006, pp. 110-110.
William A McCuskey., "On Automatic Design of Data Organization", American Federation of Information Processing Societies, 1970, pp. 187-199.
Bretzner, Lars et al. "A Prototype System for Computer Vision Based Human Computer Interaction", Technical report CVA251, ISRN KTH NA/P-01/09-SE. Department of Numerical Analysis and Computer Science, KTH (Royal Institute of Technology), S-100 44 Stockholm, Sweden, Apr. 23-25, 2001.,Apr. 23, 2001, XP055286839, Retrieved from the internet: URL:ftp.nada.kth.se/CVAP/reports/cva p251.pdf.

\* cited by examiner

1. Depict pose with left hand as viewed from back p = pinkie finger
r = ring finger
m = middle finger
i = index finger
t = thumb ∧ = curled non-thumb
\> = curled thumb
| = straight finger or thumb pointed straight up
\ or / = straight finger or thumb pointed at angle
- = thumb pointing straight sideways
x = finger or thumb pointing into plane

| Pose name | p | r | m | i | t |
|---|---|---|---|---|---|
| | | | Hand Pose | | |
| flat | \| | \| | \| | \| | \| |
| fist | ∧ | ∧ | ∧ | ∧ | > |
| mime gun | ∧ | ∧ | ∧ | \| | - |
| 2 or peace | ∧ | ∧ | \ | / | > |
| one-finger point | ∧ | ∧ | ∧ | \| | > |
| two-finger point | ∧ | ∧ | \| | \| | > |
| x·y·z | ∧ | ∧ | x | \| | - |
| ok | \| | \| | \| | ∧ | > |
| pinkie point | \| | ∧ | ∧ | ∧ | > |
| bracket | x | x | x | x | x |
| 4 | \ | \ | \| | / | > |
| 3 | ∧ | \ | \| | / | > |
| 5 | \ | \ | \| | / | / |

FIG.12

2. Add hand orientation to complete pose must specify two variables:
1. palm direction (if hand were flat)
2. finger direction (if hand were flat)

| | |
|---|---|
| - | medial |
| + | lateral |
| x | anterior |
| * | posterior |
| ^ | cranial |
| v | caudal | orientation variables come after colon, e.g.:

| | | |
|---|---|---|
| ^ ^ x \| - : - x | = | x-y-z start position |
| ^ ^ \ / > : * v | = | upside-down v |

FIG.13

3. Two-hand combos

| Hand 1 | Hand 2 | Pose |
|---|---|---|
| ^ ^ ^ ^ > : x ^ | ^ ^ ^ ^ > : x ^ | full stop |
| ^ ^ ^ \| - : x - | ^ ^ ^ \| - : x ^ | snapshot |
| \| \| \| \| \| : v x | \| \| \| \| \| : - x | rudder and throttle start position |

FIG.14

| Gest I.D. | Description | Hand 1 Pose | Hand 1 Motion | Hand 2 Pose | Hand 2 Motion |
|---|---|---|---|---|---|
| 1 | point at object (invoke and move cursor) | ^^^\|-:-x | point mime gun | | |
| 2 | select object | ^^<\|:-x | drop thumb to select | | |
| 3 | move spatially / zoom in/out | ^^x\|-:-x | rotate/translate | | |
| 4 | snapshot | ^^^\|-:x- | make square with 2 hands | ^^^\|-:x^ | make square with 2 hands |
| 5 | demarcate rectangular region | ^^^\|-:x- | make square then adjust size | ^^^\|-:x^ | make square then adjust size |
| 6 | clear the decks | \|\|\|\|:+x | sweep hand laterally | \|\|\|\|:-x | sweep hand medially |
| 7 | organize objects into a circle | ^^^\|-:-^ | look through circle of O.K. sign | | |
| 8 | two-finger point at objects | ^^<\|-:-x | point | | |
| 9 | two-finger select object | ^^^\|:-x | drop thumb to select | | |
| 10 | mark start time | xxxxx:-^ | strike pose | | |
| 11 | mode change 1 | \|\|\|\|:-^ | strike pose - make "T" with two hands | \|\|\|\|:v- | strike pose - make "T" with two hands |
| 12 | mode change 11 | \|\|\|\|:-^ | strike pose - parallel hands | \|\|\|\|:-^ | strike pose - parallel hands |
| 13 | push back and slide workspace | \|\|\|\|-:x^ | push palm toward screen -- move sideways to find new regions | | |

FIG.17A

| | | | | |
|---|---|---|---|---|
| 14 | enter sub-application | ‖‖‖‖ | : x ^ | strike pose |
| 15 | return from sub-application | ‖‖‖‖ | : . ^ | strike pose |
| 16 | select option | ^^^ \| -:- x | medial roll | |
| 17 | roll time forward/back | ‖‖‖‖ | : v x | Yaw hand at elbow while keeping hand parallel to floor |
| 18 | stop time | ‖‖‖‖ | : x ^ | strike pose |
| 19 | loop time | ^^^ \| -: x ^ | circular motion with "L" | |
| 20 | demarcate irregular region | ^^^ \| -: v x | start with 2 finger tips together. 1 hand holds start position. | ^^^ \| -:- x | other hand traces out shape - select "click" for vertices |
| 21 | tag object | \| ^^^ > : - x | pinky-point at object then roll hand medially | | |
| 22 | group data streams | ^^^ \| -: v x | bring finger tips of two hands together | ^^^ \| -: v x | bring finger tips of two hands together |
| 23 | restore encapsulated workspace | ‖‖‖‖ : + x | sweep hand medially | ‖‖‖‖ : - x | sweep hand laterally |

FIG.17B first quadword of every slaw

```
                      76543210  76543210  76543210  76543210
length-follows:       1xxxxxxx  xxxxxxxx  xxxxxxxx  xxxxxxxx
eight-byte length:    11xxxxxx  xxxxxxxx  xxxxxxxx  xxxxxxxx wee cons:             01xxxxxx  xxxxxxxx  xxxxxxxx  xxxxxxxx
wee cons quadlen:     rrqqqqqq  qqqqqqqq  qqqqqqqq  qqqqqqqq
wee string:           001xxxxx  xxxxxxxx  xxxxxxxx  xxxxxxxx
wee string quadlen:   rrrqqqqq  qqqqqqqq  qqqqqqqq  qqqqqqqq
wee list:             0001xxxx  xxxxxxxx  xxxxxxxx  xxxxxxxx
wee list quadlen:     rrrrqqqq  qqqqqqqq  qqqqqqqq  qqqqqqqq full string:          1*100000  00000000  00000000  00000001
full cons:            1*100000  00000000  00000000  00000010 full list:            1*100000  00000000  00000000  00000011
```
(the penulti-MSB above is zero or one as the length is contained in the next one or two quadwords, i.e. if it's a four or eight byte length, per the 'eight-byte length' bit description second from top)

```
numeric:              00001xxx  xxxxxxxx  xxxxxxxx  xxxxxxxx numeric float:        xxxxx1xx  xxxxxxxx  xxxxxxxx  xxxxxxxx
numeric complex:      xxxxxx1x  xxxxxxxx  xxxxxxxx  xxxxxxxx
numeric unsigned:     xxxxxxx1  xxxxxxxx  xxxxxxxx  xxxxxxxx
numeric wide:         xxxxxxxx  1xxxxxxx  xxxxxxxx  xxxxxxxx
numeric stumpy:       xxxxxxxx  x1xxxxxx  xxxxxxxx  xxxxxxxx
numeric reserved:     xxxxxxxx  xx1xxxxx  xxxxxxxx  xxxxxxxx
```

FIG.23B1

(wide and stumpy conspire to express whether the number in question is 8, 16, 32, or 64 bits long; neither-wide-nor-stumpy, i.e. both zero, is sort of canonical and thus means 32 bits; stumpy alone is 8; stumpy and wide is 16; and just wide is 64)

```
numeric 2-vector:      xxxxxxxx  xxx01xxx  xxxxxxxx  xxxxxxxx
numeric 3-vector:      xxxxxxxx  xxx10xxx  xxxxxxxx  xxxxxxxx
numeric 4-vector:      xxxxxxxx  xxx11xxx  xxxxxxxx  xxxxxxxx
``` for any numeric entity, array or not, a size-in-bytes-minus-one is stored in the last eight bits -- if a singleton, this describes the size of the data part; if an array, it's the size of a single element -- so:

```
num'c unit bsize mask:  00001xxx  xxxxxxxx  xxxxxxxx  mmmmmmmm
``` and for arrays, there're these:

```
num'c breadth follows:  xxxxxxxx  xxxxx1xx  xxxxxxxx  xxxxxxxx
num'c 8-byte breadth:   xxxxxxxx  xxxxx11x  xxxxxxxx  xxxxxxxx
num'c wee breadth mask: xxxxxxxx  xxxxx0mm  mmmmmmmm  xxxxxxxx
```

FIG.23B2

DETECTING, REPRESENTING, AND INTERPRETING THREE-SPACE INPUT: GESTURAL CONTINUUM SUBSUMING FREESPACE, PROXIMAL, AND SURFACE-CONTACT MODES

RELATED APPLICATIONS

This application claims the benefit of U.S. patent application Ser. No. 61/175,374, filed May 4, 2009.

This application is a continuation in part application of U.S. patent application Ser. No. 12/572,689, filed Oct. 2, 2009.

This application is a continuation in part application of U.S. patent application Ser. No. 12/109,263, filed Apr. 24, 2008.

This application is a continuation in part application of U.S. patent application Ser. No. 12/553,845, filed Sep. 3, 2009.

TECHNICAL FIELD

Embodiments are described relating to gesture-based control systems including the representation, manipulation, and exchange of data within and between computing processes.

BACKGROUND

Conventional programming environments do not fully support cross-network execution and/or flexible sharing of data between large numbers of computing processes. For example, conventional user-facing computing platforms provide facilities for transmitting event data between processes. But these conventional mechanisms all suffer from shortcomings that make it difficult to build multi-process and multi-machine applications. For example, conventional event frameworks are strongly typed, which makes them inflexible, and forms a mismatch with the facilities of increasingly popular dynamic applications. The conventional frameworks are also configured only to support point-to-point data transfers, which makes coordinating the activity of more than a few distinct processes difficult or impossible. The conventional frameworks are also strongly dependent on particular local, in-memory data structures, which renders them unsuited for on-disk storage or transmission across a network.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 12 is a diagram of poses in a gesture vocabulary, under an embodiment.

FIG. 13 is a diagram of orientation in a gesture vocabulary, under an embodiment.

FIG. 14 is a diagram of two hand combinations in a gesture vocabulary, under an embodiment.

FIG. 17A and FIG. 17B are examples of commands, under an embodiment.

FIG. 23B1 and FIG. 23B2 show a slaw header format, under an embodiment.

DETAILED DESCRIPTION

Systems and methods are described for processing low-level data from a plurality of sources of spatial tracking data. Embodiments of the systems and methods are provided in the context of a Spatial Operating Environment (SOE), described in detail below. The SOE, which includes a gestural control system, or gesture-based control system, can alternatively be referred to as a Spatial User Interface (SUI) or a Spatial Interface (SI).

Figure 1:
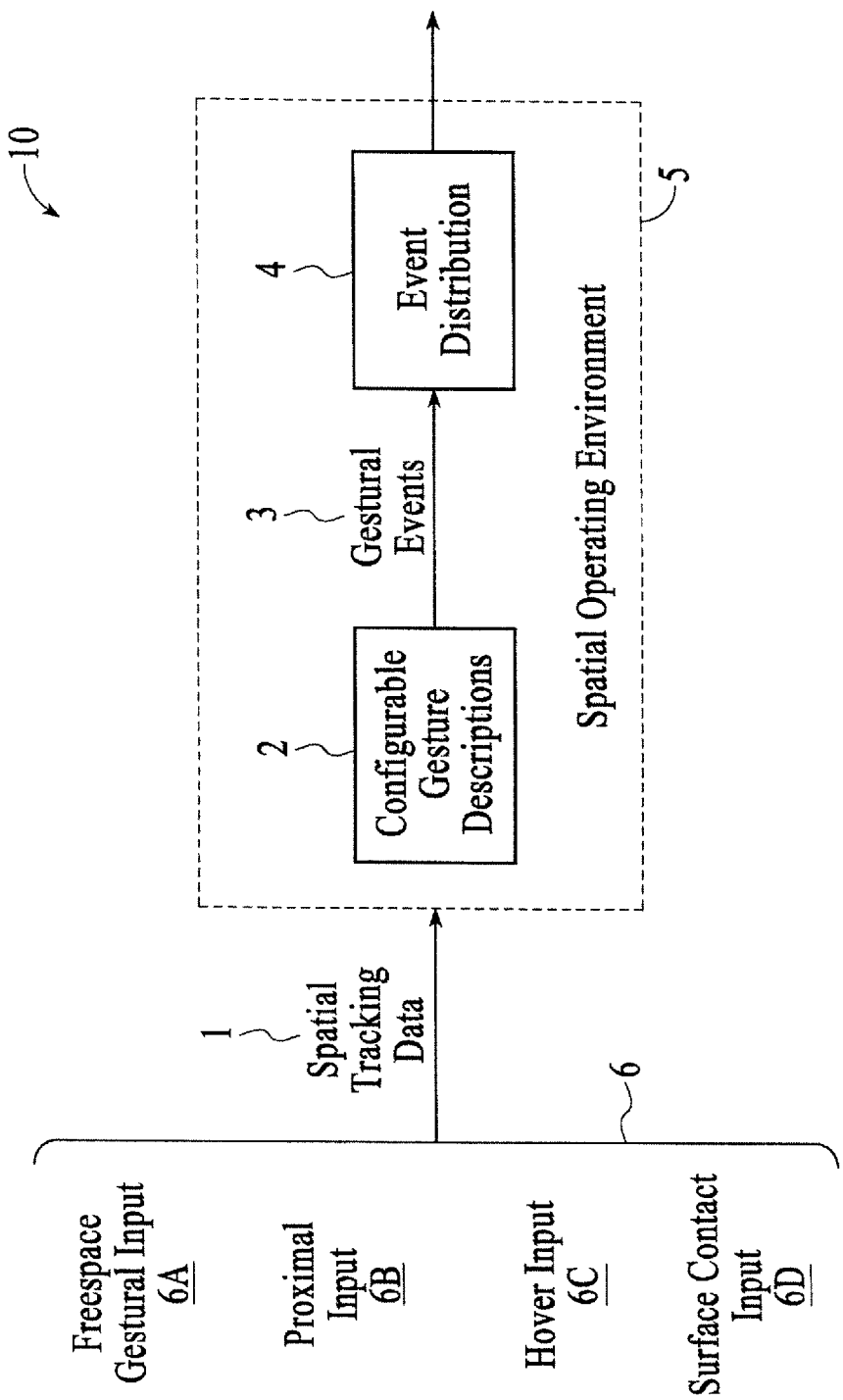
FIG. 1 is a block diagram of a system for detecting, representing, and interpreting three-space input, under an embodiment.

FIG. 1 is a block diagram of a system 10 for detecting, representing, and interpreting three-space input, under an embodiment. Embodiments of the system 10, in the context of the SOE 5, process low-level data 1 from a plurality of sources of spatial tracking data and analyze these semantically uncorrelated spatiotemporal data and generate high-level gestural events 3 according to a set of dynamically configurable implicit and explicit gesture descriptions 2. The events 3 produced are suitable for consumption by interactive systems (not shown), and the embodiments provide one or more mechanisms 4 for controlling and effecting event distribution to these consumers. The embodiments further provide to the consumers of its events 3 a facility for transforming gestural events among arbitrary spatial and semantic frames of reference.

Central to the embodiments herein is the assertion that the conceptual domain of gesture is a spatial and semantic continuum 6. At one end of the continuum 6 is fully unconstrained freespace gestural input 6A, in which one or more hands cooperate to describe curvilinear trajectories through three dimensional space and in which, simultaneously, aggregate finger poses evolve over time. At the other end is surface-contact input 6D, in which one or more fingers are "constrained" to lie on a one- or two-dimensional manifold (literature often refers to this form as "touch-based input"). Between these extremes is an elaboration of touch that may be termed "hover input" 6C; here, the fingers remain close to a manifold but are not in contact with it; such relaxation of the contact requirement allows for additional degrees of freedom to be deployed. More generally, it is useful to speak of "proximal input" 6B, in which gesture occurs in a range of defined proximity to one or more surfaces, or is restricted to a particular volume. It is evident that each gestural "category" shades into the next—from freespace 6A, to proximal 6B, to hover 6C, to touch 6D—and that, moreover, each such category properly, formally, and geometrically subsumes the next. It will be understood as well that this continuum 6 of "gestural input" is by no means restricted to human hands: tagged or otherwise trackable physical objects are also valid participants in the input continuum 6.

The embodiments herein make explicit a distinction between two ways in which the points along the input continuum 6 may be considered. From the vantage of sensing, different input mechanisms appear to subscribe to different regions of the continuum 6: a high-fidelity motion-capture rig, for example, seems to provide six-degree-of-freedom freespace input 6A, while an electric-field-sensing apparatus seems to generate hover-style input 6C, and a typical capacitive sensing unit seems to report touch input 6D. From the vantage of event consumption—and thus from the vantage of semantics—the low-level origin of an event ought to be of little interest; and in fact it is often of great utility to be able to apprehend the same event as rendered into different representations (e.g. as a freespace gesture, and also as a hover gesture). However, prior work has tended to conflate the two vantages. That is, other systems typically regard a touchscreen surface as necessarily and solely generating two-dimensional touch events, for example.

Figure 2:
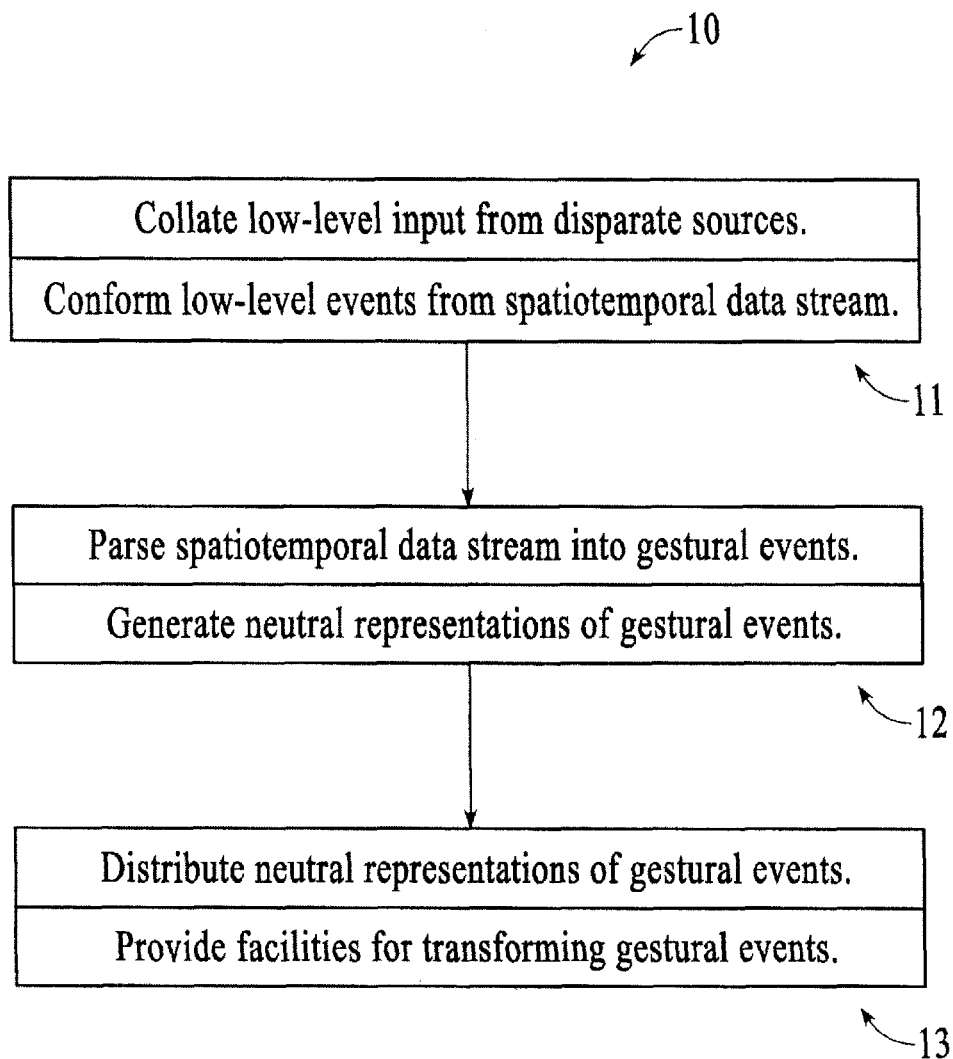
FIG. 2 is a processing-centric block diagram of the system for detecting, representing, and interpreting three-space input, under an embodiment.

It is one advance of the embodiments described herein, contrariwise, to maintain the distinction between the two vantages. FIG. 2 is a processing-centric block diagram of the system 10 for detecting, representing, and interpreting three-space input, under an embodiment. A first stage 11 of an embodiment collates low-level input from a disparate collection of sources and conforms the low-level events variously produced into a single stream of uniformly represented spatiotemporal data. A second stage 12 parses the conformed low-level data into semantically significant gestural events and represents these in a neutral but fully articulated form. A third stage 13 distributes the resulting neutral events to consumers, and provides facilities by which consumers may transform any event into a locally optimal semantic form. So, for example, an embodiment uses per-finger high-fidelity six-degree-of-freedom input to produce touch events with reference to a table surface; in this case, the surface is itself uninstrumented, but is instead represented mathematically, as a geometric structure—so that, absent specialized touch-sensing hardware, touch may still be deduced: computationally, via geometric intersection. In short, the formalisms of the embodiments enable the fully general exercise of variegated spatial input.

A description follows of the embodiments, the description comprising (1) a larger context for the embodiments: a typical ecology of systems in which the embodiment plays a crucial role; (2) a summary of the three pipeline-like components comprising the embodiments; (3) detailed descriptions of the three components, each with occasional illustrative examples; (4) a full implementation of the pipeline's second component; and (5) four scenarios illustrating different interactive systems enabled by the embodiments.

In the following description, numerous specific details are introduced to provide a thorough understanding of, and enabling description for, embodiments described herein. One skilled in the relevant art, however, will recognize that these embodiments can be practiced without one or more of the specific details, or with other components, systems, etc.

In other instances, well-known structures or operations are not shown, or are not described in detail, to avoid obscuring aspects of the disclosed embodiments.

The following terms are intended to have the following general meaning as they are used herein. The term "processes" as used herein means separable program execution contexts. Computer architectures and operating systems differ in the technical details of process implementation. The mechanism described here is configured to operate across a broad range of process implementations and to facilitate hybrid application designs or configurations that take advantage of as many available computing resources as possible.

The term "device" as used herein means any processor-based device running one or more programs or algorithms, any processor-based device running under one or more programs or algorithms and/or any device coupled or connected to a processor-based device running one or more programs or algorithms and/or running under one or more programs or algorithms. The term "event" as used herein means any event associated with a running or executing program or algorithm, a processor-based device and/or a device coupled or connected to a processor-based device (e.g., an event can include, but is not limited to, an input, an output, a control, a state, a state change, an action, data (regardless of format of the data or stage in the processing from with which the data is associated), etc.).

Embodiments of the systems and methods are provided in the context of a Spatial Operating Environment (SOE), as described above. An SOE is a complete application development and execution platform and is analogous in some ways to an operating system. An SOE however privileges both real-world three-dimensional geometries and efficient, high-bandwidth interactions between computer and human operator, and thus implements a sophisticated interface scheme. In turn, the SOE replaces many traditional OS services and architectures—which are inadequate to the requirements of such rich, nuanced interface—with new low- and medium-level system infrastructures.

Figure 3:
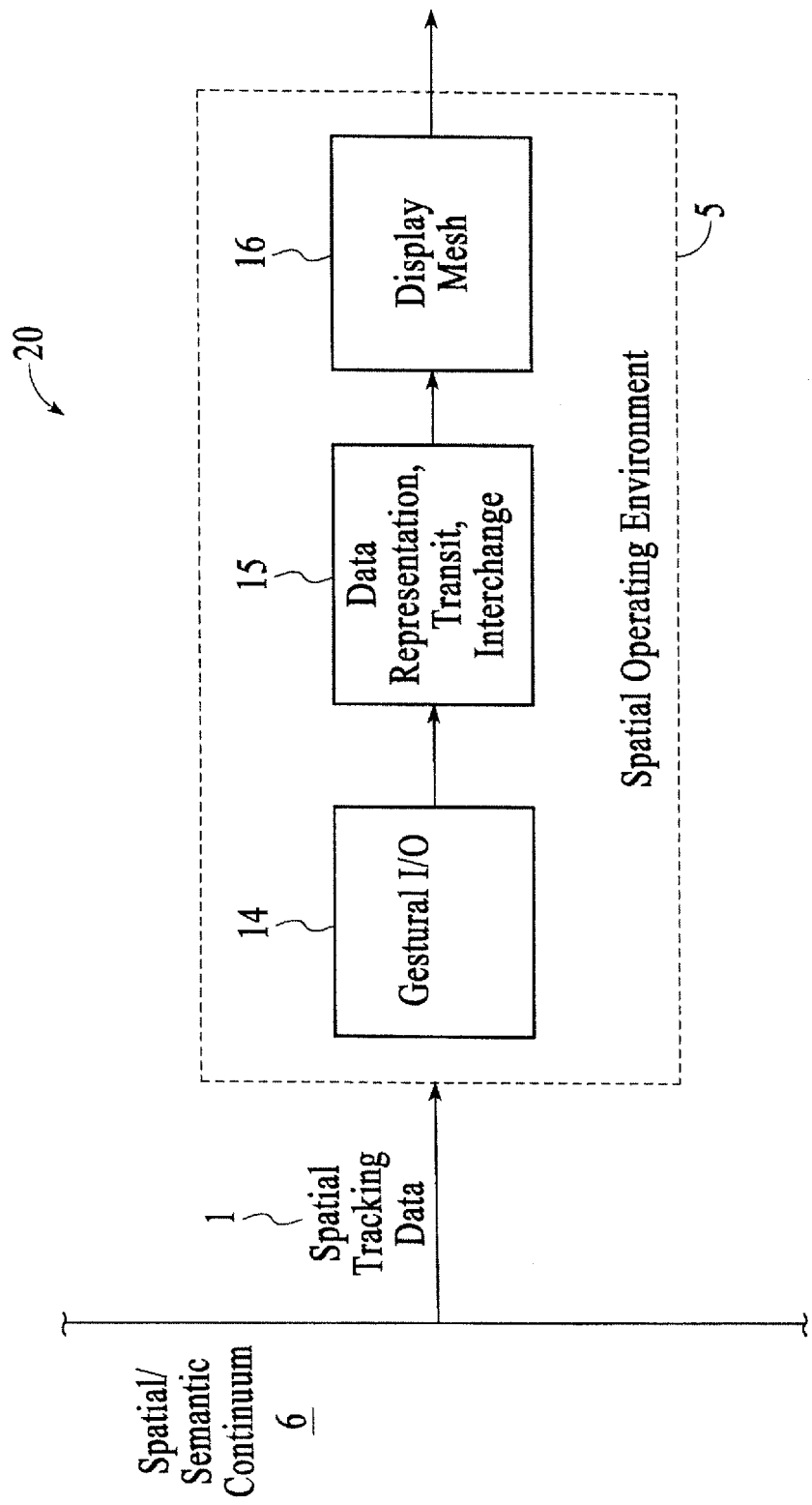
FIG. 3 is an alternative block diagram of a system for detecting, representing, and interpreting three-space input, under an embodiment.

FIG. 3 is an alternative block diagram of a system 20 for detecting, representing, and interpreting three-space input, under an embodiment. The system 20 is operating in the context of the SOE 5. The major components of the SOE 5 are the gestural I/O 14, network-based data representation, transit, and interchange 15, and a spatially conformed display mesh 16. Each of the components of the SOE 5 is described in detail below.

In describing the gestural I/O 14 of an embodiment, the combinatoric implications of the human hand—its bulk position and orientation, along with the "pose" formed by the aggregate of its fingers' flexions—and the fine motor control enjoyed by most humans together make hand-based gesture the crucial external component in the SOE input system. An SOE 5 thus tracks hands with high fidelity throughout a threespace volume. Other subordinate objects (e.g., physical and often graspable "tools" for channeling or manipulating digital content) may also be tracked. Gestural interactions are most often undertaken with reference to dynamic entities depicted on two- and three-dimensional displays operating in the visual, aural, and haptic domains. Active feedback "glyphs" make simultaneous use of the SOE's displays in order to (a) apprise operators of the system's instantaneous and ongoing interpretation of gestural input; (b) enumerate possible gestural "next steps", based on system state and on local gestural history; and (c) provide a sketchlike "preview" of the imminent manipulatory consequences of a gestural sequence.

Structurally, the input portion of the SOE's gestural I/O 14 system takes the form of an approximately linear pipeline. At the earliest stage, the pipeline acts to process, correlate, and seam spatial tracking information from a possible plurality of sources including any number, type, and/or combination of data streams/sources SY (where Y is any number 1, 2, ... ); and subsequently to collect individual elements into aggregates of known configuration and desirability (e.g. fingers considered at first separately are collected into a full hand representation). The pipeline's second stage is a gesture engine that interprets the results of the first stage and attempts to detect and disambiguate gestural occurrences. In the third stage, "events" of medium-level representation are passed to event consumers, which may make use of SOE facilities for transforming those generic events into forms geometrically relevant to local circumstance.

The network-based data representation, transit, and interchange 15 of an embodiment includes a system called "Plasma" that comprises subsystems "slawx", "proteins", and "pools", as described in detail below. Slawx (plural of "slaw") are self-describing data constructs that encompass atomic forms—strings and an expansive collection of numeric types, including elemental support for complex, vector, Clifford (or "multivector"), and array entities—as well as arbitrarily nestable aggregate forms—"cons" dyads, heterogeneous lists, and unique-keyed association lists. Proteins are prescribed-structure encapsulations of multiple slawx: an arbitrary-length concatenation of slawx (usually strings) called "descrips" provides a conveniently searchable description of a protein; while an arbitrary-length concatenation of key-value cons dyads, called "ingests", forms a protein's data payload. In an embodiment, proteins are themselves a particular species of slaw. Pools are persistent, linear-sequential collections of proteins; arbitrarily many processes may connect in parallel to a given pool. Each connected process may deposit proteins into the pool, retrieve proteins from the pool, or both. Low-level pool mechanisms ensure that pool transactions on a local machine and those undertaken remotely (over a network) are, from the programmer's and the executing code's point of view, indistinguishable. Retrieval of a protein deposited by a distant process automatically conforms all encapsulated slawx, so that hardware- and architecture-specific data format differences (endianness, e.g.) are invisibly resolved. Pools are of conceptually infinite capacity & temporal duration, so that a process may at any time "rewind" backward through the pool's history, accessing older and older proteins. Implementations of Plasma are exceedingly optimized; pool-mediated proteins thus form a highly desirable representation-mechanism for interface events, system events, interprocess messaging, streaming of high-density media, exchange of structured data, and so on. Further, the provisions of the Plasma system enable and encourage construction of complex "applications" as ecologies of independent, modular processes coordinated through protein interchange.

The SOE 5 of an embodiment, as described above, includes a spatially conformed display mesh 16. A central premise of the SOE 5 is that externalized manifestations of a computational process—the visual, aural, and haptic displays through which a process expresses its state and represents information—must conform themselves logically to the real-world space in which they are physically embedded. Thus the SOE 5 provides at every programmatic level a system of basic constructs for the description and manipulation of three-dimensional geometry.

Geometry is always described in a "real-world" coordinate frame, such coordinates being deliberately appropriate to the description of the room or space in which the SOE 5 is resident. So, for example, any two-dimensional visual display (a monitor, say) controlled by the SOE 5 maintains not only a description of its pixel resolution but also of its physical size, location, and orientation in the room. This means that individual pixels on the display have real-world locations and extents; and that, similarly, graphical constructs displayed on the device are possessed of authentic physical (room-conformed) geometry. This geometry-based representation scheme has immediate, substantial import because the same geometry and coordinate system is employed by the SOE's input system. In consequence, the SOE 5 can provide co-located input and output. When an operator points from a distance at a graphical object displayed on a screen, the system is able logically to consider that she and the graphics are present—with knowable geometric relationship—in the same threespace continuum. The intersection calculation that determines what is being pointed at is thus mathematically trivial, and the graphical object may then immediately react or subject itself to the operator's manipulations. The resulting spatial causality leads in turn to the operator's perceptual and cognitive conviction that the graphics are in the room with her; and, in every relevant sense, such a conviction is accurate. The expectations and modalities induced by currently dominant human/machine interfaces thereby undergo a valuable inversion, and a paradigm of "direct spatial manipulation" obtains.

The SOE 5 provides additional facilities for geometrically relating disjoint spaces (as, for example, with a telecollaboration system that "seams" two or more separate interaction sites across privileged visual displays) and for converting geometric constructs to allow interpretation in different local reference frames. Finally, the SOE 5 provides legible representations for "reduced geometries", that is, logical relationships among data that cannot meaningfully be understood via connected-space (i.e. Euclidean, Minkowski, anti de Sitter, etc.) forms; here, the SOE offers basic topologic representation.

The embodiments described herein form the major part of the input side of the gestural I/O system 14 of the SOE 5. The embodiments can be viewed as analogous to a pipeline that transforms very low-level (semantically: "signal level") input into much more structured, symbolic, and context-specific input for consumption by, say, higher-level SOE components. This is not however to say that the embodiments operate in an unstructured, pure-literal, or context-impoverished mode: much of the crucial efficacy of the pipeline derives from its impediment-free access to high-level geometric and computational context belonging to other of the SOE's component systems.

Figure 4:
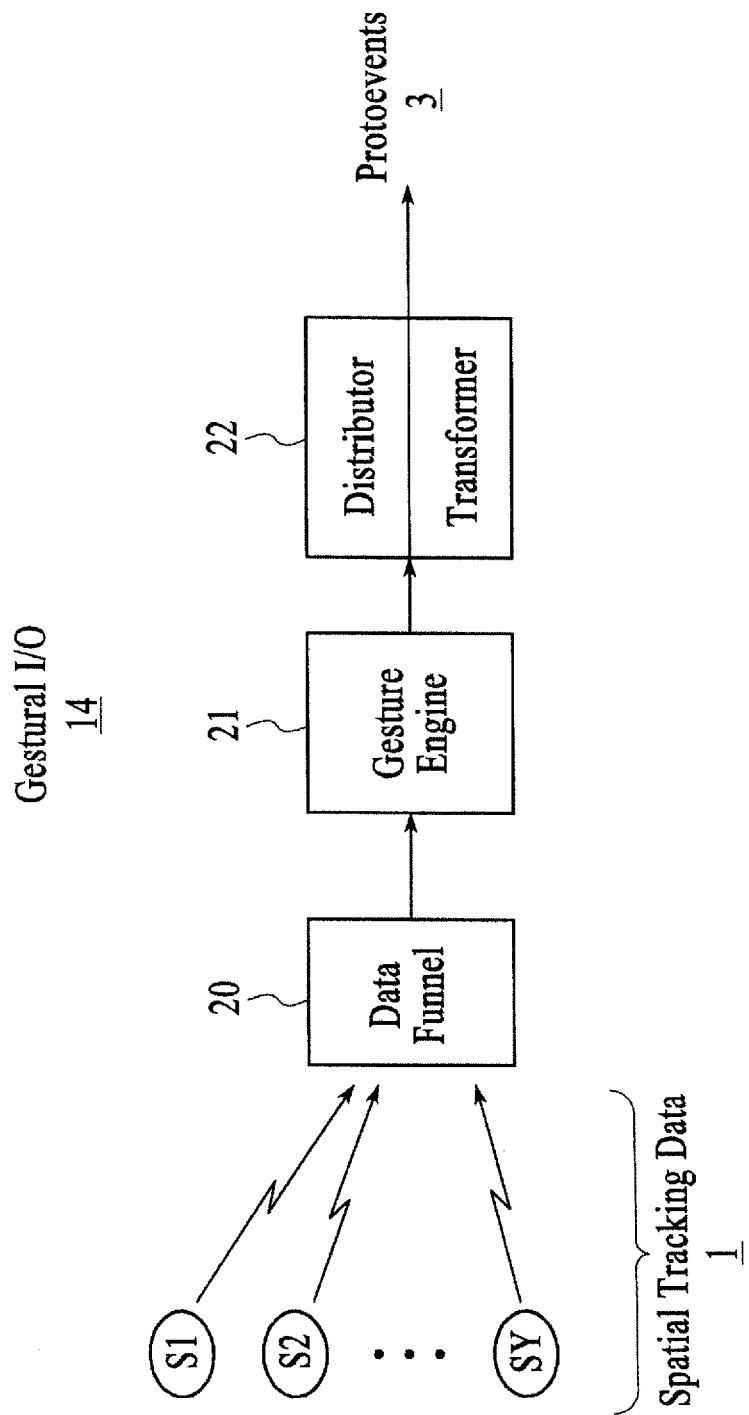
FIG. 4 is a block diagram of the gestural I/O, under an embodiment.

FIG. 4 is a block diagram of the gestural I/O 14, under an embodiment. In summary, the earliest stage 20 of the gestural I/O 14—a conceptual "data funnel" 20—acts to process, correlate, and seam spatial tracking information from a possible plurality of sources. For example, an SOE 5 of which the pipeline of an embodiment is a part may make simultaneous, coordinated use of (a) several motion-tracking devices serving distinct volumes, (b) constrained-purview machine vision tracking in the vicinity of individual workstations, and (c) electric-field-analysis proximity and touch sensing associated with a large projection table. The funnel 20 renders low-level spatial events from any number, type, and/or combination of data streams/sources SY (where Y is any number 1, 2, . . . ) in a conformed-coordinate representation (with reference to the global room space). Immediately thereafter the funnel 20 generates, where appropriate, logical aggregates expressing both literal geometric and semantic characteristics (a hand whose fingers are individually tagged gives rise at this stage to a description as a high-precision overall position and orientation together with a compact notation of dactylic pose).

These elemental events are passed to the input system's second stage, a "gesture engine" 21 whose work is to detect and disambiguate particular spatiotemporal circumstances—"gestures"—that may be of interest to individual processes, active computational objects, system-wide notification constructs, and so on. Activities of the gesture engine 21 are guided by a set of spatiotemporal rules—descriptions of particular gestures or classes of gestures—that may be statically or dynamically configured. The engine produces detailed but neutrally descriptive data bundles ("protoevents") articulating the detected gestural circumstances.

Finally, the third stage 22 of the gestural I/O 14 distributes protoevents emitted by the gesture engine to such event-consuming mechanisms as may be in programmatic contact with it. Each event consumer has access to a facility provided by the third stage that can re-render a protoevent bundle "in local terms": that is, can re-express the event in spatial-semantic form relative to a particular local geometry. For example, a hand thrust toward a screen with index and ring fingers forming the V of a "victory symbol" may be rendered as a singular postural configuration at a precise threespace room location; or as an overall hand-proximity condition with respect to the screen; or as a constellation of near-touch events in which each finger is considered separately.

Figure 5:
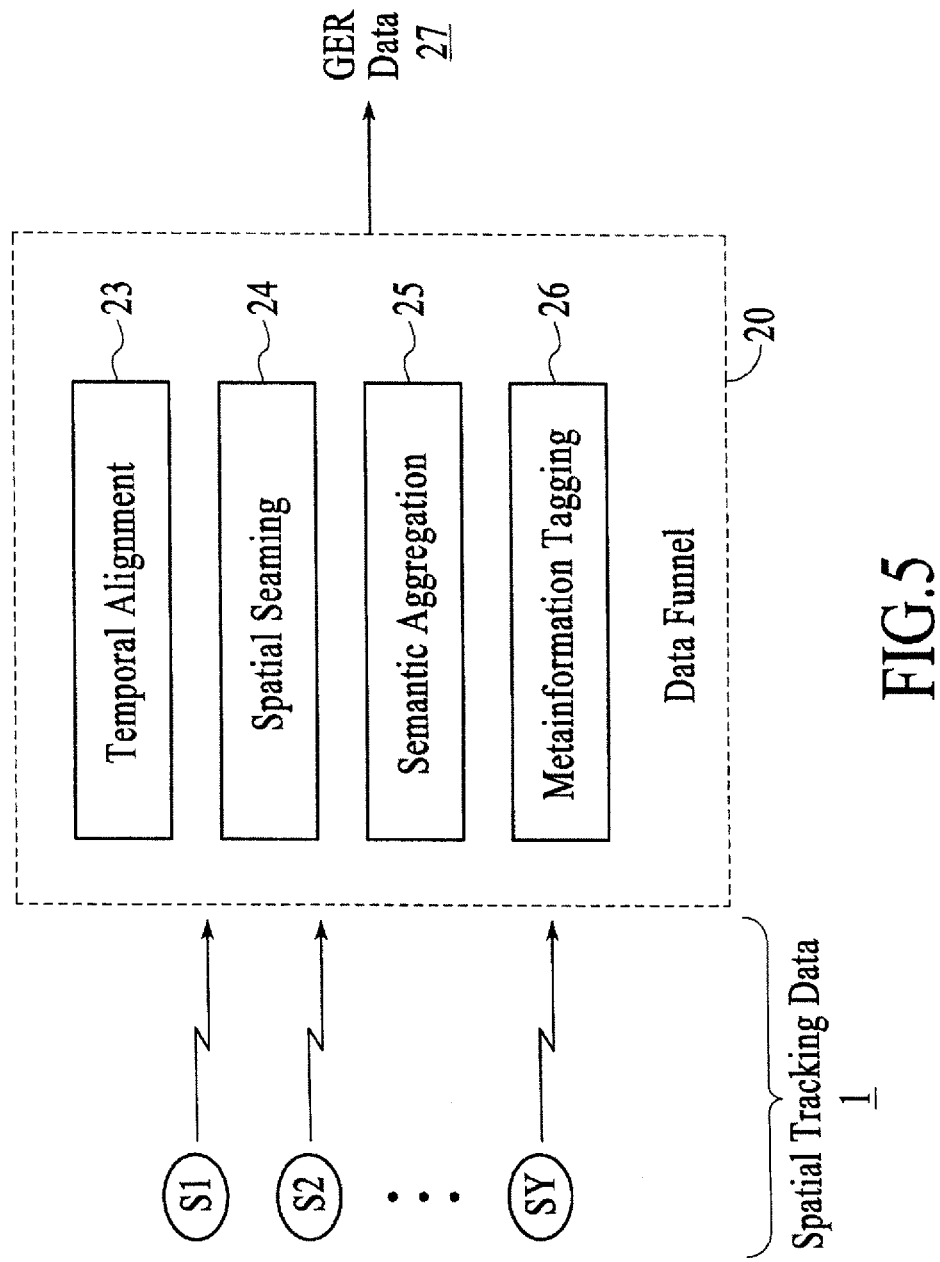
FIG. 5 is a data funnel of the gestural I/O, under an embodiment.

FIG. 5 is a data funnel 20 of the gestural I/O 14, under an embodiment. The data funnel 20, also referred to herein as the input funnel 20, transforms low-level spatial input data 1 (from a semantic point of view, "signal level") into a time-resolved stream of gesture-engine-ready (GER) data 27 to be fed to the pipeline's second stage, the gesture engine 21. The transformation executed by the data funnel 20 comprises collecting, temporally aligning 23, and spatially seaming 24 the low-level input data to form a single synthetic ("conformed") data stream. Subsequently, the funnel acts to identify privileged subsets of the conformed data and assemble 25 each subset into a reduced-entropy semantic aggregate.

The funnel receives as input one or more spatiotemporal data streams SY (where Y is any number 1, 2, . . . ). The data streams SY may inherently represent different degree-of-freedom counts: an optical motion-tracking system can typically resolve appropriately tagged fingers, with high fidelity, through all six degrees of freedom (three translational and three rotational); a time-of-flight-based camera supplies, based on the analysis method used, either three-, five-, or six-degree-of-freedom data about a hand's digits; an electric field sensing rig may provide three DOF information describing position of a hand's overall mass, with resolution differentially dependent on position; a touch screen may emit two-dimensional tracking information subject to physical contact constraints; and so on. The data streams SY may provide individual spatiotemporal events at differing rates. The data streams SY may be intermittent, as for example when tracked hands or other objects enter and leave the volume treated by a sensing mechanism.

The data streams SY include, where available, estimates of the accuracy or likely range of error of the spatial and temporal quantities represented. For example, the data stream from an electric field sensing rig may annotate each event with an assessment of the spatial error which, for such a device, not only differs along the local x and y ("planar") axes versus along the local z ("distance") axis but also varies in overall magnitude as a function of the true spatial position. Such accuracy annotations may be a "received" element of the data stream (if the device itself or the device drivers are capable of providing it) or may be deduced by the funnel's early processing (in cases where it maintains a model of the originating device's operation).

A component of the funnel 20 temporally aligns 23 a plurality of data streams SY. The funnel 20 may be configured to accomplish such alignment in several distinct ways. Alignment schemes 23 include but are not limited to the following: (1) interpolation provides "virtual" spatiotemporal events from all other data streams at every "real" temporal event instance from one or more data streams; (2) interpolation provides, at each temporal event instance in the stream whose data rate is the highest, virtual events from each of the other streams, the other stream's "real" events being discarded; (3) as with the foregoing, but with an explicitly designated stream used as the "ticking metronome" to which all other streams are aligned; (4) the foregoing, but with an externally imposed metronomic tick coinciding with none of the streams, so that all streams are interpolated. The result of the temporal alignment 23 is a data stream for which, at each timestep, a possible multiplicity of representational events is emitted, the per-timestep aggregate offering possibly alternate interpretations of the same "objective" (real-world) event. Each resulting post-alignment event includes, where possible, a representation of its unique identity (e.g. a particular finger or object, when appropriately tagged or reliably deduced). Such identity information is useful to subsequent processing, as when a single spatial event must be synthesized from alternate representations of the same real-world event. Where the operation of temporal alignment 23 changes the estimated error or accuracy range of component degrees of freedom, events are tagged accordingly.

The funnel 20 of an embodiment spatially seams 24 events from the plurality of data streams. The spatial seaming 24 often but not always presupposes prior temporal alignment of identity-tagged events. Spatial seaming 24 generally requires the promotion of each contributing event to the highest possible level of description. Where such description promotion changes the estimated error or accuracy range of component degrees of freedom, events are tagged accordingly. Degrees of freedom for which such promotion is impossible are explicitly tagged. In some cases, this circumstance corresponds functionally or explicitly to an infinite error range. Description promotion may simply entail that participating events are re-rendered into a conformed spatial reference frame (as necessary where the data streams initially represent spatial events in local frames). This in turn requires that the funnel maintain or have access to a conception of the relationship of each local frame with respect to the universal ("room") frame. Thus, for example, a touch event from a contact-sensing surface, represented initially in the local (x', y') frame of the surface, is transformed using the known physical geometry of the surface into the (x, y, z) frame of the room; the three rotational degrees of freedom are in that case tagged as unknowable, since they cannot be deduced from the device's data stream. Alternate, more complex methods of description promotion, including those relying on inference and deduction techniques, can also be used.

Subsequently, spatial seaming 24 produces, for each aggregate of alternate descriptions of the same real-world event, a single "synthetic" event (taken to be the real-world event's most accurate representation). Synthesis methods include, but are not limited to, (1) selecting a single description from among the plurality of input data streams and discarding the rest—the synthetic event is "winner take all"; (2) for each promoted-description degree of freedom, selecting the corresponding component data from a single description and discarding the rest—the synthetic event is componentwise "winner take all"; (3) performing a weighted average of each degree-of-freedom component across all descriptions, the weights determined by configurable and contextually sensitive functions; (4) permutations of (2) and (3). The criteria by which the method of synthesis is chosen may be implicitly or externally fixed, or may be statically or dynamically configured to respond to context.

In an example a volume is "treated" by a collection of identical sensors, each one of which has finite range, and each of whose accuracy degrades as its sensing range's edge is approached, and which are spatially arranged so that their sensing ranges overlap. Spatial seaming may select a single description when the event in question is well inside a single sensor's high-precision range, but may then perform a weighted average between adjacent sensors' streams when the event occurs near the range limit of the first sensor. The weighting varies spatially, in response to the event's estimated proximity to respective sensing boundaries.

In a second example event streams represent a high-fidelity optical motion tracker and a touch surface. Spatial seaming generally favors the motion tracker, but as tracking approaches the touch surface, an adjustment function is applied to the optical location data so that distance from the touch surface decreases asymptotically. Only when the touch surface senses definitive contact is the seamed event's location allowed to coincide geometrically and semantically with the surface.

In a final example a display-backed surface is outfitted with a high-precision electric-field-sensing apparatus, and a pair of cameras with stereo depth processing is trained on the surface. The field-sensing rig provides better resolved location data for a finger near the display (than does the vision system), but field sensing's ability to detect orientation is negligible, so spatial seaming merges the three location components from one sensor with the three orientation components of the other, resulting in a synthetic event that exhibits good resolution in all six degrees of freedom.

It is an explicitly configurable or contextually triggerable aspect of the funnel to allow spatial seaming 24 to precede temporal alignment 23; this may happen continuously or intermittently. For example, the funnel 20 may be configured so that input streams SY are ordinarily aligned against the highest-data-rate stream but that, upon detection of an extraordinary event (a finger crossing a proximal threshold, say), a "syncopated" aggregate event is generated by interpolating all other streams to the time of detection.

The funnel 20 of an embodiment also performs semantic aggregation 25, which includes collecting relevant events resulting from preceding funnel operations into semantic aggregates. The manner in which or patterns by which such aggregate collection 25 happens may be statically or dynamically configured. The aggregates that the funnel may be configured to produce at this stage are typically, though not always, (1) explicitly specified, so that their identification and assembly is a direct and causal matter subject to no sophisticated inference; and (2) of universal "downstream" utility. An extremely pervasive example attends the identification of a human hand assembly: for an input infrastructure in which individual fingers are tagged so that both the six-DOF geometry as well as the identity of each finger are reliably reported, the component elements of the hand may be a priori prescribed. The act of forming the higher-level semantic hand aggregate is then simply a matter of selecting from the conformed input stream those tags whose identities match the static identities known to comprise the hand.

Note that even in this example—in which the possibility of assembling the aggregate is guaranteed, so long as the component tags are reported in the input stream—the output stream would be likely to include not only the resulting high-level representation but also the lower-level tag information from which the aggregate had been assembled. Subsequent consumers of the event information are thus afforded the possibility of accessing the lower-level data when and as necessary (see immediately below).

Additionally, the funnel 20 can perform metainformation tagging 26 during one or more operations described above. When metainformation tagging 26 is used at or as part of any operation described above, the resulting events bear information pertaining to their construction, including a complete or abridged list of original events from which they were derived, decision paths that led to particular synthesis methods, and so forth. Subsequent consumers may then elect to traverse this metainformation in order to reinterpret or further analyze these synthetic events.

Figure 6:
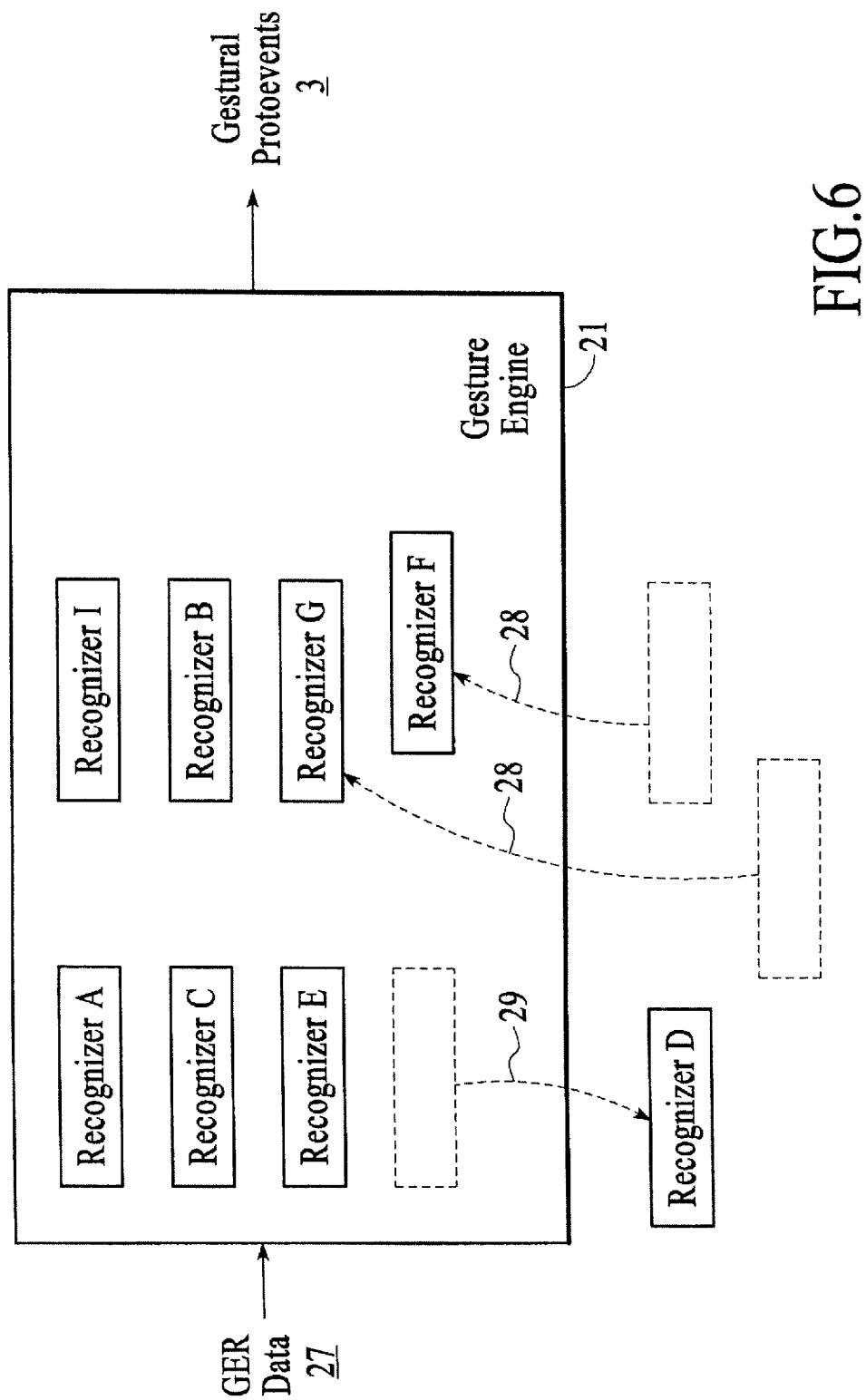
FIG. 6 is a gesture engine of the gestural I/O, under an embodiment.

FIG. 6 is a gesture engine 21 of the gestural I/O 14, under an embodiment. The gesture engine 21 translates a body of low-level, semantically raw data ("gesture-engine-ready data" or GER data 27) representing spatial and geometric occurrences into one or more representationally typed gestural protoevents 3. The GER data 27 of an embodiment includes, but is not limited to, the following: (1) the three-space position and, possibly, orientation of a single finger; (2) the overall "bulk" threespace position and orientation of an entire hand, together with a semantic digest of the hand's pose—i.e. its fingers' aggregate flexions; (3) the threespace position and orientation of an inert, non-biological object; (4) the threespace position and orientation of other anatomically germane structures, such as an operator's head to name one example.

The gesture engine 21 consults a possible plurality of distinct gesture-describing criteria and attempts to match the various spatial GER data 27 against these criteria. As a result of the matching exercise, zero, some, or all of the criteria will have been met; for each match, zero or more of the GER data 27 will have been implicated. The gesture engine 21 may be configured to treat the GER data 27 "exclusively", so that a datum implicated in one match may not then participate in satisfying a second, or the gesture engine 21 may instead allow a datum to participate in multiple matches. In response to each positive match, the gesture engine 21 prepares zero or more "protoevents" 3: these provide a digest of the matched low-level data, interpreted in the semantic context of the matched gestural criteria. The protoevents 3 are passed along to the third stage of the pipeline, as described below.

The gesture engine 21 can comprise a logically hermetic execution path, in which are resident either a fixed and immutable set of gesture recognition criteria or a finite set of selectable and configurable gesture recognition criteria (this selection and configuration to be effected from outside the engine's logical boundary). But in an embodiment, each recognition criterion exists as a logically independent unit called a "recognizer"; recognizers may be selected from a library (not shown) and may be authored independently from the gesture engine 21. In this embodiment, an external agency selects and configures one or more recognizers and then brings each into data-structural association with the gesture engine 21. This may be done once, prior to the gesture engine's engagement, or the external agency may dynamically add 28, remove 29, and/or modify or reconfigure (not shown) recognizers during the gesture engine's active execution. Note too that the embodiment allows for the gesture engine 21—in response to certain conditions—itself to add 28, remove 29, and/or modify or reconfigure (not shown) recognizers in association with it. It is further possible for a recognizer to remove 29 and/or reconfigure itself, or to add 28, remove 29, or reconfigure other recognizers in association with the same gesture engine 21.

The GER data body 27 may in rare circumstances be temporally solitary so that the gesture engine's action is undertaken only once, but is most usually time-varying and presented to the gesture engine 21 periodically. In this latter case the input data 27 are most often possessed of persistent identity, so that it is possible for recognizers to knowably associate the geometric information represented by a datum $D\_i$ at time $T\_n$ with that of datum $D\_j$ at time $T\_{n+1}$: $D\_i$ and $D\_j$ represent the same real-world object moving (and possibly deforming) through space. Throughout the remainder of this description, it will be understood that "GER datum" refers to the ongoing evolution of those time-sequential data bearing the same identity information, i.e. referring to the same real-world object. In an embodiment, the recognizers maintain internal state in order to represent aspects of the spatiotemporal trajectories of input data of interest.

In one case, a recognizer remains expectantly "dormant" until the geometric and spatiotemporal circumstances of one or more input data 27 match the recognizer's specific "activation" criteria, whereupon it becomes "active". The recognizer remains active so long as input data 27 satisfy a second set of "maintenance" criteria (which may or may not be identical to the activation criteria). The recognizer becomes inactive when the input data 27 fails to satisfy the second set of criteria.

Natural categories for recognizers, and thus for recognizable gestures, emerge from consideration of (1) the different forms that activation and maintenance criteria can take, and (2) the circumstances under which protoevents are emitted from the gesture engine.

When the gesture engine 21 is configured to treat GER data 27 exclusively, the inclusion of a datum by one recognizer in a successful initial match disallows the use of that datum by any other recognizer. In this way, a recognizer can "capture" one or more GER data 27, and throughout the interval in which the recognizer is active those captured data remain continuously unavailable for consideration by other recognizers.

In an embodiment a gesture engine 21 may rank its associated recognizers according to a "primacy metric". Such metrics may be static throughout the existence of the gesture engine 21; may be volitionally modified or replaced at discrete intervals by agencies external to the gesture engine 21; or may be automatically and dynamically evolved, discretely or continuously, as the gesture engine 21 executes. In all such cases, the gesture engine 21 gives consideration to its plurality of recognizers in the order suggested by the primacy metric's ranking; and when the gesture engine 21 is so configured and, additionally, disposed to treat input data exclusively, it is therefore possible for higher-ranking recognizers to "usurp" input data previously captured by other, lower-ranking recognizers. In this event, the recognizer whose data have been usurped is notified and given the opportunity to return to an inactive state, emitting any protoevents as may be necessary to describe the forced state change.

For illustrative purposes, the implementation of a gesture engine and its recognizers is articulated in full detail herein.

Figure 7:
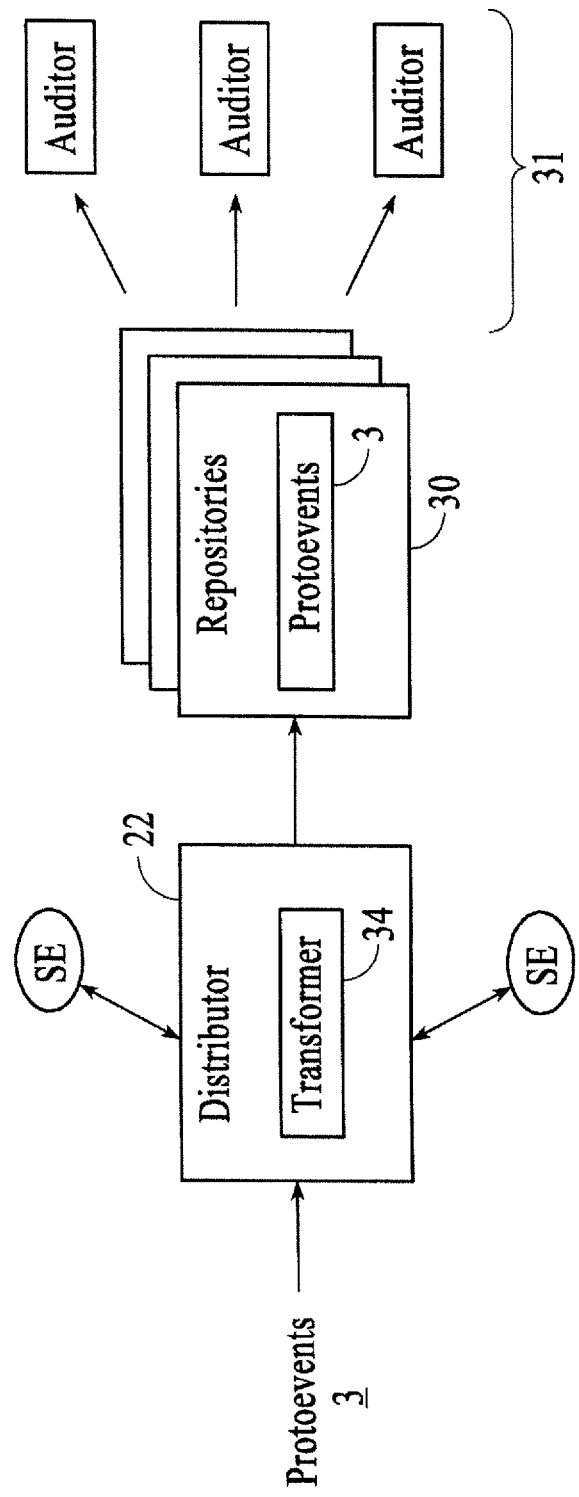
FIG. 7 is a block diagram of the anonymous, asynchronous repository distribution mechanism of a distributor, under an embodiment.
Figure 8:
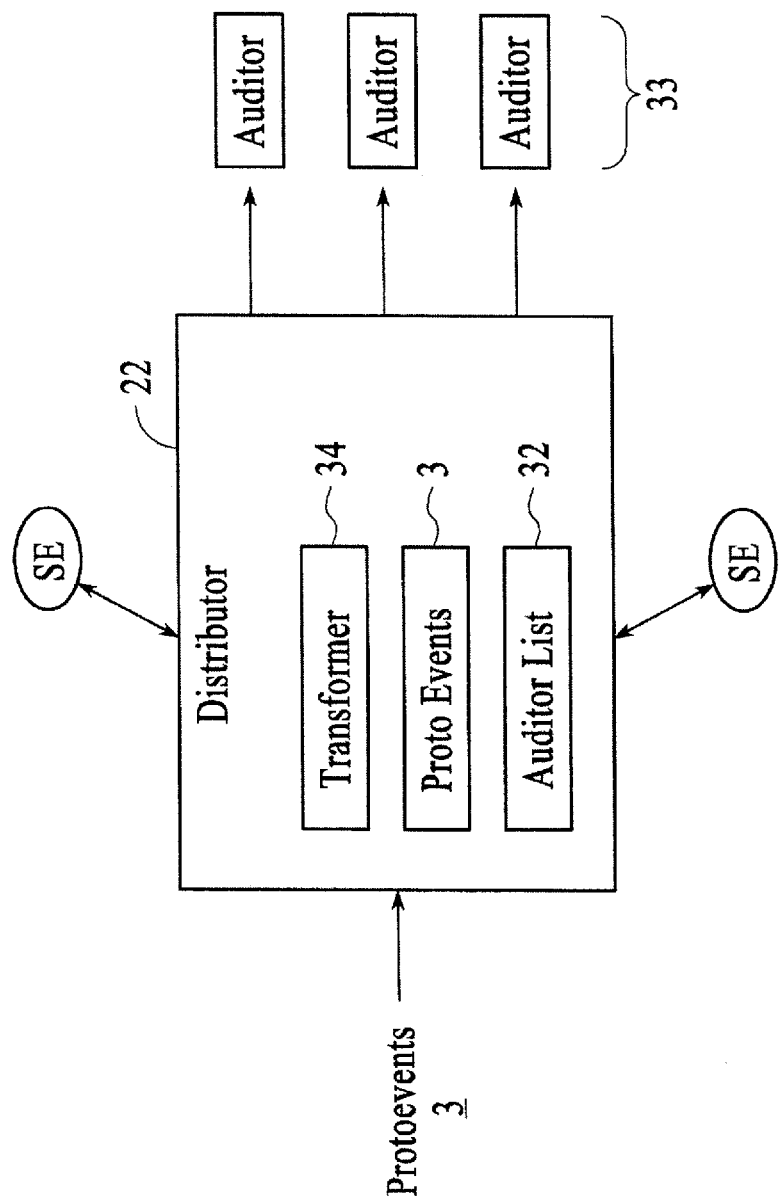
FIG. 8 is a block diagram of the directed recipient distribution mechanism of a distributor, under an embodiment.

FIG. 7 and FIG. 8 show a distributor 22 of the gestural I/O 14, under different embodiments. The "distributor" 22 of an embodiment transmits the protoevents 3 generated by previous pipeline activity to one or more next-stage recipients. A major class of the protoevents 3 thus transmitted comprises gestural events detected by the gesture engine, but the distributor 22 may be configured to transmit, in addition, those lower-level events that did not participate in the detection and synthesis of "well-formed gestures". Additional facilities of the distributor 22, available to event recipients and other downstream systems, allow transmitted protoevents 3 to be re-interpreted in (transformed into) specific geometric and semantic form.

Mechanisms for event distribution are varied, and the distributor may be statically or dynamically directed to engage with an arbitrary collection of these. The distribution mechanisms of an embodiment include, but are not limited to, the following: anonymous, asynchronous repository; directed, asynchronous recipient; and, directed, synchronous recipient. A description of the distribution mechanisms follows.

FIG. 7 is a block diagram of the anonymous, asynchronous repository distribution mechanism of a distributor 22, under an embodiment. Under the anonymous, asynchronous repository distribution mechanism, the distributor 22 exercises its connection to one or more repositories 30 that may have couplings or connections to some number of auditors 31. The distributor 22 deposits protoevents 3 in these repositories 30; the protoevents 3 are subsequently retrieved by interested auditors 31. Such repositories 30 may exist in the same execution space as the distributor 22 and support proximal or disjoint connections from auditors 31; or may exist as separate processes on the same hardware and support connections from the distributor 22 and from auditors 31 via interprocess communication protocols; or may exist as processes on remote hardware and support connections from the distributor 22 and auditors 31 over a network; or may exist with properties permuted from those of the foregoing. Common to this distribution pattern is that the distributor 22 need not (and in many cases cannot) be aware of the number and nature of the auditors 31. An embodiment implements such repositories through the provisions of proteins and pools, as described in detail below.

FIG. 8 is a block diagram of the directed recipient distribution mechanism of a distributor 22, under an embodiment. When the distributor 22 includes or executes the directed, asynchronous recipient distribution mechanism, the distributor 22 maintains an auditor list 32 comprising a list of asynchronous auditors 33; the population of the auditor list 32 is controlled statically or dynamically. The distributor 22 transmits to each asynchronous auditor 33 a copy of every generated protoevent 3, such transmission undertaken in an asynchronous modality, so that receipt acknowledgment from asynchronous auditors 33 is not necessary. Notionally, this model of asynchronous consumption is analogous to the message-passing "mailbox" communications offered by the Erlang programming language. An embodiment implements such asynchronous consumption through the provisions of mutex-protected shared memory methods.

When the distributor 22 includes or executes the directed, synchronous recipient distribution mechanism (with continued reference to FIG. 8), the distributor 22 maintains an auditor list 32 comprising a list of synchronous auditors 33; the population of the auditor list 32 is controlled statically or dynamically. The distributor 22 transmits to each synchronous auditor 33 a copy of every generated protoevent 3, such transmission occurring synchronously, so that receipt of events by the distributor's synchronous auditors 33 is implicitly or explicitly acknowledged in bounded programmatic time. The simplest implementation of such synchronous consumption can obtain when consumers are present in the same execution space as the distributor 22; then, transmission of protoevents 3 can be accomplished using a direct function call. For circumstances in which consumers are disjunct from the distributor process, techniques of interprocess communication may be employed to implement synchronous transmission.

Independently from its event transmission or distribution activities, and with reference to FIGS. 7 and 8, the distributor 22 includes and makes available facilities for event transformation 34. Any number of supplicant entities SE may communicate such event transformation requests to the distributor 22 by any of the means articulated above, synchronous and asynchronous, and in the case that a supplicant entity SE is itself also an auditor 33 such event transformation requests are not required to employ the same communication means as that of audition. An event submitted for transformation may have originated from the distributor 22 (e.g., a protoevent 3), or may represent spatiotemporal data synthesized or acquired externally to the distributor's activities. In the former case, the supplicant entity SE may elect to "retransmit" the event to the distributor 22, passing the event in full literal detail, or may instead pass a reference to the event—a unique identifier associated with the event—by means of which it may be retrieved by the distributor 22.

Supplicant entities SE may request simple geometric event transformation, in which the coordinate system underlying the event is subjected to an affine transformation. Such transformation will in general result not only in a change to the numerical representation of the event's geometry (i.e. a change of coordinate-based elements) but also of certain parts of its semantic content.

So, for example, a protoevent E represented as

E: [[ DESCRIPS: :event, :pointing, :manus, 3, :evt-grp-qid, 12831 // INGESTS: :gripe => "^||-:-x", :pos => v3(-200.0|+1000.0| +500.0), :aim => v3(+0.35|+0.00|-0.94) ... } ]]

can be subjected to a ninety degree rotation about the y-axis and a downward translation (equivalent to the representation of the geometry in a coordinate system that is y-rotated by negative ninety degrees and translated upward from the original coordinate system) to yield E --> E': [[ DESCRIPS: :event, :pointing, :manus, 3, :evt-grp-qid, 12831.1 // INGESTS: :gripe => "^||-:-", :pos => v3(+500.0|+0.0| 200.0), :aim => v3(-0.94|+0.00|-0.35) ... } ]].

Note in this case that the GRIPE string (described herein) that is a semantic digest of a hand's overall finger-postural configuration and aggregate orientation has also changed: the final two characters, designating basic orientation, have been transformed to ".-" (from "-x").

More complex event transformations executed by the distributor 22 involve the reinterpretation of some combination of a protoevent's geometric and semantic content in a new context. The same protoevent E above—an example of an apparent "pointing" gesture in which a hand's index and middle fingers are extended, the thumb is vertically disposed, and the ring and pinkie fingers are curled in—might be reinterpreted in the local geometric context of a proximal display screen positioned just in front of the hand:

```
E --> {E1', E2'}
E1': [[ DESCRIPS: :event, :proxing, :manus, 3, :dactyl, :middle, :evt-
grp-qid, 12831.2 // INGESTS: :pos => v3(-203.0|+1000.0|
+386.0), :proximals => { {(:phys-surf . 0x3dd310), (:dist .
15.4)}, ... } ]]
E2': [[ DESCRIPS: :event, :proxing, :manus, 3, :dactyl, :index, :evt-
grp-qid, 12831.3 // INGESTS: :pos => v3(-203.0|+1000.0|
+393.0), :proximals => { {(:phys-surf . 0x3dd310), (:dist .
22.4)}, ... } ]]
```

Figure 9:
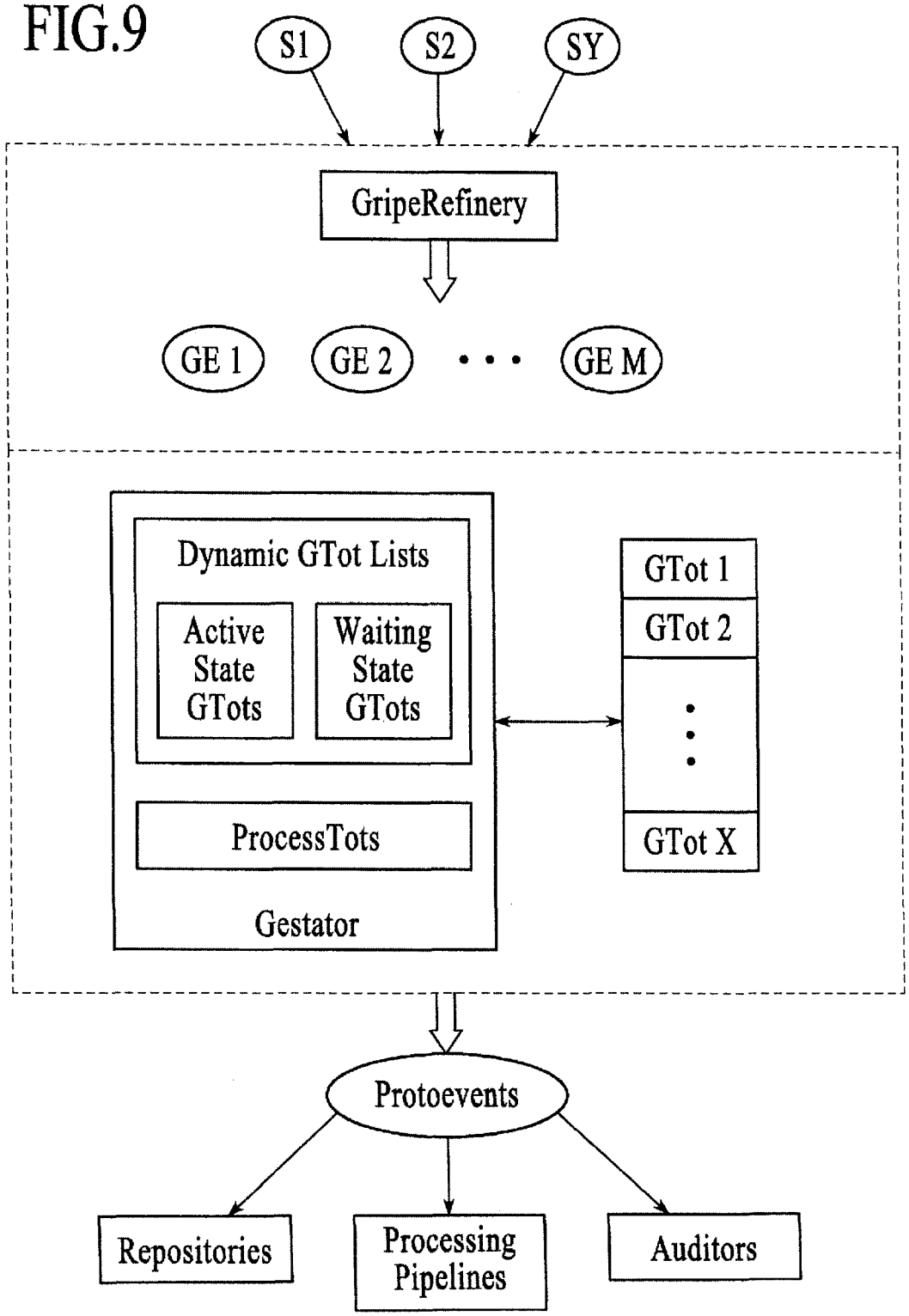
FIG. 9 is a block diagram of the spatial-continuum input system, under an embodiment.

With reference to the embodiments described above, numerous examples of gesture engine implementations follow. FIG. 9 is a block diagram of a gesture engine implementation 900, under an embodiment. The following gesture engine implementations suppose a number of principal elements, and a description of each of these principal elements follows with reference to the gesture engine implementation 900.

A first principal element of the following gesture engine implementation examples is the presence of some number of tracked entities, the representation of each comprising (a) a high-fidelity bulk threespace position; (b) a high-fidelity bulk threespace orientation; and (c) an expressive description of the entity's "pose", i.e. a semisemantic digest of its additional degrees of freedom. Call such entities "GripeEnts". (A GripeEnt corresponds to the general "GER datum" above.) A particularly important species of GripeEnt is the human hand, for which "pose" describes the fingers' various flexions, expressed possibly using the representational schema articulated in U.S. patent application Ser. No. 11/35069.

A second principal element of the following gesture engine implementation examples is a system for correlating low-level spatial input data from one or more sources and for analyzing that data in order to periodically update the collection of GripeEnts. This system is referred to herein as a "GripeRefinery", where a GripeRefinery may correspond to the "data funnel" described above. To provide perceptually satisfactory interaction, the GripeRefinery must produce complete output sets at rates well better than thirty Hertz.

A third principal element of the following gesture engine implementation examples is the inclusion of a collection of gesture-matching modules referred to as "GestatorTots" or "GTots" (a GTot corresponds to the general "recognizer" above, but the embodiment is not so limited). Each GTot has, at any instant, a "multiplicity" S: the coordination of S distinct GripeEnts is required for successful recognition of the gesture that the GTot represents. Each GTot is at any moment in either a "waiting" or an "active" state. Associated with these states are a GTot's two major execution paths: respectively, "EntranceAttempt" and "ContinuationAttempt", either or both of which may emit mid-level interaction event data. A third, optional, execution path is the GTot's "Update" routine, which provides a per-loop opportunity for the GTot to perform additional computation necessary to maintenance of its internal state. Execution of EntranceAttempt will produce one of three possible result codes: COPACETIC, PROMOTE, and EXCLUSIVE. Execution of ContinuationAttempt will produce one of three possible result codes: COPACETIC, DEMOTE, and EXCLUSIVE.

An EntranceAttempt tests, for a GTot in the waiting state, available GripeEnts against the GTot's particular entrance criteria; when those criteria are met, the GTot is placed in the active state and the (one or more) GripeEnts that have participated in meeting the criteria are marked as captured and associated with the GTot. For a GTot in the active state, ContinuationAttempt first acts to verify that the previously captured GripeEnts are (1) still available—that is, if they have not been "usurped" by a GTot of higher primacy—and (2) still spatially, semantically, and contextually satisfy the GTot's criteria. If (1) or (2) is not the case, the formerly captured GripeEnts are released from association with the GTot; otherwise, they remain captured.

These logical relationships and causalities are explicated in detail in the state transition descriptions below.

A fourth principal element of the following gesture engine implementation examples is the inclusion of an engine of arbitration that traverses the full set of GTots in a prescribed order and allows each to execute either its EntranceAttempt or ContinuationAttempt routine. This arbitration engine is referred to herein as a "Gestator" (a Gestator corresponds to the general "gesture engine" above, but the embodiment is not so limited). The Gestator maintains a dynamic list of all GTots in the active state and a separate such list of all GTots in the waiting state. These lists are necessarily disjoint. The Gestator has a single major execution path: "ProcessTots".

A fifth principal element of the following gesture engine implementation examples is the existence of an immediate recipient of the "events" generated through the action of the Gestator. This recipient may be a simple repository, like the FIFO buffer of a dispatch mechanism whose work is to distribute accumulated events periodically to the appropriate end consumers. Alternatively, or additionally, the recipient may be a more complex pipeline that acts to refine, combine, or otherwise condition the mid-level events provided by the Gestator to produce higher-level event constructs with context-specific information for the benefit of expectant subsystems.

A single pass through the system's input processing loop, then, comprises allowing the GripeRefinery to update the state of each GripeEnt; and then executing the Gestator's ProcessTots; which in turn (among other work) entails executing either the EntranceAttempt or ContinuationAttempt of every registered GTot.

The Gestator's ProcessTots routine of an embodiment is as follows:

PT1. Sort the full collection of GTots into meta-sets MS[1 . . . n]. Sort criteria may be either static or dynamic. A typical static criterion is "the number of coordinated GripeEnts required to form the gesture described by a GTot"—the multiplicity S, above; in such a case, therefore, the meta-set MS[n] contains those GTots that describe gestures requiring n GripeEnts.

PT2. Select an ordering for the GTots in each meta-set MS[i], so that MS[i][j] is the jth GTot; the meta-set then comprises MS[i][1 . . . m]. Sort criteria may again be static or dynamic. In certain situations the order may correspond simply to the order in which the GTots were originally instantiated and added to the Gestator.

PT3a. Traverse the Gestator's list of active GTots; execute each GTot's Update.

PT3b. Traverse the Gestator's list of waiting GTots; execute each GTot's Update.

PT4. Construct a list of all GripeEnts. Call it avail_ents.

PT5. Traverse the meta-sets from MS[n] to MS[1].

PT6a. For each meta-set MS[i], traverse the component GTots from MS[i][m] to MS[i][1], considering in turn each GTot MS[i][j].

PT6b. If MS[i][j] is in the active state, execute its ContinuationAttempt algorithm, making available to it the list avail_ents; otherwise, continue with the traversal in (PT6a).

PT6c. If the result code from (PT6b) is COPACETIC, continue with the traversal in (PT6a). The list avail_ents has been modified.

PT6d. Or if the result code is EXCLUSIVE, abandon the traversal in (PT6a) and proceed to (PT7a). The list avail_ents has been modified.

PT6e. Otherwise (the result code is DEMOTE), remove MS[i][j] from the Gestator's list of active GTots and add it to the list of waiting GTots; continue with the traversal in (PT6a).

PT7a. For each meta-set MS[i], traverse the component GTots from MS[i][m] to MS[i][1], considering in turn each GTot MS[i][j].

PT7b. If MS[i][j] is in the waiting state, execute its EntranceAttempt algorithm, making available to it the list avail_ents; otherwise, continue with the traversal in (PT7a).

PT7c. If the result code from (PT7b) is COPACETIC, continue with the traversal in (PT6a).

PT7d. The result code is known now to be either PROMOTE or PROMOTE EXCLUSIVE; remove MS[i][j] from the Gestator's list of waiting GTots and add it to the list of active GTots. The list avail_ents has been modified.

PT7e. If the result code of (PT7b) is PROMOTE EXCLUSIVE, abandon the traversal in (PT7a) and proceed to (PT8), concluding the ProcessTots execution outright.

PT7f. Otherwise (the result code is PROMOTE), continue with the traversal of (PT7a).

PT8. Conclude the ProcessTots execution.

A GTot's EntranceAttempt routine of an embodiment is as follows:

EA1. Traverse the list avail_ents.

EA2. Compare elements of avail_ents, taken S at a time (where S is the multiplicity of the GTot), against the particular entrance criteria.

EA3. If all appropriate combinatorics of the list are exhausted with no match, return the response code COPACETIC.

EA4. Otherwise, some s-tuple of GripeEnts—call it GE[1 . . . s]—has satisfied the entrance criteria.

EA5. Remove each GE[k] of GE[1 . . . S] from the list avail_ents.

EA6. Record, as part of the persistent state carried by the GTot, each GE[k] of the matching GE[1 . . . S]; these GripeEnts are now 'captured'.

EA7. Generate and inject into the event queue any such event(s) as may be appropriate to the description of the GTot's initial "recognition" of the gesture it describes.

EA8. Return the result code PROMOTE or, if the context and conditioning of the GTot are so disposed, PROMOTE EXCLUSIVE.

A GTot's ContinuationAttempt routine of an embodiment is as follows:

CA1. Confirm that each of the captured GripeEnts GE[1 . . . S] is present in the list avail_ents.

CA2. If (CA1) is not the case—meaning that a GTot of greater primacy than the present GTot has usurped one or more of the component GripeEnts formerly captured by the present GTot—skip forward to (CA5).

CA3. Confirm that each of the captured GripeEnts GE[1 . . . S] semantically and geometrically satisfies the present GTot's maintenance criteria.

CA4. If (CA3) is the case, skip forward to (CA8); if (CA3) is not the case—meaning that the gestural inputs comprising GE[1 . . . S] have "fallen out" of the gesture described by the present GTot—proceed forward to (CA5).

CA5. Generate and inject into the event queue any such event(s) as may be appropriate to describe the termination of the gesture described by the present GTot.

CA6. Remove references to previously captured GE[1 . . . S] from the persistent state carried by the present GTot.

CA7. Return the result code DEMOTE.

CA8. Remove each GE[k] of the captured GripeEnt set GE[1 . . . S] from the list avail_ents.

CA9. Generate, from the presumed-to-have-been-freshly-updated GE[k], any such event(s) as may be appropriate to the description of the evolving gesture's state; inject same into the event queue.

CA10. Return the result code COPACETIC or, if the context and conditioning of the GTot are so disposed, EXCLUSIVE.

Following are detailed descriptions of three exemplary applications employing an embodiment of the spatial-continuum input system introduced above. Each exemplar supposes that the hands belonging to one or more operators are tracked by sensors that resolve the position and orientation of her fingers, and possibly of the overall hand masses, to high precision and at a high temporal rate; the system further analyzes the resulting spatial data in order to characterize the 'pose' of each hand—i.e. the geometric disposition of the fingers relative to each other and to the hand mass.

The sensors, the approach to tracking and analyzing the operator's hands, and the scheme for representing the hands' poses, positions, and overall orientations may be as described in detail below; the symbolic pose representations throughout the description following will, for the purpose of demonstrative specificity, be rendered according to that notational scheme. Note however that the embodiments illustrated by the exemplars may make use of other analogous systems, provided that such are possessed of equivalent symbolic and representational efficacy.

Similarly, the exemplars make reference for the purposes of illustration to elements of the sample implementation-architecture as outlined above, but alternate, analogous architectures and implementations apply equally.

Where informative, some of the typical higher-level event-structures that would be derived during gestural interaction are also reproduced below. These events are rendered in a notation consistent with their preferred representational scheme, which is as "proteins" built from primitive "slawx" (as described in detail below). Such event proteins are typically deposited in "pools", a platform-independent, history-retaining interprocess data control and interchange mechanism (also described in detail below); and, after retrieval from the appropriate pools and further context-specific conditioning, are distributed systematically to programmatic objects that may be interested. A pool is transparently accessible both to processes local to the machine hosting it and, via the network, to processes executing on remote machines. These event proteins are interspersed throughout the prose descriptions following, and refer in each case to interactions described in the immediately preceding paragraph. Note too that the articulated proteins are not necessarily "complete": certain fields that might be necessary to a full running system are elided by way of promoting clarity, relevance, and brevity.

A first exemplar is a stereoscopic geometry tutorial. In this first exemplar, an operator stands next to a horizontal table-like surface, roughly a meter square and at waist height. A display system projects stereo imagery onto the surface, and additionally tracks the operator's head so that left- and right-eye views are correctly generated to correspond, as she moves about the table, to her instantaneous position. She wears stereo glasses.

The table presents a geometry tutorial; a variety of polyhedra are dimensionally displayed (that is: stereographically, not physically). Each polyhedron is positioned and oriented so that it is stably 'resting' on one of its faces. Each is about fifteen centimeters high.

The operator raises her right hand and 'points' at the table with her index and middle fingers (the fourth and fifth fingers are curled in, and the thumb points leftward, i.e. perpendicular to the index finger); the hand is oriented so that the palm substantially faces downward. This pose may be described as [^||-:v*]. Immediately upon the operator's hand's adoption of this pose, the table displays a dynamic cursor. Precise geometric calculations allow the cursor to appear on the surface of the nearest intersected polyhedron (if any) or on the table's surface (if no polyhedron is intersected). The operator raises her left hand in an analogous pose and begins pointing with it as well. As a further cue, the polyhedra respond to such 'pointing interaction' by turning color: when the operator points with her right hand, the closest intersected polyhedron changes from grey to blue; when with her left, from grey to green. Polyhedra return to their original grey when no longer intersected.

A. [[ DESCRIPS: :event, :pointing, :action, :move, :state, 0, :manus, 3, :evt-grp-qid, 17381 // INGESTS: :gripe => " ^||-:vx", :pos => v3 (+215.3|+304.7|+434.6), :aim => v3(−0.22|−0.51|−0.83) :intersectees => { (:vfeld . 0xaf32b8), (:phys-surf . 0x3dd310), (:geom-obj . 0x4a4e9c) } ]]

While pointing at a dodecahedron the operator articulates her thumb so that it is briefly brought parallel to and in contact with her index finger and then returns to its original, perpendicular orientation ([^||-:-*]-->[^|||:-*]-->[^||-:v*]). The dodecahedron reacts by emitting a graphical tag, a square frame that lies dimensionally on the surface of the table and that contains the typographic description "{5,3}" (the Schlaefli symbol for the dodecahedron). The tag slides smoothly from its initial position near the base of the dodecahedron toward the nearest edge of the table, where it comes to rest. The operator generates additional such tags by continuing to point around the table and 'clicking' her thumb; the resulting tags all end arrayed around the edge of the table.

B. [[ DESCRIPS: :event, :pointing, :action, :inc-state, :state, 1, :manus, 3, :evt-grp-qid, 17381 // INGESTS: :gripe => "^|||:vx", :pos => v3(+124.3|+313.4|+413.2), :aim => v3 (−0.14|−0.82|−0.55) :intersectees => { (:vfeld . 0xaf32b8), (:phys-surf . 0x3dd310), (:geom-obj . 0x604ddc) } ]]
C. [[ DESCRIPS: :event, :pointing, :action, :move, :state, 1, :manus, 3, :evt-grp-qid, 17381 // INGESTS: :gripe => " ^|||:vx", :pos => v3 (+124.3|+313.4|+413.2), ... ]]
D. [[ DESCRIPS: :event, :pointing, :action, :dec-state, :state, 0, :manus, 3, :evt-grp-qid, 17381 // INGESTS: :gripe => "^|||:vx", ... ]]

The operator then inclines forward slightly and brings her left hand, palm still facing roughly downward but with middle finger and thumb now curled lightly under ([^^^||>:v*]), downward and over the table surface proper. When her hand crosses a threshold-plane twenty centimeters above the table, the system's graphical feedback changes: where it formerly indicated (through the cursor's position) the intersection of the operator's pointing finger's aim vector with the simulation's various surfaces and geometric elements, the feedback system now deploys a multiplicity of "plumb line" cursors that show the closest point on relative surfaces to the instantaneous position of the finger. So, for example, a cursor appears directly "under" the finger, tracking along with it on the surface of the table. Where the orthogonal projection of the finger's position onto the plane of a polyhedral face lies within the face's polygon, a cursor appears too. In addition, a faint lateral "horizon line" appears on proximal polyhedral faces in order to suggest the plane that's parallel to the table and containing the finger's position. These graphical marks are updated continuously, at the system's natural frame rate (about 90 hertz), and so cognitively "track" the finger's movement.

E. [[ DESCRIPS: :event, :proxing, :action, :move, :manus, 3, :evt-grp-qid, 17385 // INGESTS: :gripe => "^^^|>:vx", :pos => v3(−93.2|+155.7|+60.8), :proximals => { (:vfeld . 0xaf32b8), (:phys-surf . 0x3dd310), (:geom-obj . 0x4a4e9c), (:geom-obj . 0x604ddc), ... } ]]

When the operator brings her finger to within three centimeters of one of the polyhedra, the face closest to the approaching finger begins to shift in hue to indicate the near-contact proximity. When at last the finger geometrically passes through the polyhedron's surface into its inner volume, the entire form flashes and a synchronized audio cue marks the occasion of the contact; and, just as when the more distant pointing hand "clicked on" a Platonic form, a graphical tag issues from the form's base and slides to the nearest edge of the table. The operator is thus identically able to access the system's geometric content either by pointing from a distance or by making direct contact.

F. [[ DESCRIPS: :event, :palping, :action, :move, :state, :exterior, :manus, 3, :dactyls, {:index}, :evt-grp-qid, 17391 // INGESTS: :gripe => "^^^|>:vx", :pos => v3(...), :palpees => { ((:geom-obj . 0x4a4e9c) . (:dist . +13.5)) } ]]
G. [[ DESCRIPS: :event, :palping, :action, :surface-intersect, :state, :interior, :manus, 3, :dactyls, {:index}, :evt-grp-qid, 17391 // INGESTS: :gripe => " ^^^|>:vx", :pos => v3 (...), :palpees => { ((:geom-obj . 0x4a4e9c) . (:dist . −1.8)) } ]]

Now the operator extends the middle finger of her active hand so that it is parallel to the index finger ([^^||>:v*]). In this mode, geometric contact with the system's polyhedra engages simulated physics, so that when the operator pokes at the side of an octahedron it's subject to a torque proportional to the cross product (really the wedge product, for disciples of geometric algebra) of the poke vector and the radial vector to the point of contact. In this way, by poking or flicking with her index and middle fingers, the operator causes the octahedron to rotate around a vertical (gravity-aligned) axis passing through its bottom face's center. She then stops the rotation by poking her fingers vertically through the topmost volume of the octahedron.

H. [[ DESCRIPS: :event, :palping, :action, :move, :state, :exterior, :manus
, 3, :dactyls, {:index, :middle}, :evt-grp-qid, 17394 //
INGESTS: :gripe => "^||>:vx", :pos => v3(...), :vel => v3
(...), :palpees => { ((:geom-obj . 0x21b3b8) . (:dist . +21.4)) } ]]
I. [[ DESCRIPS: :event, :palping, :action, :surface-
intersect, :state, :interior, :manus, 3, :dactyls,
{:index, :middle}, :evt-grp-qid, 17394 // INGESTS: :gripe => "^||
>:vx", :pos => v3(...), :vel => v3(...), :palpees => { ((:geom-obj .
0x21b3b8) . (:dist . −5.5)) } ]]

Similarly, the operator can reposition the simulation's objects. As she brings the tips of her index and middle fingers close to the base of a tetrahedron, a yellow "underhalo" forms, its brightness in inverse relation to the fingers' proximity to the table surface. When the operator's fingers come into direct contact (generally the middle finger is anatomically predisposed to do this first) with the physical surface, the underhalo turns from yellow to red, and a translational offset equal to the fingers' offset from their initial point of contact is continuously applied to the tetrahedron. She is thus able to slide any displayed object about the table surface; simply breaking contact with the table ends the sliding interaction.

J. [[ DESCRIPS: :event, :palping, :action, :move, :state, :surface-
contact, :manus, 3, :dactyls, {:index, :middle}, :evt-grp-qid,
17394 // INGESTS: :gripe => "^||>:.v", :pos => v3(...), :vel => v3
(...), :palpees => { ((:phys-surf . 0x3dd310) . (:dist . −3.0)),
((:geom-obj . 0x9d1104) . (:dist . +19.7)) } ]]

Finally, the operator may manipulate the tags that have accumulated at the table's edges through both distant pointing and proximal poking interactions. She brings her left hand down toward the left side of the table, where a group of tags lies. As any tag is approached by the hand, its luminance begins to grow: in inverse proportion, again, to the distance from the tag to the nearest finger. In addition, as soon as any finger's proximity crosses an outer threshold of five centimeters a line (in the plane of the table surface) snakes its way from the tag to the polyhedron with which it is associated.

K. [[ DESCRIPS: :event, :palping, :action, :move, :state, :exterior, :manus
, 4, :dactyl, :middle, :evt-grp-qid, 17402 // INGESTS: :pos => v3
(...), :vel => v3(...), :palpees => { ((:phys-surf . 0x3dd310) .
(:dist . +9.4)), ((:tag . "octahedron") . (:dist . +9.4)) } ]]
L. [[ DESCRIPS: :event, :palping, :action, :move, :state, :exterior, :manus
, 4, :dactyl, :ring, :evt-grp-qid, 17402 // INGESTS: :pos => v3
(...), :vel => v3(...), :palpees => { ((:phys-surf . 0x3dd310) .
(:dist . +15.8)), ((:tag . "octahedron") . (:dist . +15.8)), ((:tag .
"tetrahedron") . (:dist . +15.8)) } ]]

When a finger makes definitive contact with a tag—contact, that is, with the table surface at a point within the projected tag's geometric bounds—the tag's border turns red; the tag and the finger are logically bound; and the tag will, so long as the operator's digit remains in contact with the table, follow it, so that the operator is able to slide the tag about the surface of the table.

M. [[ DESCRIPS: :event, :palping, :action, :move, :state, :surface-
contact, :manus, 4, :dactyl, :middle, :evt-grp-qid, 17402 //
INGESTS: :pos => v3(...), :vel => v3(...), :palpees => { ((:phys-
surf . 0x3dd310) . (:dist . −0.7)), ((:tag . "octahedron") . (:dist .
−0.7)) } ]]

N. [[ DESCRIPS: :event, :palping, :action, :move, :state, :exterior, :manus
, 4, :dactyl, :ring, :evt-grp-qid, 17402 // INGESTS: :pos => v3
(...), :vel => v3(...), :palpees => { ((:phys-surf . 0x3dd310) .
(:dist . +5.2)), ((:tag . "tetrahedron") . (:dist . +5.2)) } ]]

The per-finger binding to individual tags means that, in this mode, the operator is able to use the fingers of her hand independently: each may separately touch and control an individual tag, exactly as if she were lightly touching and sliding a number of coins. As the position of each sliding tag evolves, the sinuous line between it and its polyhedron is appropriately updated so that the two structures remain graphically connected.

O. [[ DESCRIPS: :event, :palping, :action, :move, :state, :surface-
contact, :manus, 4, :dactyl, :middle, :evt-grp-qid, 17402 //
INGESTS: :pos => v3(...), :vel => v3(...), :palpees => { ((:phys-
surf . 0x3dd310) . (:dist . −0.7)), ((:tag . "octahedron") . (:dist .
−0.7)) } ]]
P. [[ DESCRIPS: :event, :palping, :action, :move, :state, :surface-
contact, :manus, 4, :dactyl, :ring, :evt-grp-qid, 17402 //
INGESTS: :pos => v3(...), :vel => v3(...), :palpees => { ((:phys-
surf . 0x3dd310) . (:dist . −1.1)), ((:tag . "tetrahedron") .
(:dist . −1.1)) } ]]

When the operator raises her finger from a tag it remains in its most recent position, so long as that position is still substantially on the edge of the simulation surface; if she releases a tag too far "inland" from the edge, the tag slides radially outward to come to rest once again near the edge. Alternately, if she slides any tag off the edge of the table, "littering" it onto the floor, that tag is discarded and disappears.

A second exemplar is a film manipulation system. In this second exemplar, a 'rapid-prototyping' film production workspace comprises two large projection screens mounted ninety degrees to each other on intersecting walls and a large, mildly inclined projection table positioned two meters from the forward screen. An operator stands just behind the projection table, facing the forward screen. Displayed on and filling the forward screen is a still-frame from a sequence of recently shot film footage.

Raising his hands to shoulder height, each with palms forward, fingers parallel, and thumbs horizontal ([||||-: x^&&||||-:x^]), the operator gains access to a larger collection of footage sequences (referred to herein as the "pushback" control system, described in detail below): as he translates his hands directly forward, maintaining their overall pose, the current frame recedes as if it were being pushed back into perspective. As the frame's size on the screen diminishes, it is joined by other laterally disposed frames, and so the original frame is revealed to have been just one in a horizontal strip of frames. The operator may see more or fewer frames by, respectively, pushing his hands farther forward or pulling them back, the interface modality thus mimicking the physical interaction of shoving against a spring-loaded structure. Similarly, as the operator moves his hands left and right the horizontal collection of frames is pulled left and right. The pushback system of an embodiment deliberately constrains navigation by ignoring vertical displacement of the hand, but is not so limited.

A reticle centered graphically on the screen—which appears as soon as the operator engages the pushback system—indicates which frame will be 'selected' when pushback interaction is terminated. Moving his hands to the right, the operator positions a new frame directly under the reticle and closes both hands into fists ([^^^^>:x^&& ^^^^>:x^]), ending the pushback session. The reticle fades as the chosen frame springs forward, centering itself and coming rapidly to fill the projection screen.

The system affords basic control over footage playback: the operator may play the footage forward at unit rate by holding either hand in a flat pose parallel to the floor ([||||:vx]) and then rotating it clockwise until the fingers point roughly to the right ([||||:vR]). Analogously, the footage may be played in reverse by rotating the flat hand counter-clockwise ([||||:vx]-->[||||:vL]). He halts playback— "pauses"—by raising either hand in a palm-forward "policeman's halt" pose: [||||:x^].

The operator obtains further control over playback position and rate by bringing either hand into a vertical-plane pose with the fingers pointed forward ([||||-x]). So doing engages a "logarithmic timeline", represented on-screen as a stack of horizontal bars positioned at the bottom of the screen. The topmost bar in the timeline stack represents the full temporal breadth of the footage sequence, the left end of the bar corresponding to the earliest frame and the right end to the final frame. Each successively lower bar represents a subinterval of the footage that is smaller (and thus more finely 'resolved') by a factor R; the bottommost of the N bars thus represents an interval of footage $R^{\wedge}(N-1)$ smaller than the full duration.

The operator accesses different bars—and thus different temporal resolutions—by translating his hand along a substantially vertical axis (toward or away from the floor). Swinging his hand side to side engages variable speed playback of the footage: rightward rotation of the hand (from [||||:-x] a little toward [||||:x+], if the right hand; or toward [||||:.-], if the left) begins to shuttle the footage forward; further rotation increases the shuttle speed. Returning the hand to an attitude in which it is pointing directly forward toward the screen brings playback to a halt (a small angular detent zone may optionally be provided about this central angular position to aid reliable maintenance of halted playback), while continued leftward rotation of the hand begins to shuttle the footage backward. The overall shuttle speed, it is to be understood, is determined by the currently active bar; i.e. the footage plays, for a given angular attitude of the operator's control hand, slower by a factor of $R^{\wedge}n$ than it would "on the top bar", with n the ordinal of the bar in the range 0 . . . n−1 (zero representing the top bar).

The lateral extrema of each bar are annotated with the instantaneous footage timestamp so represented; beneath the stack of bars is displayed the timestamp belonging to the currently accessed & displayed frame; and a graphical mark depicts, in each bar, the location of that current frame. Additionally appearing within each bar are graphical indications of the temporal loci of "marked frames"—parts of the footage that have in some way been annotated. Some such marks may indicate edit points; the remainder of this exemplar will consider the case in which these marks indicate the availability of rotoscoped elements.

When the operator has navigated the footage to a temporal point containing available elements, he releases the control hand from the timeline pose, and shuttle mode is relinquished. The timeline fades to half-transparency, while on the right of the screen a vertical array of graphical tags appears; each tag represents an available element within the footage's current frame.

The operator brings his hand to head height with fingers extended, thumb lateral, and palm parallel to floor ([||||-:vx]), and as he does so the topmost element tag expands and highlights, indicating its selection. Simultaneously, within the paused footage frame on the forward screen, the element so tagged brightens while the rest of the frame dims to a low, fractional luminance. As the operator raises and lowers his hand, keeping the pose roughly constant, he successively accesses the full set of element tags (and each highlights in turn, with the corresponding in-frame indication of the element itself).

With some particular rotoscope element thereby selected and highlighted, the operator uses a pointing gesture (all fingers curled except for index; thumb aloft; index finger pointing toward the forward screen: [^^^||-:-x]) followed by a 'thumb-click' modification (thumb laid down parallel to index finger: [^^^||:-x]) to grab the selected element from the front screen. Immediately, a duplicate of the highlighted element appears. Where the selected element was static (as part of the paused footage's current frame), the new duplicate is "live", playing forward and looping at the end of its rotoscope subsequence. The operator then, while maintaining the thumb-clicked pose, lowers his hand until it is pointing at the table's surface; throughout this maneuver, the animated roto element precisely follows his "aim", gliding first down the forward screen, disappearing into the geometric void between forward screen and table, and then, when the pointing hand's aim intersects with the table's quadrilateral surface proper, reappearing there. The operator continues briefly to adjust the location of the animated roto element on the table by re-aiming his pointing hand; then raises his thumb ([^^^||:-v]-->[^^^|-:-v]), whereupon the element is left in position on the table.

The operator pulls a second, independent element from the same sequence frame, repeating the gestural maneuvers above, then shuttle-navigates to another point in the same sequence to add a third element to the composition that is accumulating on the table. He then accesses a wholly different sequence (by engaging in pushback interaction) from which he adds further elements to the table; and so on.

Eventually the table surface holds a composition containing a dozen rotoscoped elements: isolated characters, props, backgrounds, etc.; they are all continuously animated, and are drawn in the order in which they were added to the composition—so that, for opaque elements, the most recently added occludes elements lying directly underneath. Because the (full or partial) opacity of these elements and their potential geometric overlap mean that ordering is a significant characteristic of the composition, it is now appropriate to refer to the elements as "layers".

Each of the composition's layers is represented by a symbolic, graphical tag; the collection of tags is arranged along the right edge of the table's surface (along the forward-back axis). Tags appear as soon as new elements are added to the table's composition, and the linear arrangement of tags smoothly adjusts to incorporate each newcomer.

The operator now allows his hand to hover about ten centimeters above the right side of the table, directly over the tag collection. As he translates the hand forward and back, both the tag closest to the hand and the element layer to which that tag refers are "selected": the tag indicates this by sliding further rightward and increasing in brightness and opacity, while all other composition layers fade to nearly full transparency. The selected layer is thus visually isolated).

With his right hand held in a roughly stable position above a particular tag, and with a single layer thereby selected, the operator brings his left hand down toward the table surface, somewhere near the visual center of the selected layer. As his left hand traverses a first threshold plane (parallel to the surface but some twenty centimeters above it) a visual feedback system is engaged: a regular grid of small graphical crosses ("plus symbols") appears on the surface and is positionally fixed to it; the brightness and opacity of each cross is a function both of the height of the hand above the surface and the two-dimensional radial distance of the cross from the hand's down-projected epicenter. Appropriate scale factors and additive constants applied to those two parameters result in the impression of a moving spotlight tracking the hand's position (as projected into contact with the surface) and illuminating, within a finite-radius circle, a fixed grid. The illuminated grid grows brighter as the hand descends toward the surface.

The operator's left hand, descending, then comes into physical contact with the table and triggers a change in the feedback system's mode: now the feedback grid, formerly fixed to the surface, is dragged along with the contacting hand. Simultaneously, layer repositioning is engaged, so that as the operator slides his hand around the table the layer follows precisely; the impression is one of sliding a piece of paper around on a surface (except of course that the layer itself continues to animate).

Having repositioned the layer to his satisfaction, the operator then raises his left hand, breaking contact with the surface. The layer 'dragging' mode is terminated and the layer is left in place. The grid-based feedback system simultaneously returns to a previous mode so that the grid remains fixed with respect to the table surface. When eventually the hand moves far enough from the table (vertically), it re-crosses the first threshold and the grid feedback is visually extinguished. Moving the right hand sufficiently—either vertically or laterally (left-right)—similarly exceeds the layer tags' proximity thresholds, and so all tags and layers become unselected, in turn returning all layers to full opacity so that the entire composition (with one layer now moved) is once more revealed.

The operator engages further layer interaction by bringing his right hand down so that its fingers are fully in contact with one of the layer tags near the table's right edge, whereupon the tag brightens and shifts hue to indicate that it has entered a 'direct manipulation' mode. The operator now slides his hand forward and back along the table, parallel to the right edge; the tag underneath his fingers follows along and, if translated far enough, changes its ordinal position (relative to the other tags). When the operator lifts his hand off the surface, the new tag ordering is retained and results in a new logical ordering of the corresponding layers. In this way the draw-order of the layers may be manipulated and individual layers may be moved 'up' or 'down' in the stack.

Finally, a set of 'instantaneous' gestures is available to perform high-level manipulation of the system and its contents. For example, the operator may sweep his hands, held flat with all fingers and thumb extended and initially pointing uniformly forward, outward and to the side so that the right hand is pointing to the right and the left hand is pointing left ([||||||:vx & ||||:vx]-->[||||:v+& ||||:v+]) in order to clear and delete the composition accumulated so far. Or performing a leftward two-handed 'pushing' motion that ends with the hands coplanar with one held above the other, palms pointing leftward ([||||||:Lx & ||||:Lx]) moves the forward screen's contents to the left screen: the gesture triggers the forward footage to begin smoothly translating leftward, rotating simultaneously counterclockwise about a vertical axis, until its center and normal vector coincide with the left screen's center and normal. Entire sections of the application and its component data may thus be rearranged or moved between display surfaces.

Note that the film manipulation system described here includes many further facilities—e.g. a mode in which elements can be rotoscoped from their containing sequences literally by hand, the operator's finger tracing out the relevant silhouettes frame by frame; a means for the time-alignment (or precise time-offset) of elements on the composition table; and so on—but the freespace, proximity, and touch-based gestural interactions of concern to this disclosure are not further (or uniquely) illuminated through detailed examination of these modes.

A third exemplar is that of a portage slate. In this third exemplar, an interaction of broad utility involves one or more privileged physical objects called "portage slates" (or "p-slates"). Portage slate functionality is automatically available to every appropriately configured application that is built atop the system described herein. The portage slate is a physical tray onto which operators may "scrape" graphical objects and artifacts displayed at a first location, and from which, following peripatetic transport, the enslated objects may be transferred into a new application with a new display context at a second location.

This third exemplar unfolds with reference to the first and second exemplars above. The geometry tutorial operator has just "tapped" an icosahedron, so that a tag representing it rests near the edge of the table, and has subsequently set the icosahedron spinning in the manner described above. She now picks up, with her left hand, a nearby p-slate. The p-slate is a rigid sheet of matte-colored plastic measuring roughly twenty by thirty centimeters, and is actively tracked by the system, typically (though not necessarily) through the same mechanisms used to track the operator's hands.

The operator brings the p-slate close to the table edge and orients it so that the one of the p-slate's edges is parallel to and nearly touches the table edge. The projection system that serves the table surface has been arranged so that its expanding cone of pixels deliberately "overfills" the strict physical bounds of the table; in fact, the projected pixel field is large enough to treat the whole of the p-slate when it abuts the table, as it now does.

The proximal presence of the p-slate induces the part of the system with local access to the projection pixels to instantiate a transient parasitic display ("TPD") construct. It is the role of the TPD to manipulate the subset of pixels that physically land on the p-slate as a separate display; to compensate for (i.e. invert) any geometric distortion introduced by the non-normal projective incidence of the pixel subarray on the p-slate; and to provide a virtual rendering context to the p-slate and to any processes authorized to draw on it.

It is this rendering context that allows the p-slate to produce an animated glyph in one of its corners nearest the table as an indication that it is live and available. A matching glyph with synchronized animation is produced on the table near the p-slate's. The operator understands the glyphic dyad to show that the two surfaces—one fixed, one mobile—are now logically connected.

The operator's right index finger alights on the icosahedron's tag; she slides her finger—and thus, causally, the tag—around the table's perimeter and onto the p-slate. The tag, though now outside the table's boundary, is this time not considered to be discarded (as in the interaction from the first exemplar, in which tags were "thrown on the floor"); instead, the system now asserts that the tag is "resident" on the p-slate.

Indeed, as the operator moves to quit the immediate vicinity of the polyhedral geometry workstation and set off across the room, her trajectory brings the p-slate a bit higher and then forward through the table's projection cone. The system's low-latency tracking enables the changing position and orientation of the p-slate to update the TPD's internal model of the mobile display's geometry; this model allows the TPD construct to continue to commandeer precisely those projector pixels that intersect the moving surface. The p-slate simply goes on rendering its contents in place, relative to its own rigid geometry and without explicit reference to (indeed, perhaps computationally oblivious to) the complex projective relationship evolving between it and the projector. The operator thus observes that the tag remains in place on the p-slate where she'd put it; in every cognitively relevant sense, the tag is now on the p-slate.

When the operator's forward progress has translated the p-slate so that its geometry is fully disjunct from the projection pyramid the system decommissions the TPD construct and marks its rendering context inert.

As the operator makes her way toward the other end of the long room, she passes through other volumes in which a projector is active. In each case the network-connected tracking system makes its event stream available to processes with access to the local projection pixels. Whenever tracking events show that the p-slate is newly intersecting a pyramidal projection cone another TPD construct is instantiated. The p-slate is thus able, during its fleeting passage through the projection volume, to render its "contents"; in particular, the icosahedron tag is seen to remain fixed in its position on the p-slate.

Shortly the operator reaches the rapid prototyping film workstation of the second exemplar. Here too the projection parameters have been arranged so that the downward projector's pixels well overfill the assembly table. As the operator brings the p-slate close to the worktable, a local TPD is again instantiated and the tag is revealed once more. Additionally, the dyad of glyphs again appears—one on the p-slate and one on the table—to indicate that the two surfaces are in data-logical contact.

The operator has positioned the p-slate at the right side of the table's rearmost edge (i.e. nearest her body). She now, holding the p-slate with her left hand, brings her right hand's fingers down onto the tag, which brightens to confirm the contact. She smoothly slides the tag forward, across the forward edge of the p-slate, and onto the table. When she raises her fingers from the table, terminating contact with the tag, it shifts to join the vertical array of rotoscoped elements, which in turn make slight adjustments to their position to accommodate the new tag.

When now the operator taps lightly on the tag she'd just added to the table it dispenses its 'payload': a two-dimensional projection of an icosahedron, still spinning as she'd left it, slides rapidly from the tag's location, growing in scale as it moves, and takes up a position at the center of the composition table. The icosahedron now behaves like any of the other filmic elements used in the composition: the operator may reposition the icosahedron, change its layer ordering, and so on.

A fourth exemplar involves a general interaction modality that makes particular use of hover-style input. This fourth exemplar unfolds in the context of a city services application; here, a large forward screen shows a three-dimensional view of an urban area, comprising above-ground structures as well as subterranean features—multiple interpenetrating layers of electrical, water, gas, sewage, and subway elements. Freespace gestural navigation allows an operator to "fly around" the perspective scene on the forward display in the manner described in detail below. Meanwhile, a projection table immediately before the operator shows a top-down, orthographic view of the same urban region. The hover-based interaction described here allows exploration and selection of the application's subsurface structures.

The operator inclines forward slightly and brings his left hand, beginning well above a certain midtown region, down toward the table's surface. As the hand descends past a threshold above the table (e.g., approximately twenty centimeters above the table), the structure selection mechanism is enabled, and a glowing translucent disk is graphically overlaid on the maplike view of the city. A concise visual representation appears for each subsurface structure that lies within the disk's radius. Simultaneously, more detailed three-dimensional depictions of those same "highlighted" structures appear at correct threespace locations on the forward perspective view. As the operator translates his hand laterally, holding it at constant height above the surface, the disk translates accordingly, always appearing directly beneath the hand. The collection of highlighted structures is updated continuously, so that the moving disk operates as a kind of selection spotlight.

The interaction subsystem of an embodiment further performs a mapping of the tracked hand's height above the table surface and the radius of the selection disk; the mapping is an inverse relationship, so that when the operator moves his hand closer to the table the disk's size is reduced. The maximum radius is chosen to provide a reasonable "overview" selection as the mode is initially engaged. The minimum radius, achieved when the operator's hand is in direct contact with the table surface, is chosen so as to make selection of an individual subsurface element more or less possible. In this way, the two of a single hand's translational degrees of freedom parallel to the display surface are mapped to domain-specific spatial degrees of freedom, while the third axis is mapped to what is notionally a "precision" or "specificity" parameter within the application.

Note that in this interaction there is no logical distinction made between hover and actual physical table contact (touch)—the system does not ascribe differential meaning to touch. However, the operator enjoys a specific physical advantage conferred by the possibility of full contact: the selection disk is at its smallest when the operator's finger is touching the table, which means that lateral hand motion produces the largest possible changes in selection (largest, that is, relative to disk size); however, the operator's finger gains substantial positional stability once in contact with the surface.

The operator may of course also drive the application bimanually, so that one hand undertakes hover-based element selection and the other is used to perform six degree-of-freedom manipulation of the forward perspective view. Alternately, two operators may cooperate, each using one hand.

Finally, the selection may be "locked" by tapping the table in the vicinity of the luminous disk with the second, non-disk-manipulating hand. This brief tapping activity does, in contrast, distinguish touch. With the selection state thus frozen, the original hand is free to move away from the table. In summary, then, the mechanism allows for planar selection of spatially distributed elements with a variable selection radius.

Naturally, other interaction maneuvers—to condition the application so that only electrical and gas fixtures are selected, for example—surround the core selection activity in an actual deployment. However, the embodiment is not so limited.

Spatial Operating Environment (SOE)

Figure 10:
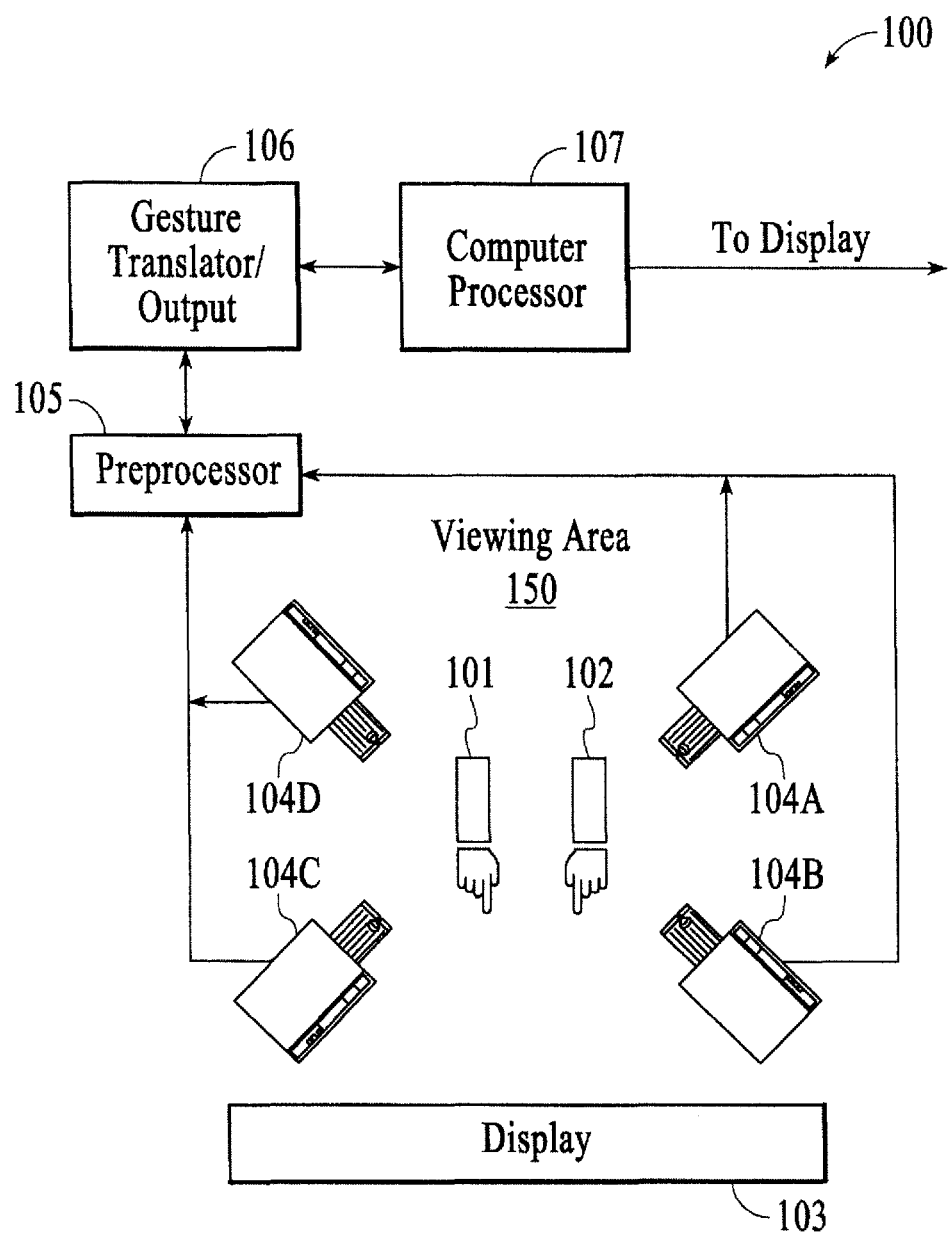
FIG. 10 is a block diagram of a gestural control system, under an embodiment.

Embodiments of a spatial-continuum input system are described herein in the context of a Spatial Operating Environment (SOE). As an example, FIG. 10 is a block diagram of a Spatial Operating Environment (SOE), under an embodiment. A user locates his hands 101 and 102 in the viewing area 150 of an array of cameras 104A-104D. The cameras detect location, orientation, and movement of the fingers and hands 101 and 102, as spatial tracking data, and generate output signals to pre-processor 105. Pre-processor 105 translates the camera output into a gesture signal that is provided to the computer processing unit 107 of the system. The computer 107 uses the input information to generate a command to control one or more on screen cursors and provides video output to display 103.

Although the system is shown with a single user's hands as input, the SOE 100 may be implemented using multiple users. In addition, instead of or in addition to hands, the system may track any part or parts of a user's body, including head, feet, legs, arms, elbows, knees, and the like.

In the embodiment shown, four cameras or sensors are used to detect the location, orientation, and movement of the user's hands 101 and 102 in the viewing area 150. It should be understood that the SOE 100 may include more (e.g., six cameras, eight cameras, etc.) or fewer (e.g., two cameras) cameras or sensors without departing from the scope or spirit of the SOE. In addition, although the cameras or sensors are disposed symmetrically in the example embodiment, there is no requirement of such symmetry in the SOE 100. Any number or positioning of cameras or sensors that permits the location, orientation, and movement of the user's hands may be used in the SOE 100.

In one embodiment, the cameras used are motion capture cameras capable of capturing grey-scale images. In one embodiment, the cameras used are those manufactured by Vicon, such as the Vicon MX40 camera. This camera includes on-camera processing and is capable of image capture at 1000 frames per second. A motion capture camera is capable of detecting and locating markers.

In the embodiment described, the cameras are sensors used for optical detection. In other embodiments, the cameras or other detectors may be used for electromagnetic, magnetostatic, RFID, or any other suitable type of detection.

Pre-processor 105 generates three dimensional space point reconstruction and skeletal point labeling. The gesture translator 106 converts the 3D spatial information and marker motion information into a command language that can be interpreted by a computer processor to update the location, shape, and action of a cursor on a display. In an alternate embodiment of the SOE 100, the pre-processor 105 and gesture translator 106 are integrated or combined into a single device.

Computer 107 may be any general purpose computer such as manufactured by Apple, Dell, or any other suitable manufacturer. The computer 107 runs applications and provides display output. Cursor information that would otherwise come from a mouse or other prior art input device now comes from the gesture system.

Marker Tags

The SOE or an embodiment contemplates the use of marker tags on one or more fingers of the user so that the system can locate the hands of the user, identify whether it is viewing a left or right hand, and which fingers are visible. This permits the system to detect the location, orientation, and movement of the user's hands. This information allows a number of gestures to be recognized by the system and used as commands by the user.

The marker tags in one embodiment are physical tags comprising a substrate (appropriate in the present embodiment for affixing to various locations on a human hand) and discrete markers arranged on the substrate's surface in unique identifying patterns.

The markers and the associated external sensing system may operate in any domain (optical, electromagnetic, magnetostatic, etc.) that allows the accurate, precise, and rapid and continuous acquisition of their three-space position. The markers themselves may operate either actively (e.g. by emitting structured electromagnetic pulses) or passively (e.g. by being optically retroreflective, as in the present embodiment).

At each frame of acquisition, the detection system receives the aggregate 'cloud' of recovered three-space locations comprising all markers from tags presently in the instrumented workspace volume (within the visible range of the cameras or other detectors). The markers on each tag are of sufficient multiplicity and are arranged in unique patterns such that the detection system can perform the following tasks: (1) segmentation, in which each recovered marker position is assigned to one and only one subcollection of points that form a single tag; (2) labelling, in which each segmented subcollection of points is identified as a particular tag; (3) location, in which the three-space position of the identified tag is recovered; and (4) orientation, in which the three-space orientation of the identified tag is recovered. Tasks (1) and (2) are made possible through the specific nature of the marker-patterns, as described below and as illustrated in one embodiment in FIG. 11.

The markers on the tags in one embodiment are affixed at a subset of regular grid locations. This underlying grid may, as in the present embodiment, be of the traditional Cartesian sort; or may instead be some other regular plane tessellation (a triangular/hexagonal tiling arrangement, for example). The scale and spacing of the grid is established with respect to the known spatial resolution of the marker-sensing system, so that adjacent grid locations are not likely to be confused. Selection of marker patterns for all tags should satisfy the following constraint: no tag's pattern shall coincide with that of any other tag's pattern through any combination of rotation, translation, or mirroring. The multiplicity and arrangement of markers may further be chosen so that loss (or occlusion) of some specified number of component markers is tolerated: After any arbitrary transformation, it should still be unlikely to confuse the compromised module with any other.

Figure 11:
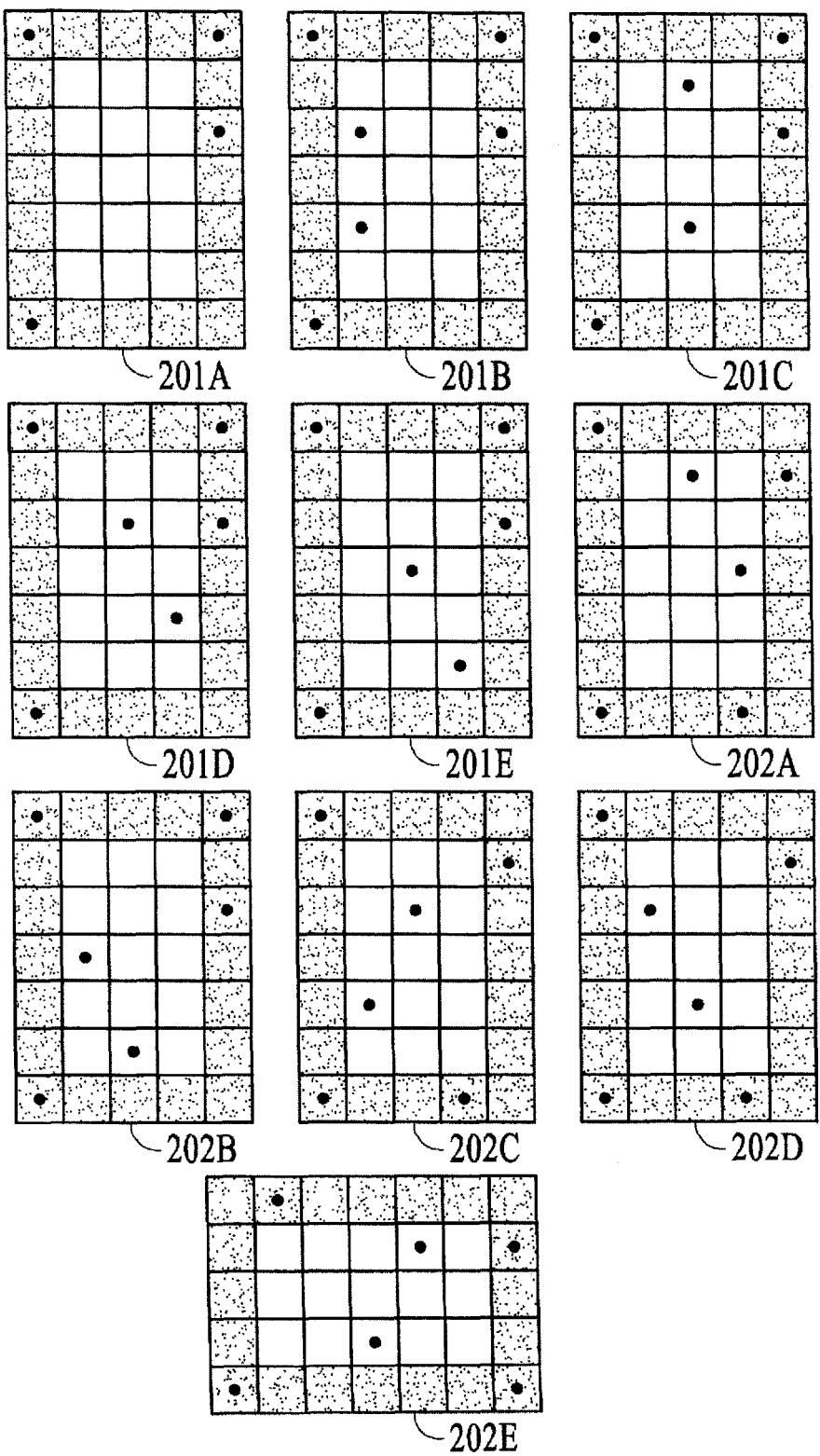
FIG. 11 is a diagram of marking tags, under an embodiment.

Referring now to FIG. 11, a number of tags 201A-201E (left hand) and 202A-202E (right hand) are shown. Each tag is rectangular and consists in this embodiment of a 5×7 grid array. The rectangular shape is chosen as an aid in determining orientation of the tag and to reduce the likelihood of mirror duplicates. In the embodiment shown, there are tags for each finger on each hand. In some embodiments, it may be adequate to use one, two, three, or four tags per hand. Each tag has a border of a different grey-scale or color shade. Within this border is a 3×5 grid array. Markers (represented by the black dots of FIG. 11) are disposed at certain points in the grid array to provide information.

Qualifying information may be encoded in the tags' marker patterns through segmentation of each pattern into 'common' and 'unique' subpatterns. For example, the present embodiment specifies two possible 'border patterns', distributions of markers about a rectangular boundary. A 'family' of tags is thus established—the tags intended for the left hand might thus all use the same border pattern as shown in tags 201A-201E while those attached to the right hand's fingers could be assigned a different pattern as shown in tags 202A-202E. This subpattern is chosen so that in all orientations of the tags, the left pattern can be distinguished from the right pattern. In the example illustrated, the left hand pattern includes a marker in each corner and on marker in a second from corner grid location. The right hand pattern has markers in only two corners and two markers in non corner grid locations. An inspection of the pattern reveals that as long as any three of the four markers are visible, the left hand pattern can be positively distinguished from the left hand pattern. In one embodiment, the color or shade of the border can also be used as an indicator of handedness.

Each tag must of course still employ a unique interior pattern, the markers distributed within its family's common border. In the embodiment shown, it has been found that two markers in the interior grid array are sufficient to uniquely identify each of the ten fingers with no duplication due to rotation or orientation of the fingers. Even if one of the markers is occluded, the combination of the pattern and the handedness of the tag yields a unique identifier.

In the present embodiment, the grid locations are visually present on the rigid substrate as an aid to the (manual) task of affixing each retroreflective marker at its intended location. These grids and the intended marker locations are literally printed via color inkjet printer onto the substrate, which here is a sheet of (initially) flexible 'shrink-film'. Each module is cut from the sheet and then oven-baked, during which thermal treatment each module undergoes a precise and repeatable shrinkage. For a brief interval following this procedure, the cooling tag may be shaped slightly—to follow the longitudinal curve of a finger, for example; thereafter, the substrate is suitably rigid, and markers may be affixed at the indicated grid points.

In one embodiment, the markers themselves are three dimensional, such as small reflective spheres affixed to the substrate via adhesive or some other appropriate means. The three-dimensionality of the markers can be an aid in detection and location over two dimensional markers. However either can be used without departing from the spirit and scope of the SOE described herein.

At present, tags are affixed via Velcro or other appropriate means to a glove worn by the operator or are alternately affixed directly to the operator's fingers using a mild double-stick tape. In a third embodiment, it is possible to dispense altogether with the rigid substrate and affix—or 'paint'— individual markers directly onto the operator's fingers and hands.

Gesture Vocabulary

The SOE of an embodiment contemplates a gesture vocabulary consisting of hand poses, orientation, hand combinations, and orientation blends. A notation language is also implemented for designing and communicating poses and gestures in the gesture vocabulary of the SOE. The gesture vocabulary is a system for representing instantaneous 'pose states' of kinematic linkages in compact textual form. The linkages in question may be biological (a human hand, for example; or an entire human body; or a grasshopper leg; or the articulated spine of a lemur) or may instead be nonbiological (e.g. a robotic arm). In any case, the linkage may be simple (the spine) or branching (the hand). The gesture vocabulary system of the SOE establishes for any specific linkage a constant length string; the aggregate of the specific ASCII characters occupying the string's 'character locations' is then a unique description of the instantaneous state, or 'pose', of the linkage.

Hand Poses

FIG. 12 illustrates hand poses in an embodiment of a gesture vocabulary of the SOE, under an embodiment. The SOE supposes that each of the five fingers on a hand is used. These fingers are codes as p-pinkie, r-ring finger, m-middle finger, i-index finger, and t-thumb. A number of poses for the fingers and thumbs are defined and illustrated in FIG. 12. A gesture vocabulary string establishes a single character position for each expressible degree of freedom in the linkage (in this case, a finger). Further, each such degree of freedom is understood to be discretized (or 'quantized'), so that its full range of motion can be expressed through assignment of one of a finite number of standard ASCII characters at that string position. These degrees of freedom are expressed with respect to a body-specific origin and coordinate system (the back of the hand, the center of the grasshopper's body; the base of the robotic arm; etc.). A small number of additional gesture vocabulary character positions are therefore used to express the position and orientation of the linkage 'as a whole' in the more global coordinate system.

Still referring to FIG. 12, a number of poses are defined and identified using ASCII characters. Some of the poses are divided between thumb and non-thumb. The SOE in this embodiment uses a coding such that the ASCII character itself is suggestive of the pose. However, any character may used to represent a pose, whether suggestive or not. In addition, there is no requirement in the embodiments to use ASCII characters for the notation strings. Any suitable symbol, numeral, or other representation maybe used without departing from the scope and spirit of the embodiments. For example, the notation may use two bits per finger if desired or some other number of bits as desired.

A curled finger is represented by the character "A" while a curled thumb by ">". A straight finger or thumb pointing up is indicated by "1" and at an angle by "\" or "/". "–" represents a thumb pointing straight sideways and "x" represents a thumb pointing into the plane.

Using these individual finger and thumb descriptions, a robust number of hand poses can be defined and written using the scheme of the embodiments. Each pose is represented by five characters with the order being p-r-m-i-t as described above. FIG. 12 illustrates a number of poses and a few are described here by way of illustration and example. The hand held flat and parallel to the ground is represented by "11111". A first is represented by "^^^^>". An "OK" sign is represented by "111^>".

The character strings provide the opportunity for straightforward 'human readability' when using suggestive characters. The set of possible characters that describe each degree of freedom may generally be chosen with an eye to quick recognition and evident analogy. For example, a vertical bar ('|') would likely mean that a linkage element is 'straight', an ell ('L') might mean a ninety-degree bend, and a circumflex ('^') could indicate a sharp bend. As noted above, any characters or coding may be used as desired.

Any system employing gesture vocabulary strings such as described herein enjoys the benefit of the high computational efficiency of string comparison—identification of or search for any specified pose literally becomes a 'string compare' (e.g. UNIX's 'strcmp( )' function) between the desired pose string and the instantaneous actual string. Furthermore, the use of 'wildcard characters' provides the programmer or system designer with additional familiar efficiency and efficacy: degrees of freedom whose instantaneous state is irrelevant for a match may be specified as an interrogation point ('?'); additional wildcard meanings may be assigned.

Orientation

In addition to the pose of the fingers and thumb, the orientation of the hand can represent information. Characters describing global-space orientations can also be chosen transparently: the characters '<', '>', '^', and 'v' may be used to indicate, when encountered in an orientation character position, the ideas of left, right, up, and down. FIG. 13 illustrates hand orientation descriptors and examples of coding that combines pose and orientation. In an embodiment, two character positions specify first the direction of the palm and then the direction of the fingers (if they were straight, irrespective of the fingers' actual bends). The possible characters for these two positions express a 'body-centric' notion of orientation: '-', '+', 'x', '*', '^', and 'v' describe medial, lateral, anterior (forward, away from body), posterior (backward, away from body), cranial (upward), and caudal (downward).

In the notation scheme of an embodiment, the five finger pose indicating characters are followed by a colon and then two orientation characters to define a complete command pose. In one embodiment, a start position is referred to as an "xyz" pose where the thumb is pointing straight up, the index finger is pointing forward and the middle finger is perpendicular to the index finger, pointing to the left when the pose is made with the right hand. This is represented by the string "^^x1-:-x".

'XYZ-hand' is a technique for exploiting the geometry of the human hand to allow full six-degree-of-freedom navigation of visually presented three-dimensional structure. Although the technique depends only on the bulk translation and rotation of the operator's hand—so that its fingers may in principal be held in any pose desired—the present embodiment prefers a static configuration in which the index finger points away from the body; the thumb points toward the ceiling; and the middle finger points left-right. The three fingers thus describe (roughly, but with clearly evident intent) the three mutually orthogonal axes of a three-space coordinate system: thus 'XYZ-hand'.

XYZ-hand navigation then proceeds with the hand, fingers in a pose as described above, held before the operator's body at a predetermined 'neutral location'. Access to the three translational and three rotational degrees of freedom of a three-space object (or camera) is effected in the following natural way: left-right movement of the hand (with respect to the body's natural coordinate system) results in movement along the computational context's x-axis; up-down movement of the hand results in movement along the controlled context's y-axis; and forward-back hand movement (toward/away from the operator's body) results in z-axis motion within the context. Similarly, rotation of the operator's hand about the index finger leads to a 'roll' change of the computational context's orientation; 'pitch' and 'yaw' changes are effected analogously, through rotation of the operator's hand about the middle finger and thumb, respectively.

Note that while 'computational context' is used here to refer to the entity being controlled by the XYZ-hand method—and seems to suggest either a synthetic three-space object or camera—it should be understood that the technique is equally useful for controlling the various degrees of freedom of real-world objects: the pan/tilt/roll controls of a video or motion picture camera equipped with appropriate rotational actuators, for example. Further, the physical degrees of freedom afforded by the XYZ-hand posture may be somewhat less literally mapped even in a virtual domain: In the present embodiment, the XYZ-hand is also used to provide navigational access to large panoramic display images, so that left-right and up-down motions of the operator's hand lead to the expected left-right or up-down 'panning' about the image, but forward-back motion of the operator's hand maps to 'zooming' control.

In every case, coupling between the motion of the hand and the induced computational translation/rotation may be either direct (i.e. a positional or rotational offset of the operator's hand maps one-to-one, via some linear or non-linear function, to a positional or rotational offset of the object or camera in the computational context) or indirect (i.e. positional or rotational offset of the operator's hand maps one-to-one, via some linear or nonlinear function, to a first or higher-degree derivative of position/orientation in the computational context; ongoing integration then effects a non-static change in the computational context's actual zero-order position/orientation). This latter means of control is analogous to use of a an automobile's 'gas pedal', in which a constant offset of the pedal leads, more or less, to a constant vehicle speed.

The 'neutral location' that serves as the real-world XYZ-hand's local six-degree-of-freedom coordinate origin may be established (1) as an absolute position and orientation in space (relative, say, to the enclosing room); (2) as a fixed position and orientation relative to the operator herself (e.g. eight inches in front of the body, ten inches below the chin, and laterally in line with the shoulder plane), irrespective of the overall position and 'heading' of the operator; or (3) interactively, through deliberate secondary action of the operator (using, for example, a gestural command enacted by the operator's 'other' hand, said command indicating that the XYZ-hand's present position and orientation should henceforth be used as the translational and rotational origin).

It is further convenient to provide a 'detent' region (or 'dead zone') about the XYZ-hand's neutral location, such that movements within this volume do not map to movements in the controlled context.

Other poses may included:

[||||:vx] is a flat hand (thumb parallel to fingers) with palm facing down and fingers forward.

[||||:x^] is a flat hand with palm facing forward and fingers toward ceiling.

[||||:-x] is a flat hand with palm facing toward the center of the body (right if left hand, left if right hand) and fingers forward.

[^^^^-:-x] is a single-hand thumbs-up (with thumb pointing toward ceiling).

[^^^|-:-x] is a mime gun pointing forward.

Two Hand Combination

The SOE of an embodiment contemplates single hand commands and poses, as well as two-handed commands and poses. FIG. 14 illustrates examples of two hand combinations and associated notation in an embodiment of the SOE. Reviewing the notation of the first example, "full stop" reveals that it comprises two closed fists. The "snapshot" example has the thumb and index finger of each hand extended, thumbs pointing toward each other, defining a goal post shaped frame. The "rudder and throttle start position" is fingers and thumbs pointing up palms facing the screen.

Orientation Blends

Figures 15, 16:
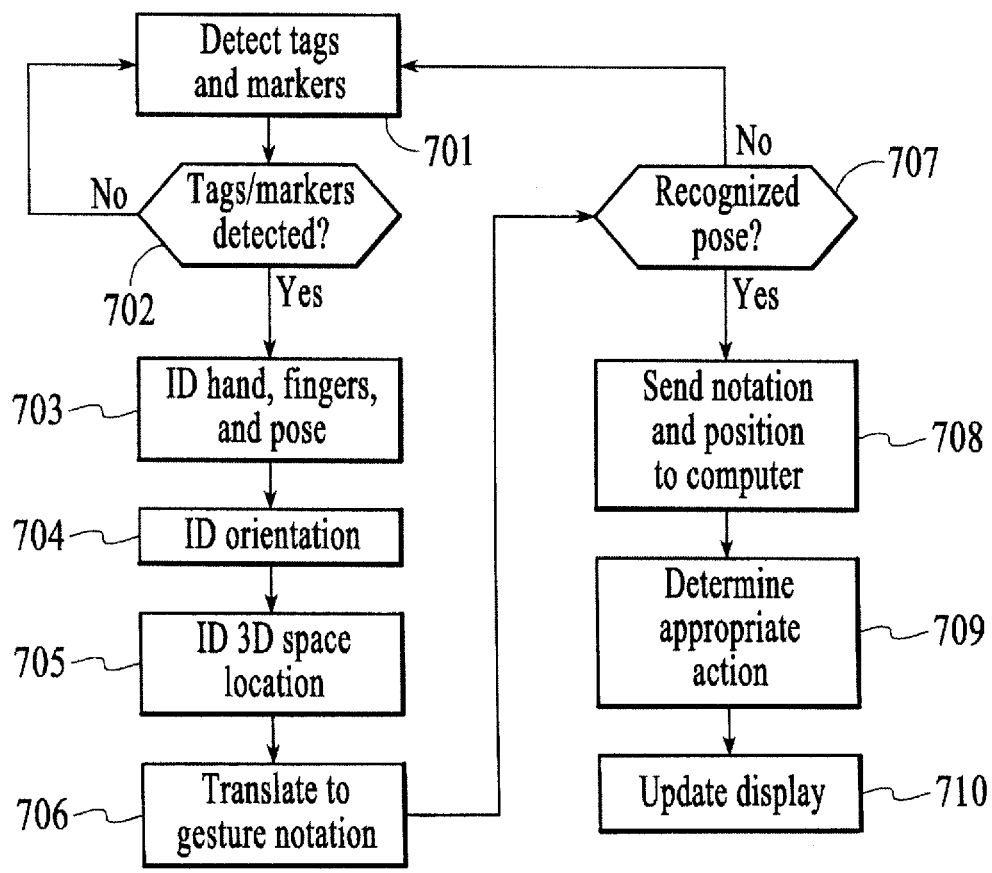
FIG. 15 is a diagram of orientation blends in a gesture vocabulary, under an embodiment.
FIG. 16 is a flow diagram of system operation, under an embodiment.

FIG. 15 illustrates an example of an orientation blend in an embodiment of the SOE. In the example shown the blend is represented by enclosing pairs of orientation notations in parentheses after the finger pose string. For example, the first command shows finger positions of all pointing straight. The first pair of orientation commands would result in the palms being flat toward the display and the second pair has the hands rotating to a 45 degree pitch toward the screen. Although pairs of blends are shown in this example, any number of blends is contemplated in the SOE.

Example Commands

FIG. 17A and FIG. 17B illustrate a number of possible commands that may be used with the SOE. Although some of the discussion here has been about controlling a cursor on a display, the SOE is not limited to that activity. In fact, the SOE has great application in manipulating any and all data and portions of data on a screen, as well as the state of the display. For example, the commands may be used to take the place of video controls during play back of video media. The commands may be used to pause, fast forward, rewind, and the like. In addition, commands may be implemented to zoom in or zoom out of an image, to change the orientation of an image, to pan in any direction, and the like. The SOE may also be used in lieu of menu commands such as open, close, save, and the like. In other words, any commands or activity that can be imagined can be implemented with hand gestures.

Operation

FIG. 16 is a flow diagram illustrating the operation of the SOE in one embodiment. At 701 the detection system detects the markers and tags. At 702 it is determined if the tags and markers are detected. If not, the system returns to 701. If the tags and markers are detected at 702, the system proceeds to 703. At 703 the system identifies the hand, fingers and pose from the detected tags and markers. At 704 the system identifies the orientation of the pose. At 705 the system identifies the three dimensional spatial location of the hand or hands that are detected. (Please note that any or all of 703, 704, and 705 may be combined).

At 706 the information is translated to the gesture notation described above. At 707 it is determined if the pose is valid. This may be accomplished via a simple string comparison using the generated notation string. If the pose is not valid, the system returns to 701. If the pose is valid, the system sends the notation and position information to the computer at 708. At 709 the computer determines the appropriate action to take in response to the gesture and updates the display accordingly at 710.

In one embodiment of the SOE, 701-705 are accomplished by the on-camera processor. In other embodiments, the processing can be accomplished by the system computer if desired.

Parsing and Translation

The system is able to "parse" and "translate" a stream of low-level gestures recovered by an underlying system, and turn those parsed and translated gestures into a stream of command or event data that can be used to control a broad range of computer applications and systems. These techniques and algorithms may be embodied in a system consisting of computer code that provides both an engine implementing these techniques and a platform for building computer applications that make use of the engine's capabilities.

One embodiment is focused on enabling rich gestural use of human hands in computer interfaces, but is also able to recognize gestures made by other body parts (including, but not limited to arms, torso, legs and the head), as well as non-hand physical tools of various kinds, both static and articulating, including but not limited to calipers, compasses, flexible curve approximators, and pointing devices of various shapes. The markers and tags may be applied to items and tools that may be carried and used by the operator as desired.

The system described here incorporates a number of innovations that make it possible to build gestural systems that are rich in the range of gestures that can be recognized and acted upon, while at the same time providing for easy integration into applications.

The gestural parsing and translation system in one embodiment comprises:

1) a compact and efficient way to specify (encode for use in computer programs) gestures at several different levels of aggregation:

a. a single hand's "pose" (the configuration and orientation of the parts of the hand relative to one another) a single hand's orientation and position in three-dimensional space.

b. two-handed combinations, for either hand taking into account pose, position or both.

c. multi-person combinations; the system can track more than two hands, and so more than one person can cooperatively (or competitively, in the case of game applications) control the target system.

d. sequential gestures in which poses are combined in a series; we call these "animating" gestures.

e. "grapheme" gestures, in which the operator traces shapes in space.

2) a programmatic technique for registering specific gestures from each category above that are relevant to a given application context.

3) algorithms for parsing the gesture stream so that registered gestures can be identified and events encapsulating those gestures can be delivered to relevant application contexts.

The specification system (1), with constituent elements (1a) to (1f), provides the basis for making use of the gestural parsing and translating capabilities of the system described here.

A single-hand "pose" is represented as a string of i) relative orientations between the fingers and the back of the hand, ii) quantized into a small number of discrete states.

Using relative joint orientations allows the system described here to avoid problems associated with differing hand sizes and geometries. No "operator calibration" is required with this system. In addition, specifying poses as a string or collection of relative orientations allows more complex gesture specifications to be easily created by combining pose representations with further filters and specifications.

Using a small number of discrete states for pose specification makes it possible to specify poses compactly as well as to ensure accurate pose recognition using a variety of underlying tracking technologies (for example, passive optical tracking using cameras, active optical tracking using lighted dots and cameras, electromagnetic field tracking, etc).

Gestures in every category (1a) to (1f) may be partially (or minimally) specified, so that non-critical data is ignored. For example, a gesture in which the position of two fingers is definitive, and other finger positions are unimportant, may be represented by a single specification in which the operative positions of the two relevant fingers is given and, within the same string, "wild cards" or generic "ignore these" indicators are listed for the other fingers.

All of the innovations described here for gesture recognition, including but not limited to the multi-layered specification technique, use of relative orientations, quantization of data, and allowance for partial or minimal specification at every level, generalize beyond specification of hand gestures to specification of gestures using other body parts and "manufactured" tools and objects.

The programmatic techniques for "registering gestures" (2), consist of a defined set of Application Programming Interface calls that allow a programmer to define which gestures the engine should make available to other parts of the running system.

These API routines may be used at application set-up time, creating a static interface definition that is used throughout the lifetime of the running application. They may also be used during the course of the run, allowing the interface characteristics to change on the fly. This real-time alteration of the interface makes it possible to, i) build complex contextual and conditional control states,
  ii) to dynamically add hysterisis to the control environment, and
  iii) to create applications in which the user is able to alter or extend the interface vocabulary of the running system itself.

Algorithms for parsing the gesture stream (3) compare gestures specified as in (1) and registered as in (2) against incoming low-level gesture data. When a match for a registered gesture is recognized, event data representing the matched gesture is delivered up the stack to running applications.

Efficient real-time matching is desired in the design of this system, and specified gestures are treated as a tree of possibilities that are processed as quickly as possible.

In addition, the primitive comparison operators used internally to recognize specified gestures are also exposed for the applications programmer to use, so that further comparison (flexible state inspection in complex or compound gestures, for example) can happen even from within application contexts.

Recognition "locking" semantics are an innovation of the system described here. These semantics are implied by the registration API (2) (and, to a lesser extent, embedded within the specification vocabulary (1)). Registration API calls include, i) "entry" state notifiers and "continuation" state notifiers, and
  ii) gesture priority specifiers.

If a gesture has been recognized, its "continuation" conditions take precedence over all "entry" conditions for gestures of the same or lower priorities. This distinction between entry and continuation states adds significantly to perceived system usability.

The system described here includes algorithms for robust operation in the face of real-world data error and uncertainty. Data from low-level tracking systems may be incomplete (for a variety of reasons, including occlusion of markers in optical tracking, network drop-out or processing lag, etc).

Missing data is marked by the parsing system, and interpolated into either "last known" or "most likely" states, depending on the amount and context of the missing data.

If data about a particular gesture component (for example, the orientation of a particular joint) is missing, but the "last known" state of that particular component can be analyzed as physically possible, the system uses this last known state in its real-time matching.

Conversely, if the last known state is analyzed as physically impossible, the system falls back to a "best guess range" for the component, and uses this synthetic data in its real-time matching.

The specification and parsing systems described here have been carefully designed to support "handedness agnosticism," so that for multi-hand gestures either hand is permitted to satisfy pose requirements.

Navigating Data Space

The SOE of an embodiment enables 'pushback', a linear spatial motion of a human operator's hand, or performance of analogously dimensional activity, to control linear verging or trucking motion through a graphical or other data-representational space. The SOE, and the computational and cognitive association established by it, provides a fundamental, structured way to navigate levels of scale, to traverse a principally linear 'depth dimension', or—most generally—to access quantized or 'detented' parameter spaces. The SOE also provides an effective means by which an operator may volitionally acquire additional context: a rapid technique for understanding vicinities and neighborhoods, whether spatial, conceptual, or computational.

In certain embodiments, the pushback technique may employ traditional input devices (e.g. mouse, trackball, integrated sliders or knobs) or may depend on tagged or tracked objects external to the operator's own person (e.g. instrumented kinematic linkages, magnetostatically tracked 'input bricks'). In other alternative embodiments, a pushback implementation may suffice as the whole of a control system.

The SOE of an embodiment is a component of and integrated into a larger spatial interaction system that supplants customary mouse-based graphical user interface ('WIMP' UI) methods for control of a computer, comprising instead (a) physical sensors that can track one or more types of object (e.g., human hands, objects on human hands, inanimate objects, etc.); (b) an analysis component for analyzing the evolving position, orientation, and pose of the sensed hands into a sequence of gestural events; (c) a descriptive scheme for representing such spatial and gestural events; (d) a framework for distributing such events to and within control programs; (e) methods for synchronizing the human intent (the commands) encoded by the stream of gestural events with graphical, aural, and other display-modal depictions of both the event stream itself and of the application-specific consequences of event interpretation, all of which are described in detail below. In such an embodiment, the pushback system is integrated with additional spatial and gestural input-and-interface techniques.

Generally, the navigation of a data space comprises detecting a gesture of a body from gesture data received via a detector. The gesture data is absolute three-space location data of an instantaneous state of the body at a point in time and physical space. The detecting comprises identifying the gesture using the gesture data. The navigating comprises translating the gesture to a gesture signal, and navigating through the data space in response to the gesture signal. The data space is a data-representational space comprising a dataset represented in the physical space.

When an embodiment's overall round-trip latency (hand motion to sensors to pose analysis to pushback interpretation system to computer graphics rendering to display device back to operator's visual system) is kept low (e.g., an embodiment exhibits latency of approximately fifteen milliseconds) and when other parameters of the system are properly tuned, the perceptual consequence of pushback interaction is a distinct sense of physical causality: the SOE literalizes the physically resonant metaphor of pushing against a spring-loaded structure. The perceived causality is a highly effective feedback; along with other more abstract graphical feedback modalities provided by the pushback system, and with a deliberate suppression of certain degrees of freedom in the interpretation of operator movement, such feedback in turn permits stable, reliable, and repeatable use of both gross and fine human motor activity as a control mechanism.

In evaluating the context of the SOE, many datasets are inherently spatial: they represent phenomena, events, measurements, observations, or structure within a literal physical space. For other datasets that are more abstract or that encode literal yet non-spatial information, it is often desirable to prepare a representation (visual, aural, or involving other display modalities) some fundamental aspect of which is controlled by a single, scalar-valued parameter; associating that parameter with a spatial dimension is then frequently also beneficial. It is manipulation of this single scalar parameter, as is detailed below, which benefits from manipulation by means of the pushback mechanism.

Representations may further privilege a small plurality of discrete values of their parameter—indeed, sometimes only one—at which the dataset is optimally regarded. In such cases it is useful to speak of a 'detented parameter' or, if the parameter has been explicitly mapped onto one dimension of a representational space, of 'detented space'. Use of the term 'detented' herein is intended to evoke not only the preferential quantization of the parameter but also the visuo-haptic sensation of ratchets, magnetic alignment mechanisms, jog-shuttle wheels, and the wealth of other worldly devices that are possessed of deliberate mechanical detents.

Self-evident yet crucially important examples of such parameters include but are not limited to (1) the distance of a synthetic camera, in a computer graphics environment, from a renderable representation of a dataset; (2) the density at which data is sampled from the original dataset and converted into renderable form; (3) the temporal index at which samples are retrieved from a time-varying dataset and converted to a renderable representation. These are universal approaches; countless domain-specific parameterizations also exist.

The pushback of the SOE generally aligns the dataset's parameter-control axis with a locally relevant 'depth dimension' in physical space, and allows structured real-world motion along the depth dimension to effect a data-space translation along the control axis. The result is a highly efficient means for navigating a parameter space. Following are detailed descriptions of representative embodiments of the pushback as implemented in the SOE.

In a pushback example, an operator stands at a comfortable distance before a large wall display on which appears a single 'data frame' comprising text and imagery, which graphical data elements may be static or dynamic. The data frame, for example, can include an image, but is not so limited. The data frame, itself a two-dimensional construct, is nonetheless resident in a three-dimensional computer graphics rendering environment whose underlying coordinate system has been arranged to coincide with real-world coordinates convenient for describing the room and its contents, including the display and the operator.

The operator's hands are tracked by sensors that resolve the position and orientation of her fingers, and possibly of the overall hand masses, to high precision and at a high temporal rate; the system analyzes the resulting spatial data in order to characterize the 'pose' of each hand—i.e. the geometric disposition of the fingers relative to each other and to the hand mass. While this example embodiment tracks an object that is a human hand(s), numerous other objects could be tracked as input devices in alternative embodiments. One example is a one-sided pushback scenario in which the body is an operator's hand in the open position, palm facing in a forward direction (along the z-axis) (e.g., toward a display screen in front of the operator). For the purposes of this description, the wall display is taken to occupy the x and y dimensions; z describes the dimension between the operator and the display. The gestural interaction space associated with this pushback embodiment comprises two spaces abutted at a plane of constant z; the detented interval space farther from the display (i.e. closer to the operator) is termed the 'dead zone', while the closer half-space is the 'active zone'. The dead zone extends indefinitely in the backward direction (toward the operator and away from the display) but only a finite distance forward, ending at the dead zone threshold. The active zone extends from the dead zone threshold forward to the display. The data frame(s) rendered on the display are interactively controlled or "pushed back" by movements of the body in the active zone.

The data frame is constructed at a size and aspect ratio precisely matching those of the display, and is positioned and oriented so that its center and normal vector coincide with those physical attributes of the display, although the embodiment is not so limited. The virtual camera used to render the scene is located directly forward from the display and at roughly the distance of the operator. In this context, the rendered frame thus precisely fills the display.

Arranged logically to the left and right of the visible frame are a number of additional coplanar data frames, uniformly spaced and with a modest gap separating each from its immediate neighbors. Because they lie outside the physical/virtual rendering bounds of the computer graphics rendering geometry, these laterally displaced adjacent data frames are not initially visible. As will be seen, the data space—given its geometric structure—is possessed of a single natural detent in the z-direction and a plurality of x-detents.

The operator raises her left hand, held in a loose first pose, to her shoulder. She then extends the fingers so that they point upward and the thumb so that it points to the right; her palm faces the screen (in the gestural description language described in detail below, this pose transition would be expressed as [^^^>:x^ into ||||-:x^]). The system, detecting the new pose, triggers pushback interaction and immediately records the absolute three-space hand position at which the pose was first entered: this position is used as the 'origin' from which subsequent hand motions will be reported as relative offsets.

Immediately, two concentric, partially transparent glyphs are superimposed on the center of the frame (and thus at the display's center). For example, the glyphs can indicate body pushback gestures in the dead zone up to a point of the dead zone threshold. That the second glyph is smaller than the first glyph is an indication that the operator's hand resides in the dead zone, through which the pushback operation is not 'yet' engaged. As the operator moves her hand forward (toward the dead zone threshold and the display), the second glyph incrementally grows. The second glyph is equivalent in size to the first glyph at the point at which the operator's hand is at the dead zone threshold. The glyphs of this example describe the evolution of the glyph's concentric elements as the operator's hand travels forward from its starting position toward the dead zone threshold separating the dead zone from the active zone. The inner "toothy" part of the glyph, for example, grows as the hand nears the threshold, and is arranged so that the radius of the inner glyph and (static) outer glyph precisely match as the hand reaches the threshold position.

The second glyph shrinks in size inside the first glyph as the operator moves her hand away from the dead zone threshold and away from the display, remaining however always concentric with the first glyph and centered on the display. Crucially, only the z-component of the operator's hand motion is mapped into the glyph's scaling; incidental x- and y-components of the hand motion make no contribution.

When the operator's hand traverses the forward threshold of the dead zone, crossing into the active zone, the pushback mechanism is engaged. The relative z-position of the hand (measured from the threshold) is subjected to a scaling function and the resulting value is used to effect a z-axis displacement of the data frame and its lateral neighbors, so that the rendered image of the frame is seen to recede from the display; the neighboring data frames also then become visible, 'filling in' from the edges of the display space—the constant angular subtent of the synthetic camera geometrically 'captures' more of the plane in which the frames lie as that plane moves away from the camera. The z-displacement is continuously updated, so that the operator, pushing her hand toward the display and pulling it back toward herself, perceives the lateral collection of frames receding and verging in direct response to her movements As an example of a first relative z-axis displacement of the data frame resulting from corresponding pushback, the rendered image of the data frame is seen to recede from the display and the neighboring data frames become visible, 'filling in' from the edges of the display space. The neighboring data frames, which include a number of additional coplanar data frames, are arranged logically to the left and right of the visible frame, uniformly spaced and with a modest gap separating each from its immediate neighbors. As an example of a second relative z-axis displacement of the data frame resulting from corresponding pushback, and considering the first relative z-axis displacement, and assuming further pushing of the operator's hand (pushing further along the z-axis toward the display and away from the operator) from that pushing resulting in the first relative z-axis displacement, the rendered image of the frame is seen to further recede from the display so that additional neighboring data frames become visible, further 'filling in' from the edges of the display space.

The paired concentric glyphs, meanwhile, now exhibit a modified feedback: with the operator's hand in the active zone, the second glyph switches from scaling-based reaction to a rotational reaction in which the hand's physical z-axis offset from the threshold is mapped into a positive (in-plane) angular offset. In an example of the glyphs indicating body pushback gestures in the dead zone beyond the point of the dead zone threshold (along the z-axis toward the display and away from the operator), the glyphs depict the evolution of the glyph once the operator's hand has crossed the dead zone threshold—i.e. when the pushback mechanism has been actively engaged. The operator's hand movements toward and away from the display are thus visually indicated by clockwise and anticlockwise rotation of the second glyph (with the first glyph, as before, providing a static reference state), such that the "toothy" element of the glyph rotates as a linear function of the hand's offset from the threshold, turning linear motion into a rotational representation.

Therefore, in this example, an additional first increment of hand movement along the z-axis toward the display is visually indicated by an incremental clockwise rotation of the second glyph (with the first glyph, as before, providing a static reference state), such that the "toothy" element of the glyph rotates a first amount corresponding to a linear function of the hand's offset from the threshold. An additional second increment of hand movement along the z-axis toward the display is visually indicated by an incremental clockwise rotation of the second glyph (with the first glyph, as before, providing a static reference state), such that the "toothy" element of the glyph rotates a second amount corresponding to a linear function of the hand's offset from the threshold. Further, a third increment of hand movement along the z-axis toward the display is visually indicated by an incremental clockwise rotation of the second glyph (with the first glyph, as before, providing a static reference state), such that the "toothy" element of the glyph rotates a third amount corresponding to a linear function of the hand's offset from the threshold.

In this sample application, a secondary dimensional sensitivity is engaged when the operator's hand is in the active zone: lateral (x-axis) motion of the hand is mapped, again through a possible scaling function, to x-displacement of the horizontal frame sequence. If the scaling function is positive, the effect is one of positional 'following' of the operator's hand, and she perceives that she is sliding the frames left and right. As an example of a lateral x-axis displacement of the data frame resulting from lateral motion of the body, the data frames slide from left to right such that particular data frames disappear or partially disappear from view via the left edge of the display space while additional data frames fill in from the right edge of the display space.

Finally, when the operator causes her hand to exit the palm-forward pose (by, e.g., closing the hand into a fist), the pushback interaction is terminated and the collection of frames is rapidly returned to its original z-detent (i.e. coplanar with the display). Simultaneously, the frame collection is laterally adjusted to achieve x-coincidence of a single frame with the display; which frame ends thus 'display-centered' is whichever was closest to the concentric glyphs' center at the instant of pushback termination: the nearest x-detent. The glyph structure is here seen serving a second function, as a selection reticle, but the embodiment is not so limited. The z- and x-positions of the frame collection are typically allowed to progress to their final display-coincident values over a short time interval in order to provide a visual sense of 'spring-loaded return'.

The pushback system as deployed in this example provides efficient control modalities for (1) acquiring cognitively valuable 'neighborhood context' by variably displacing an aggregate dataset along the direct visual sightline—the depth dimension—thereby bringing more of the dataset into view (in exchange for diminishing the angular subtent of any given part of the dataset); (2) acquiring neighborhood context by variably displacing the laterally-arrayed dataset along its natural horizontal dimension, maintaining the angular subtent of any given section of data but trading the visibility of old data for that of new data, in the familiar sense of 'scrolling'; (3) selecting discretized elements of the dataset through rapid and dimensionally-constrained navigation.

In another example of the pushback of an embodiment, an operator stands immediately next to a waist-level display device whose active surface lies in a horizontal plane parallel to the floor. The coordinate system is here established in a way consistent with that of the previous example: the display surface lies in the x-z plane, so that the y-axis, representing the normal to the surface, is aligned in opposition to the physical gravity vector.

In an example physical scenario in which the body is held horizontally above a table-like display surface, the body is an operator's hand, but the embodiment is not so limited. The pushback interaction is double-sided, so that there is an upper dead zone threshold and a lower dead zone threshold. Additionally, the linear space accessed by the pushback maneuver is provided with discrete spatial detents (e.g., "$1^{st}$ detent", "$2^{nd}$ detent", "$3^{rd}$ detent", "$4^{th}$ detent") in the upper active zone, and discrete spatial detents (e.g., "$1^{st}$ detent", "$2^{nd}$ detent", "$3^{rd}$ detent", "$4^{th}$ detent") in the lower active zone. The interaction space of an embodiment is configured so that a relatively small dead zone comprising an upper dead zone and a lower dead zone is centered at the vertical (y-axis) position at which pushback is engaged, with an active zone above the dead zone and an active zone below the dead zone.

The operator is working with an example dataset that has been analyzed into a stack of discrete parallel planes that are the data frames. The dataset may be arranged that way as a natural consequence of the physical reality it represents (e.g. discrete slices from a tomographic scan, the multiple layers of a three-dimensional integrated circuit, etc.) or because it is logical or informative to separate and discretize the data (e.g., satellite imagery acquired in a number of spectral bands, geographically organized census data with each decade's data in a separate layer, etc.). The visual representation of the data may further be static or include dynamic elements.

During intervals when pushback functionality is not engaged, a single layer is considered 'current' and is represented with visual prominence by the display, and is perceived to be physically coincident with the display. Layers above and below the current layer are in this example not visually manifest (although a compact iconography is used to indicate their presence).

The operator extends his closed right hand over the display; when he opens the hand—fingers extended forward, thumb to the left, and palm pointed downward (transition: [^^^>:vx into ||||-:vx])—the pushback system is engaged. During a brief interval (e.g., 200 milliseconds), some number of layers adjacent to the current layer fade up with differential visibility; each is composited below or above with a blur filter and a transparency whose 'severities' are dependent on the layer's ordinal distance from the current layer.

For example, a layer (e.g., data frame) adjacent to the current layer (e.g., data frame) fades up with differential visibility as the pushback system is engaged. In this example, the stack comprises numerous data frames (any number as appropriate to datasets of the data frames) that can be traversed using the pushback system.

Simultaneously, the concentric feedback glyphs familiar from the previous example appear; in this case, the interaction is configured so that a small dead zone is centered at the vertical (y-axis) position at which pushback is engaged, with an active zone both above and below the dead zone. This arrangement provides assistance in 'regaining' the original layer. The glyphs are in this case accompanied by an additional, simple graphic that indicates directed proximity to successive layers.

While the operator's hand remains in the dead zone, no displacement of the layer stack occurs. The glyphs exhibit a 'preparatory' behavior identical to that in the preceding example, with the inner glyph growing as the hand nears either boundary of the zone (of course, here the behavior is double-sided and symmetric: the inner glyph is at a minimum scale at the hand's starting y-position and grows toward coincidence with the outer glyph whether the hand moves up or down).

As the operator's hand moves upward past the dead zone's upper plane, the inner glyph engages the outer glyph and, as before, further movement of the hand in that direction causes anticlockwise rotational motion of the inner glyph. At the same time, the layer stack begins to 'translate upward': those layers above the originally-current layer take on greater transparency and blur; the originally-current layer itself becomes more transparent and more blurred; and the layers below it move toward more visibility and less blur.

In another example of upward translation of the stack, the previously-current layer takes on greater transparency (becomes invisible in this example), while the layer adjacent to the previously-current layer becomes visible as the presently-current layer. Additionally, layer adjacent to the presently-current layer fades up with differential visibility as the stack translates upward. As described above, the stack comprises numerous data frames (any number as appropriate to datasets of the data frames) that can be traversed using the pushback system.

The layer stack is configured with a mapping between real-world distances (i.e. the displacement of the operator's hand from its initial position, as measured in room coordinates) and the 'logical' distance between successive layers. The translation of the layer stack is, of course, the result of this mapping, as is the instantaneous appearance of the proximity graphic, which meanwhile indicates (at first) a growing distance between the display plane and the current layer; it also indicates that the display plane is at present below the current layer.

The hand's motion continues and the layer stack eventually passes the position at which the current layer and the next one below exactly straddle (i.e. are equidistant from) the display plane; just past this point the proximity graphic changes to indicate that the display plane is now higher than the current layer: 'current layer status' has now been assigned to the next lower layer. In general, the current layer is always the one closest to the physical display plane, and is the one that will be 'selected' when the operator disengages the pushback system.

As the operator continues to raise his hand, each consecutive layer is brought toward the display plane, becoming progressively more resolved, gaining momentary coincidence with the display plane, and then returning toward transparency and blur in favor of the next lower layer. When the operator reverses the direction of his hand's motion, lowering it, the process is reversed, and the inner glyph rotates clockwise. As the hand eventually passes through the dead zone the stack halts with the originally-current layer in precise y-alignment with the display plane; and then y-travel of the stack resumes, bringing into successive focus those planes above the originally-current layer. The operator's overall perception is strongly and simply that he is using his hand to push down and pull up a stack of layers.

When at last the operator releases pushback by closing his hand (or otherwise changing its pose) the system 'springs' the stack into detented y-axis alignment with the display plane, leaving as the current layer whichever was closest to the display plane as pushback was exited. During the brief interval of this positional realignment, all other layers fade back to complete transparency and the feedback glyphs smoothly vanish.

The discretized elements of the dataset (here, layers) of this example are distributed along the principal pushback (depth) axis; previously, the elements (data frames) were coplanar and arrayed laterally, along a dimension orthogonal to the depth axis. This present arrangement, along with the deployment of transparency techniques, means that data is often superimposed—some layers are viewed through others. The operator in this example nevertheless also enjoys (1) a facility for rapidly gaining neighborhood context (what are the contents of the layers above and below the current layer?); and (2) a facility for efficiently selecting and switching among parallel, stacked elements in the dataset. When the operator intends (1) alone, the provision of a dead zone allows him to return confidently to the originally selected layer. Throughout the manipulation, the suppression of two translational dimensions enables speed and accuracy (it is comparatively difficult for most humans to translate a hand vertically with no lateral drift, but the modality as described simply ignores any such lateral displacement).

It is noted that for certain purposes it may be convenient to configure the pushback input space so that the dead zone is of infinitesimal extent; then, as soon as pushback is engaged, its active mechanisms are also engaged. In the second example presented herein this would mean that the originally—current layer is treated no differently—once the pushback maneuver has begun—from any other. Empirically, the linear extent of the dead zone is a matter of operator preference.

The modalities described in this second example are pertinent across a wide variety of displays, including both two-dimensional (whether projected or emissive) and three-dimensional (whether autostereoscopic or not, aerial-image-producing or not, etc.) devices. In high-quality implementations of the latter—i.e. 3D—case, certain characteristics of the medium can vastly aid the perceptual mechanisms that underlie pushback. For example, a combination of parallax, optical depth of field, and ocular accommodation phenomena can allow multiple layers to be apprehended simultaneously, thus eliminating the need to severely fade and blur (or indeed to exclude altogether) layers distant from the display plane. The modalities apply, further, irrespective of the orientation of the display: it may be principally horizontal, as in the example, or may just as usefully be mounted at eye-height on a wall.

An extension to the scenario of this second example depicts the usefulness of two-handed manipulation. In certain applications, translating either the entire layer stack or an individual layer laterally (i.e. in the x and z directions) is necessary. In an embodiment, the operator's other—that is, non-pushback—hand can effect this transformation, for example through a modality in which bringing the hand into close proximity to the display surface allows one of the dataset's layers to be 'slid around', so that its offset x-z position follows that of the hand.

Operators may generally find it convenient and easily tractable to undertake lateral translation and pushback manipulations simultaneously. It is perhaps not wholly fatuous to propose that the assignment of continuous-domain manipulations to one hand and discrete-style work to the other may act to optimize cognitive load.

It is informative to consider yet another example of pushback under the SOE in which there is no natural visual aspect to the dataset. Representative is the problem of monitoring a plurality of audio channels and of intermittently selecting one from among the collection. An application of the pushback system enables such a task in an environment outfitted for aural but not visual output; the modality is remarkably similar to that of the preceding example.

An operator, standing or seated, is listening to a single channel of audio. Conceptually, this audio exists in the vertical plane—called the 'aural plane'—that geometrically includes her ears; additional channels of audio are resident in additional planes parallel to the aural plane but displaced forward and back, along the z-axis.

Opening her hand, held nine inches in front of her, with palm facing forward, she engages the pushback system. The audio in several proximal planes fades up differentially; the volume of each depends inversely on its ordinal distance from the current channel's plane. In practice, it is perceptually unrealistic to allow more than two or four additional channels to become audible. At the same time, an 'audio glyph' fades up to provide proximity feedback. Initially, while the operator's hand is held in the dead zone, the glyph is a barely audible two-note chord (initially in unison).

As the operator moves her hand forward or backward through the dead zone, the volumes of the audio channels remain fixed while that of the glyph increases. When the hand crosses the front or rear threshold of the dead zone, the glyph reaches its 'active' volume (which is still subordinate to the current channel's volume).

Once the operator's hand begins moving through the active zone—in the forward direction, say—the expected effect on the audio channels obtains: the current channel plane is pushed farther from the aural plane, and its volume (and the volumes of those channels still farther forward) is progressively reduced. The volume of each 'dorsal' channel plane, on the other hand, increases as it nears the aural plane.

The audio glyph, meanwhile, has switched modes. The hand's forward progress is accompanied by the rise in frequency of one of the tones; at the 'midway point', when the aural plane bisects one audio channel plane and the next, the tones form an exact fifth (mathematically, it should be a tritone interval, but there is an abundance of reasons that this is to be eschewed). The variable tone's frequency continues rising as the hand continues farther forward, until eventually the operator 'reaches' the next audio plane, at which point the tones span precisely an octave.

Audition of the various channels proceeds, the operator translating her hand forward and back to access each in turn Finally, to select one she merely closes her hand, concluding the pushback session and causing the collection of audio planes to 'spring' into alignment. The other (non-selected) channels fade to inaudibility, as does the glyph.

This example has illustrated a variant on pushback application in which the same facilities are again afforded: access to neighborhood context and rapid selection of discretized data element (here, an individual audio stream). The scenario substitutes an aural feedback mechanism, and in particular one that exploits the reliable human capacity for discerning certain frequency intervals, to provide the operator with information about whether she is 'close enough' to a target channel to make a selection. This is particularly important in the case of voice channels, in which 'audible' signals are only intermittently present; the continuous nature of the audio feedback glyph leaves it present and legible even when the channel itself has gone silent.

It is noted that if the SOE in this present example includes the capacity for spatialized audio, the perception of successive audio layers receding into the forward distance and approaching from the back (or vice versa) may be greatly enhanced. Further, the opportunity to more literally 'locate' the selected audio plane at the position of the operator, with succeeding layers in front of the operator and preceding layers behind, is usefully exploitable.

Other instantiations of the audio glyph are possible, and indeed the nature of the various channels' contents, including their spectral distributions, tends to dictate which kind of glyph will be most clearly discernible. By way of example, another audio glyph format maintains constant volume but employs periodic clicking, with the interval between clicks proportional to the proximity between the aural plane and the closest audio channel plane. Finally, under certain circumstances, and depending on the acuity of the operator, it is possible to use audio pushback with no feedback glyph at all.

With reference to the pushback mechanism, as the number and density of spatial detents in the dataset's representation increases toward the very large, the space and its parameterization becomes effectively continuous—that is to say, non-detented. Pushback remains nonetheless effective at such extremes, in part because the dataset's 'initial state' prior to each invocation of pushback may be treated as a temporary detent, realized simply as a dead zone.

An application of such non-detented pushback may be found in connection with the idea of an infinitely (or at least substantially) zoomable diagram. Pushback control of zoom functionality associates offset hand position with affine scale value, so that as the operator pushes his hand forward or back the degree of zoom decreases or increases (respectively). The original, pre-pushback zoom state is always readily accessible, however, because the direct mapping of position to zoom parameter insures that returning the control hand to the dead zone also effects return of the zoom value to its initial state.

Each scenario described in the examples above provides a description of the salient aspects of the pushback system and its use under the SOE. It should further be understood that each of the maneuvers described herein can be accurately and comprehensibly undertaken in a second or less, because of the efficiency and precision enabled by allowing a particular kind of perceptual feedback to guide human movement. At other times, operators also find it useful to remain in a single continuous pushback 'session' for tens of seconds: exploratory and context-acquisition goals are well served by pushback over longer intervals.

The examples described above employed a linear mapping of physical input (gesture) space to representational space: translating the control hand by A units in real space always results in a translation by B units [prime] in the representational space, irrespective of the real-space position at which the A-translation is undertaken. However, other mappings are possible. In particular, the degree of fine motor control enjoyed by most human operators allows the use of nonlinear mappings, in which for example differential gestural translations far from the active threshold can translate into larger displacements along the parameterized dimension than do gestural translations near the threshold.

Coincident Virtual/Display and Physical Spaces

The system can provide an environment in which virtual space depicted on one or more display devices ("screens") is treated as coincident with the physical space inhabited by the operator or operators of the system. An embodiment of such an environment is described here. This current embodiment includes three projector-driven screens at fixed locations, is driven by a single desktop computer, and is controlled using the gestural vocabulary and interface system described herein. Note, however, that any number of screens are supported by the techniques being described; that those screens may be mobile (rather than fixed); that the screens may be driven by many independent computers simultaneously; and that the overall system can be controlled by any input device or technique.

The interface system described in this disclosure should have a means of determining the dimensions, orientations and positions of screens in physical space. Given this information, the system is able to dynamically map the physical space in which these screens are located (and which the operators of the system inhabit) as a projection into the virtual space of computer applications running on the system. As part of this automatic mapping, the system also translates the scale, angles, depth, dimensions and other spatial characteristics of the two spaces in a variety of ways, according to the needs of the applications that are hosted by the system.

This continuous translation between physical and virtual space makes possible the consistent and pervasive use of a number of interface techniques that are difficult to achieve on existing application platforms or that must be implemented piece-meal for each application running on existing platforms. These techniques include (but are not limited to):

1) Use of "literal pointing"—using the hands in a gestural interface environment, or using physical pointing tools or devices—as a pervasive and natural interface technique.

2) Automatic compensation for movement or repositioning of screens.

3) Graphics rendering that changes depending on operator position, for example simulating parallax shifts to enhance depth perception.

4) Inclusion of physical objects in on-screen display—taking into account real-world position, orientation, state, etc. For example, an operator standing in front of a large, opaque screen, could see both applications graphics and a representation of the true position of a scale model that is behind the screen (and is, perhaps, moving or changing orientation).

It is important to note that literal pointing is different from the abstract pointing used in mouse-based windowing interfaces and most other contemporary systems. In those systems, the operator must learn to manage a translation between a virtual pointer and a physical pointing device, and must map between the two cognitively.

By contrast, in the systems described in this disclosure, there is no difference between virtual and physical space (except that virtual space is more amenable to mathematical manipulation), either from an application or user perspective, so there is no cognitive translation required of the operator.

The closest analogy for the literal pointing provided by the embodiment described here is the touch-sensitive screen (as found, for example, on many ATM machines). A touch-sensitive screen provides a one to one mapping between the two-dimensional display space on the screen and the two-dimensional input space of the screen surface. In an analogous fashion, the systems described here provide a flexible mapping (possibly, but not necessarily, one to one) between a virtual space displayed on one or more screens and the physical space inhabited by the operator. Despite the usefulness of the analogy, it is worth understanding that the extension of this "mapping approach" to three dimensions, an arbitrarily large architectural environment, and multiple screens is non-trivial.

In addition to the components described herein, the system may also implement algorithms implementing a continuous, systems-level mapping (perhaps modified by rotation, translation, scaling or other geometrical transformations) between the physical space of the environment and the display space on each screen.

A rendering stack which takes the computational objects and the mapping and outputs a graphical representation of the virtual space.

An input events processing stack which takes event data from a control system (in the current embodiment both gestural and pointing data from the system and mouse input) and maps spatial data from input events to coordinates in virtual space. Translated events are then delivered to running applications.

A "glue layer" allowing the system to host applications running across several computers on a local area network.

Embodiments of a spatial-continuum input system are described herein as comprising network-based data representation, transit, and interchange that includes a system called "plasma" that comprises subsystems "slawx", "proteins", and "pools", as described in detail below. The pools and proteins are components of methods and systems described herein for encapsulating data that is to be shared between or across processes. These mechanisms also include slawx (plural of "slaw") in addition to the proteins and pools. Generally, slawx provide the lowest-level of data definition for inter-process exchange, proteins provide mid-level structure and hooks for querying and filtering, and pools provide for high-level organization and access semantics. Slawx include a mechanism for efficient, platform-independent data representation and access. Proteins provide a data encapsulation and transport scheme using slawx as the payload. Pools provide structured and flexible aggregation, ordering, filtering, and distribution of proteins within a process, among local processes, across a network between remote or distributed processes, and via longer term (e.g. on-disk, etc.) storage.

The configuration and implementation of the embodiments described herein include several constructs that together enable numerous capabilities. For example, the embodiments described herein provide efficient exchange of data between large numbers of processes as described above. The embodiments described herein also provide flexible data "typing" and structure, so that widely varying kinds and uses of data are supported. Furthermore, embodiments described herein include flexible mechanisms for data exchange (e.g., local memory, disk, network, etc.), all driven by substantially similar application programming interfaces (APIs). Moreover, embodiments described enable data exchange between processes written in different programming languages. Additionally, embodiments described herein enable automatic maintenance of data caching and aggregate state.

Figure 18:
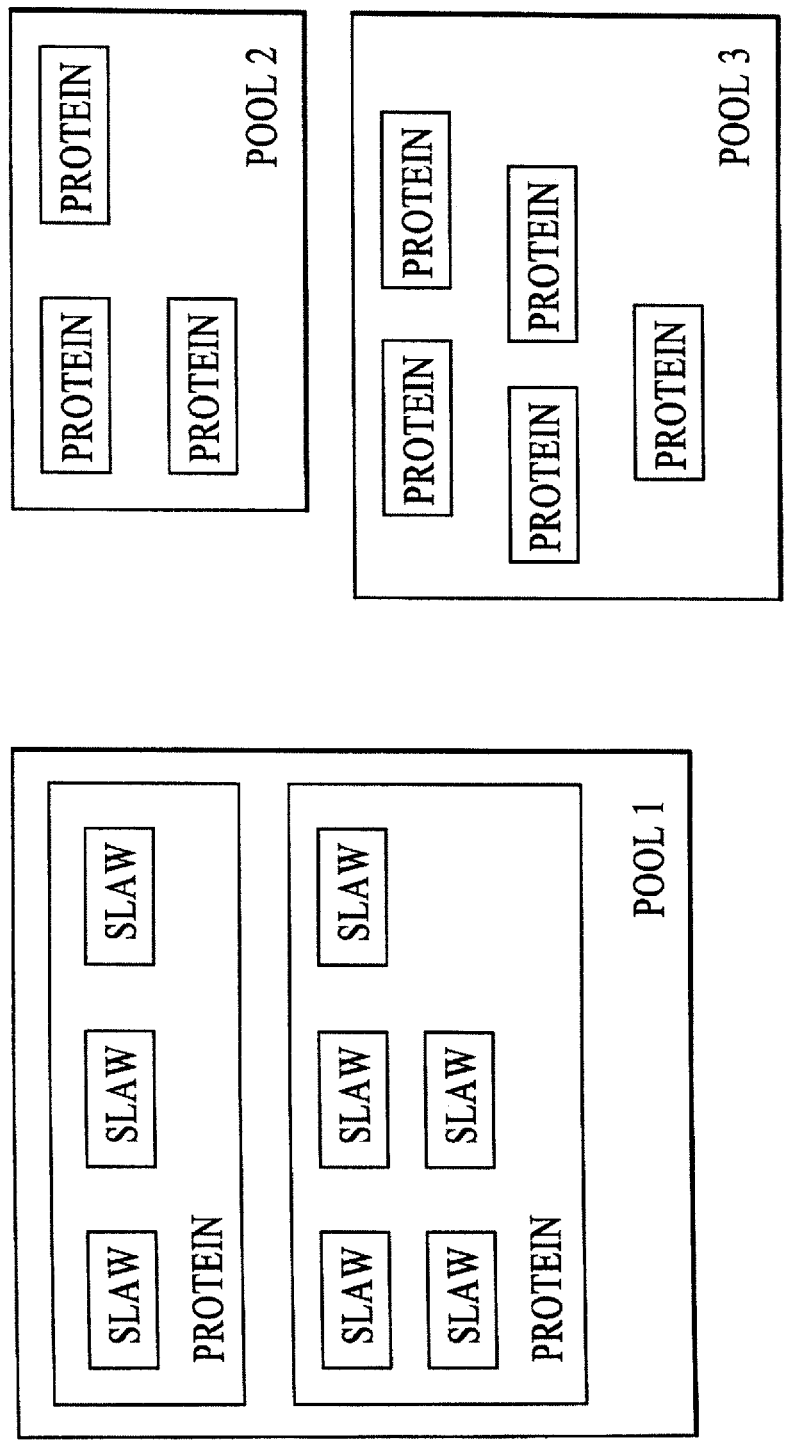
FIG. 18 is a block diagram of a processing environment including data representations using slawx, proteins, and pools, under an embodiment.

FIG. 18 is a block diagram of a processing environment including data representations using slawx, proteins, and pools, under an embodiment. The principal constructs of the embodiments presented herein include slawx (plural of "slaw"), proteins, and pools. Slawx as described herein includes a mechanism for efficient, platform-independent data representation and access. Proteins, as described in detail herein, provide a data encapsulation and transport scheme, and the payload of a protein of an embodiment includes slawx. Pools, as described herein, provide structured yet flexible aggregation, ordering, filtering, and distribution of proteins. The pools provide access to data, by virtue of proteins, within a process, among local processes, across a network between remote or distributed processes, and via 'longer term' (e.g. on-disk) storage.

Figure 19:
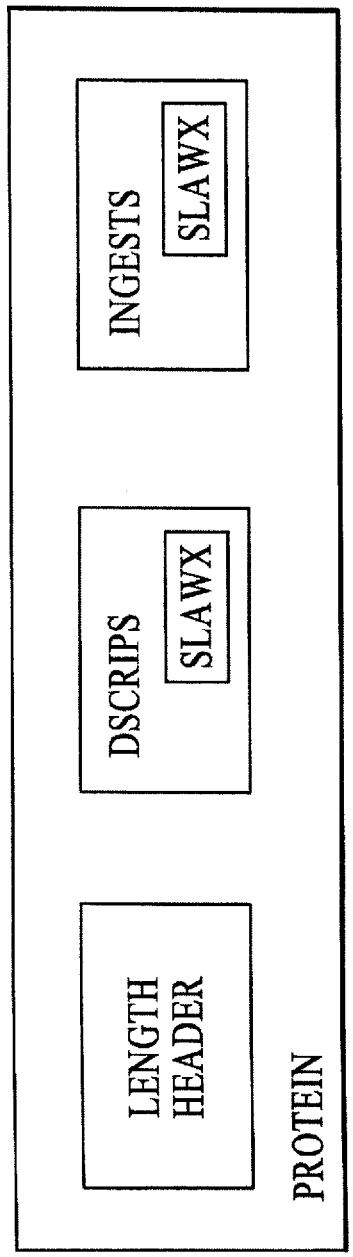
FIG. 19 is a block diagram of a protein, under an embodiment.

FIG. 19 is a block diagram of a protein, under an embodiment. The protein includes a length header, a descrip, and an ingest. Each of the descrip and ingest includes slaw or slawx, as described in detail below.

Figure 20:
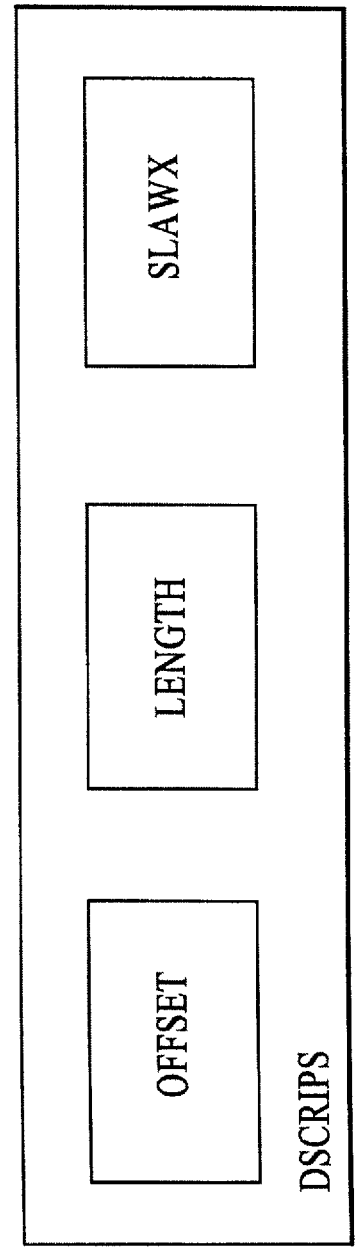
FIG. 20 is a block diagram of a descrip, under an embodiment.

FIG. 20 is a block diagram of a descrip, under an embodiment. The descrip includes an offset, a length, and slawx, as described in detail below.

Figure 21:
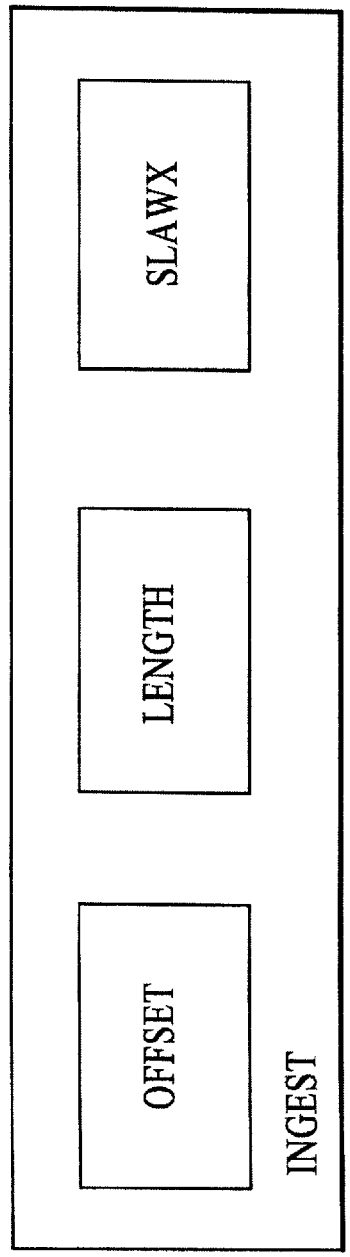
FIG. 21 is a block diagram of an ingest, under an embodiment.

FIG. 21 is a block diagram of an ingest, under an embodiment. The ingest includes an offset, a length, and slawx, as described in detail below.

Figure 22:
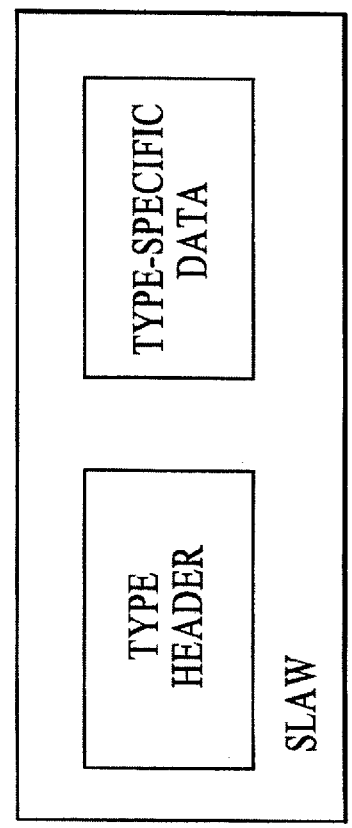
FIG. 22 is a block diagram of a slaw, under an embodiment.

FIG. 22 is a block diagram of a slaw, under an embodiment. The slaw includes a type header and type-specific data, as described in detail below.

Figure 23A:
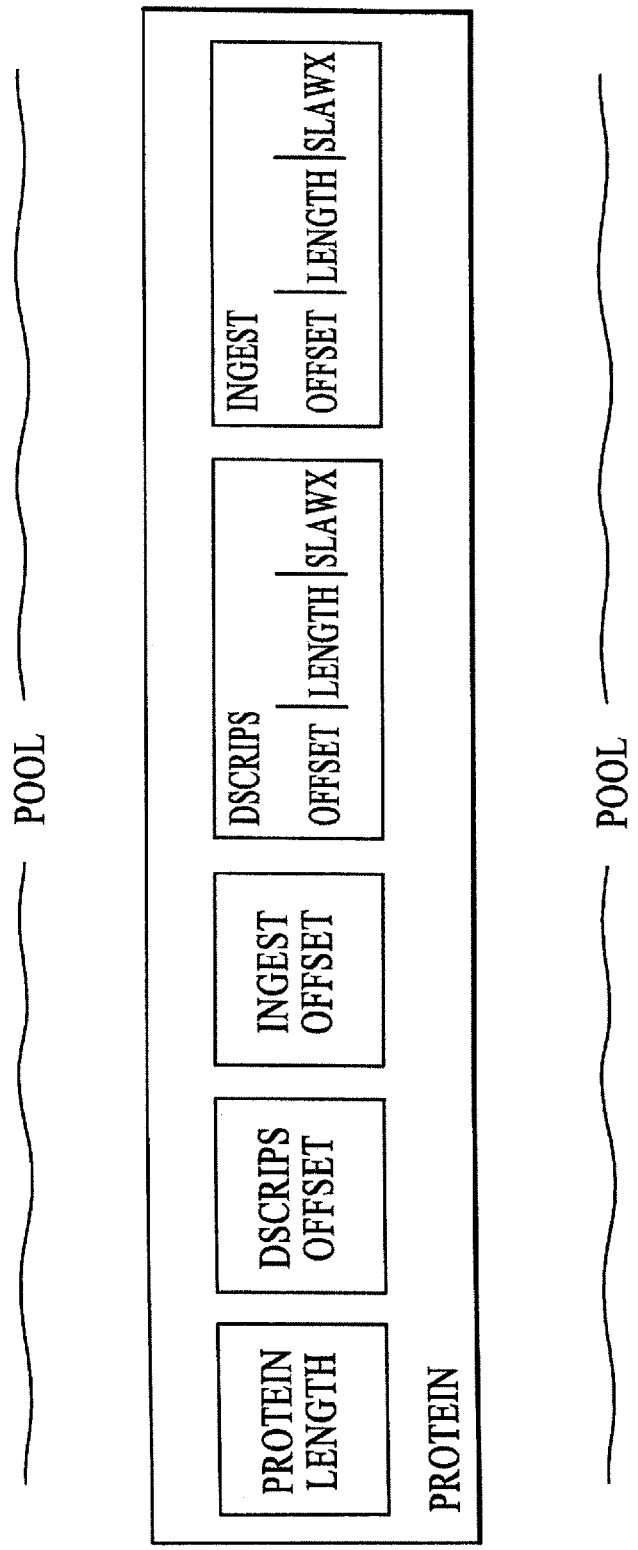
FIG. 23A is a block diagram of a protein in a pool, under an embodiment.

FIG. 23A is a block diagram of a protein in a pool, under an embodiment. The protein includes a length header ("protein length"), a descrips offset, an ingests offset, a descrip, and an ingest. The descrips includes an offset, a length, and a slaw. The ingest includes an offset, a length, and a slaw.

The protein as described herein is a mechanism for encapsulating data that needs to be shared between processes, or moved across a bus or network or other processing structure. As an example, proteins provide an improved mechanism for transport and manipulation of data including data corresponding to or associated with user interface events; in particular, the user interface events of an embodiment include those of the gestural interface described above. As a further example, proteins provide an improved mechanism for transport and manipulation of data including, but not limited to, graphics data or events, and state information, to name a few. A protein is a structured record format and an associated set of methods for manipulating records. Manipulation of records as used herein includes putting data into a structure, taking data out of a structure, and querying the format and existence of data. Proteins are configured to be used via code written in a variety of computer languages. Proteins are also configured to be the basic building block for pools, as described herein. Furthermore, proteins are configured to be natively able to move between processors and across networks while maintaining intact the data they include.

In contrast to conventional data transport mechanisms, proteins are untyped. While being untyped, the proteins provide a powerful and flexible pattern-matching facility, on top of which "type-like" functionality is implemented. Proteins configured as described herein are also inherently multi-point (although point-to-point forms are easily implemented as a subset of multi-point transmission). Additionally, proteins define a "universal" record format that does not differ (or differs only in the types of optional optimizations that are performed) between in-memory, on-disk, and on-the-wire (network) formats, for example.

Referring to FIGS. 19 and 23A, a protein of an embodiment is a linear sequence of bytes. Within these bytes are encapsulated a descrips list and a set of key-value pairs called ingests. The descrips list includes an arbitrarily elaborate but efficiently filterable per-protein event description. The ingests include a set of key-value pairs that comprise the actual contents of the protein.

Proteins' concern with key-value pairs, as well as some core ideas about network-friendly and multi-point data interchange, is shared with earlier systems that privilege the concept of "tuples" (e.g., Linda, Jini). Proteins differ from tuple-oriented systems in several major ways, including the use of the descrips list to provide a standard, optimizable pattern matching substrate. Proteins also differ from tuple-oriented systems in the rigorous specification of a record format appropriate for a variety of storage and language constructs, along with several particular implementations of "interfaces" to that record format.

Turning to a description of proteins, the first four or eight bytes of a protein specify the protein's length, which must be a multiple of 16 bytes in an embodiment. This 16-byte granularity ensures that byte-alignment and bus-alignment efficiencies are achievable on contemporary hardware. A protein that is not naturally "quad-word aligned" is padded with arbitrary bytes so that its length is a multiple of 16 bytes.

The length portion of a protein has the following format: 32 bits specifying length, in big-endian format, with the four lowest-order bits serving as flags to indicate macro-level protein structure characteristics; followed by 32 further bits if the protein's length is greater than 2^32 bytes.

The 16-byte-alignment proviso of an embodiment means that the lowest order bits of the first four bytes are available as flags. And so the first three low-order bit flags indicate whether the protein's length can be expressed in the first four bytes or requires eight, whether the protein uses big-endian or little-endian byte ordering, and whether the protein employs standard or non-standard structure, respectively, but the protein is not so limited. The fourth flag bit is reserved for future use.

If the eight-byte length flag bit is set, the length of the protein is calculated by reading the next four bytes and using them as the high-order bytes of a big-endian, eight-byte integer (with the four bytes already read supplying the low-order portion). If the little-endian flag is set, all binary numerical data in the protein is to be interpreted as little-endian (otherwise, big-endian). If the non-standard flag bit is set, the remainder of the protein does not conform to the standard structure to be described below.

Non-standard protein structures will not be discussed further herein, except to say that there are various methods for describing and synchronizing on non-standard protein formats available to a systems programmer using proteins and pools, and that these methods can be useful when space or compute cycles are constrained. For example, the shortest protein of an embodiment is sixteen bytes. A standard-format protein cannot fit any actual payload data into those sixteen bytes (the lion's share of which is already relegated to describing the location of the protein's component parts). But a non-standard format protein could conceivably use 12 of its 16 bytes for data. Two applications exchanging proteins could mutually decide that any 16-byte-long proteins that they emit always include 12 bytes representing, for example, 12 8-bit sensor values from a real-time analog-to-digital converter.

Immediately following the length header, in the standard structure of a protein, two more variable-length integer numbers appear. These numbers specify offsets to, respectively, the first element in the descrips list and the first key-value pair (ingest). These offsets are also referred to herein as the descrips offset and the ingests offset, respectively. The byte order of each quad of these numbers is specified by the protein endianness flag bit. For each, the most significant bit of the first four bytes determines whether the number is four or eight bytes wide. If the most significant bit (msb) is set, the first four bytes are the most significant bytes of a double-word (eight byte) number. This is referred to herein as "offset form". Use of separate offsets pointing to descrips and pairs allows descrips and pairs to be handled by different code paths, making possible particular optimizations relating to, for example, descrips pattern-matching and protein assembly. The presence of these two offsets at the beginning of a protein also allows for several useful optimizations.

Most proteins will not be so large as to require eight-byte lengths or pointers, so in general the length (with flags) and two offset numbers will occupy only the first three bytes of a protein. On many hardware or system architectures, a fetch or read of a certain number of bytes beyond the first is "free" (e.g., 16 bytes take exactly the same number of clock cycles to pull across the Cell processor's main bus as a single byte).

In many instances it is useful to allow implementation-specific or context-specific caching or metadata inside a protein. The use of offsets allows for a "hole" of arbitrary size to be created near the beginning of the protein, into which such metadata may be slotted. An implementation that can make use of eight bytes of metadata gets those bytes for free on many system architectures with every fetch of the length header for a protein.

The descrips offset specifies the number of bytes between the beginning of the protein and the first descrip entry. Each descrip entry comprises an offset (in offset form, of course) to the next descrip entry, followed by a variable-width length field (again in offset format), followed by a slaw. If there are no further descrips, the offset is, by rule, four bytes of zeros. Otherwise, the offset specifies the number of bytes between the beginning of this descrip entry and a subsequent descrip entry. The length field specifies the length of the slaw, in bytes.

In most proteins, each descrip is a string, formatted in the slaw string fashion: a four-byte length/type header with the most significant bit set and only the lower 30 bits used to specify length, followed by the header's indicated number of data bytes. As usual, the length header takes its endianness from the protein. Bytes are assumed to encode UTF-8 characters (and thus—nota bene—the number of characters is not necessarily the same as the number of bytes).

The ingests offset specifies the number of bytes between the beginning of the protein and the first ingest entry. Each ingest entry comprises an offset (in offset form) to the next ingest entry, followed again by a length field and a slaw. The ingests offset is functionally identical to the descrips offset, except that it points to the next ingest entry rather than to the next descrip entry.

In most proteins, every ingest is of the slaw cons type comprising a two-value list, generally used as a key/value pair. The slaw cons record comprises a four-byte length/type header with the second most significant bit set and only the lower 30 bits used to specify length; a four-byte offset to the start of the value (second) element; the four-byte length of the key element; the slaw record for the key element; the four-byte length of the value element; and finally the slaw record for the value element.

Generally, the cons key is a slaw string. The duplication of data across the several protein and slaw cons length and offsets field provides yet more opportunity for refinement and optimization.

The construct used under an embodiment to embed typed data inside proteins, as described above, is a tagged byte-sequence specification and abstraction called a "slaw" (the plural is "slawx"). A slaw is a linear sequence of bytes representing a piece of (possibly aggregate) typed data, and is associated with programming-language-specific APIs that allow slawx to be created, modified and moved around between memory spaces, storage media, and machines. The slaw type scheme is intended to be extensible and as lightweight as possible, and to be a common substrate that can be used from any programming language.

The desire to build an efficient, large-scale inter-process communication mechanism is the driver of the slaw configuration. Conventional programming languages provide sophisticated data structures and type facilities that work well in process-specific memory layouts, but these data representations invariably break down when data needs to be moved between processes or stored on disk. The slaw architecture is, first, a substantially efficient, multi-platform friendly, low-level data model for inter-process communication.

But even more importantly, slawx are configured to influence, together with proteins, and enable the development of future computing hardware (microprocessors, memory controllers, disk controllers). A few specific additions to, say, the instruction sets of commonly available microprocessors make it possible for slawx to become as efficient even for single-process, in-memory data layout as the schema used in most programming languages.

Each slaw comprises a variable-length type header followed by a type-specific data layout. In an example embodiment, which supports full slaw functionality in C, C++ and Ruby for example, types are indicated by a universal integer defined in system header files accessible from each language. More sophisticated and flexible type resolution functionality is also enabled: for example, indirect typing via universal object IDs and network lookup.

The slaw configuration of an embodiment allows slaw records to be used as objects in language-friendly fashion from both Ruby and C++, for example. A suite of utilities external to the C++ compiler sanity-check slaw byte layout, create header files and macros specific to individual slaw types, and auto-generate bindings for Ruby. As a result, well-configured slaw types are quite efficient even when used from within a single process. Any slaw anywhere in a process's accessible memory can be addressed without a copy or "deserialization" step.

Slaw functionality of an embodiment includes API facilities to perform one or more of the following: create a new slaw of a specific type; create or build a language-specific reference to a slaw from bytes on disk or in memory; embed data within a slaw in type-specific fashion; query the size of a slaw; retrieve data from within a slaw; clone a slaw; and translate the endianness and other format attributes of all data within a slaw. Every species of slaw implements the above behaviors.

FIG. 23B1 and FIG. 23B2 show a slaw header format, under an embodiment. A detailed description of the slaw follows.

The internal structure of each slaw optimizes each of type resolution, access to encapsulated data, and size information for that slaw instance. In an embodiment, the full set of slaw types is by design minimally complete, and includes: the slaw string; the slaw cons (i.e. dyad); the slaw list; and the slaw numerical object, which itself represents a broad set of individual numerical types understood as permutations of a half-dozen or so basic attributes. The other basic property of any slaw is its size. In an embodiment, slawx have byte-lengths quantized to multiples of four; these four-byte words are referred to herein as 'quads'. In general, such quad-based sizing aligns slawx well with the configurations of modern computer hardware architectures.

The first four bytes of every slaw in an embodiment comprise a header structure that encodes type-description and other metainformation, and that ascribes specific type meanings to particular bit patterns. For example, the first (most significant) bit of a slaw header is used to specify whether the size (length in quad-words) of that slaw follows the initial four-byte type header. When this bit is set, it is understood that the size of the slaw is explicitly recorded in the next four bytes of the slaw (e.g., bytes five through eight); if the size of the slaw is such that it cannot be represented in four bytes (i.e. if the size is or is larger than two to the thirty-second power) then the next-most-significant bit of the slaw's initial four bytes is also set, which means that the slaw has an eight-byte (rather than four byte) length. In that case, an inspecting process will find the slaw's length stored in ordinal bytes five through twelve. On the other hand, the small number of slaw types means that in many cases a fully specified typal bit-pattern "leaves unused" many bits in the four byte slaw header; and in such cases these bits may be employed to encode the slaw's length, saving the bytes (five through eight) that would otherwise be required.

For example, an embodiment leaves the most significant bit of the slaw header (the "length follows" flag) unset and sets the next bit to indicate that the slaw is a "wee cons", and in this case the length of the slaw (in quads) is encoded in the remaining thirty bits. Similarly, a "wee string" is marked by the pattern 001 in the header, which leaves twenty-nine bits for representation of the slaw-string's length; and a leading 0001 in the header describes a "wee list", which by virtue of the twenty-eight available length-representing bits can be a slaw list of up to two-to-the-twenty-eight quads in size. A "full string" (or cons or list) has a different bit signature in the header, with the most significant header bit necessarily set because the slaw length is encoded separately in bytes five through eight (or twelve, in extreme cases). Note that the Plasma implementation "decides" at the instant of slaw construction whether to employ the "wee" or the "full" version of these constructs (the decision is based on whether the resulting size will "fit" in the available wee bits or not), but the full-vs.-wee detail is hidden from the user of the Plasma implementation, who knows and cares only that she is using a slaw string, or a slaw cons, or a slaw list.

Numeric slawx are, in an embodiment, indicated by the leading header pattern 00001. Subsequent header bits are used to represent a set of orthogonal properties that may be combined in arbitrary permutation. An embodiment employs, but is not limited to, five such character bits to indicate whether or not the number is: (1) floating point; (2) complex; (3) unsigned; (4) "wide"; (5) "stumpy" ((4) "wide" and (5) "stumpy" are permuted to indicate eight, sixteen, thirty-two, and sixty-four bit number representations). Two additional bits (e.g., (7) and (8)) indicate that the encapsulated numeric data is a two-, three-, or four-element vector (with both bits being zero suggesting that the numeric is a "one-element vector" (i.e. a scalar)). In this embodiment the eight bits of the fourth header byte are used to encode the size (in bytes, not quads) of the encapsulated numeric data. This size encoding is offset by one, so that it can represent any size between and including one and two hundred fifty-six bytes. Finally, two character bits (e.g., (9) and (10)) are used to indicate that the numeric data encodes an array of individual numeric entities, each of which is of the type described by character bits (1) through (8). In the case of an array, the individual numeric entities are not each tagged with additional headers, but are packed as continuous data following the single header and, possibly, explicit slaw size information.

This embodiment affords simple and efficient slaw duplication (which can be implemented as a byte-for-byte copy) and extremely straightforward and efficient slaw comparison (two slawx are the same in this embodiment if and only if there is a one-to-one match of each of their component bytes considered in sequence). This latter property is important, for example, to an efficient implementation of the protein architecture, one of whose critical and pervasive features is the ability to search through or 'match on' a protein's descrips list.

Further, the embodiments herein allow aggregate slaw forms (e.g., the slaw cons and the slaw list) to be constructed simply and efficiently. For example, an embodiment builds a slaw cons from two component slawx, which may be of any type, including themselves aggregates, by: (a) querying each component slaw's size; (b) allocating memory of size equal to the sum of the sizes of the two component slawx and the one, two, or three quads needed for the header-plus-size structure; (c) recording the slaw header (plus size information) in the first four, eight, or twelve bytes; and then (d) copying the component slawx's bytes in turn into the immediately succeeding memory. Significantly, such a construction routine need know nothing about the types of the two component slawx; only their sizes (and accessibility as a sequence of bytes) matters. The same process pertains to the construction of slaw lists, which are ordered encapsulations of arbitrarily many sub-slawx of (possibly) heterogeneous type.

A further consequence of the slaw system's fundamental format as sequential bytes in memory obtains in connection with "traversal" activities—a recurring use pattern uses, for example, sequential access to the individual slawx stored in a slaw list. The individual slawx that represent the descrips and ingests within a protein structure must similarly be traversed. Such maneuvers are accomplished in a stunningly straightforward and efficient manner: to "get to" the next slaw in a slaw list, one adds the length of the current slaw to its location in memory, and the resulting memory location is identically the header of the next slaw. Such simplicity is possible because the slaw and protein design eschews "indirection"; there are no pointers; rather, the data simply exists, in its totality, in situ.

To the point of slaw comparison, a complete implementation of the Plasma system must acknowledge the existence of differing and incompatible data representation schemes across and among different operating systems, CPUs, and hardware architectures. Major such differences include byte-ordering policies (e.g., little-vs. big-endianness) and floating-point representations; other differences exist. The Plasma specification requires that the data encapsulated by slawx be guaranteed interprable (i.e., must appear in the native format of the architecture or platform from which the slaw is being inspected. This requirement means in turn that the Plasma system is itself responsible for data format conversion. However, the specification stipulates only that the conversion take place before a slaw becomes "at all visible" to an executing process that might inspect it. It is therefore up to the individual implementation at which point it chooses to perform such format c conversion; two appropriate approaches are that slaw data payloads are conformed to the local architecture's data format (1) as an individual slaw is "pulled out" of a protein in which it had been packed, or (2) for all slaw in a protein simultaneously, as that protein is extracted from the pool in which it was resident. Note that the conversion stipulation considers the possibility of hardware-assisted implementations. For example, networking chipsets built with explicit Plasma capability may choose to perform format conversion intelligently and at the "instant of transmission", based on the known characteristics of the receiving system. Alternately, the process of transmission may convert data payloads into a canonical format, with the receiving process symmetrically converting from canonical to "local" format. Another embodiment performs format conversion "at the metal", meaning that data is always stored in canonical format, even in local memory, and that the memory controller hardware itself performs the conversion as data is retrieved from memory and placed in the registers of the proximal CPU.

Figure 23C:
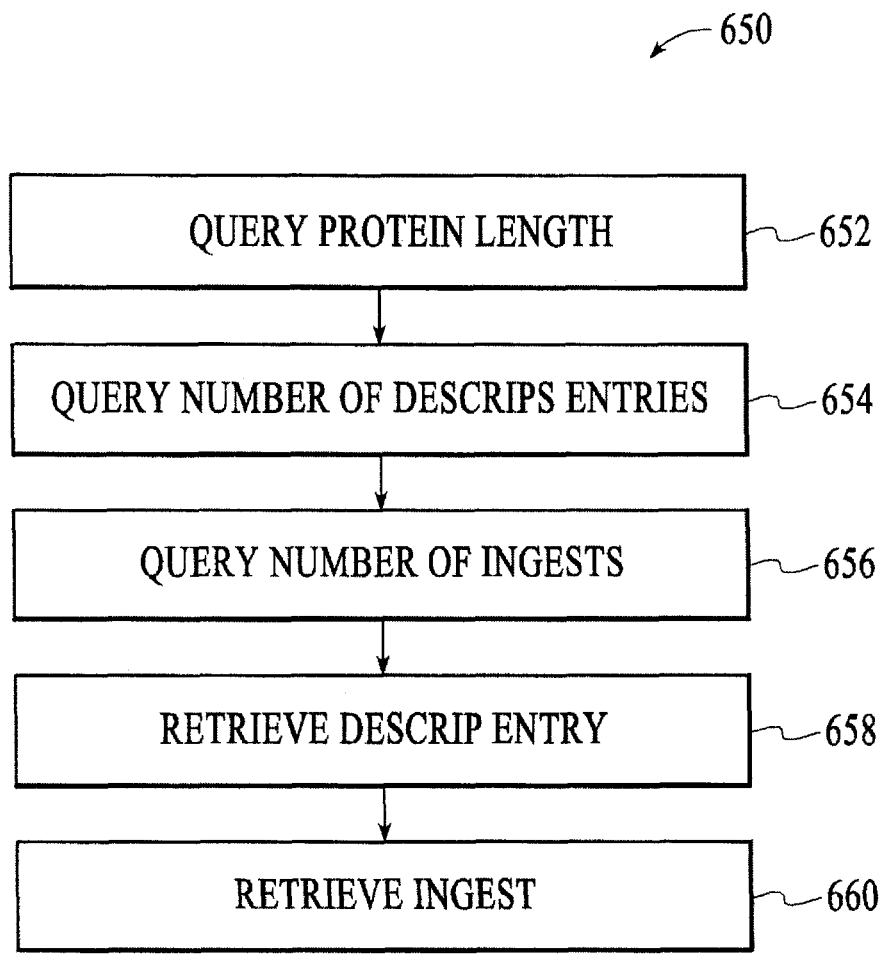
FIG. 23C is a flow diagram for using proteins, under an embodiment.

A minimal (and read-only) protein implementation of an embodiment includes operation or behavior in one or more applications or programming languages making use of proteins. FIG. 23C is a flow diagram 650 for using proteins, under an embodiment. Operation begins by querying 652 the length in bytes of a protein. The number of descrips entries is queried 654. The number of ingests is queried 656. A descrip entry is retrieved 658 by index number. An ingest is retrieved 660 by index number.

Figure 23D:
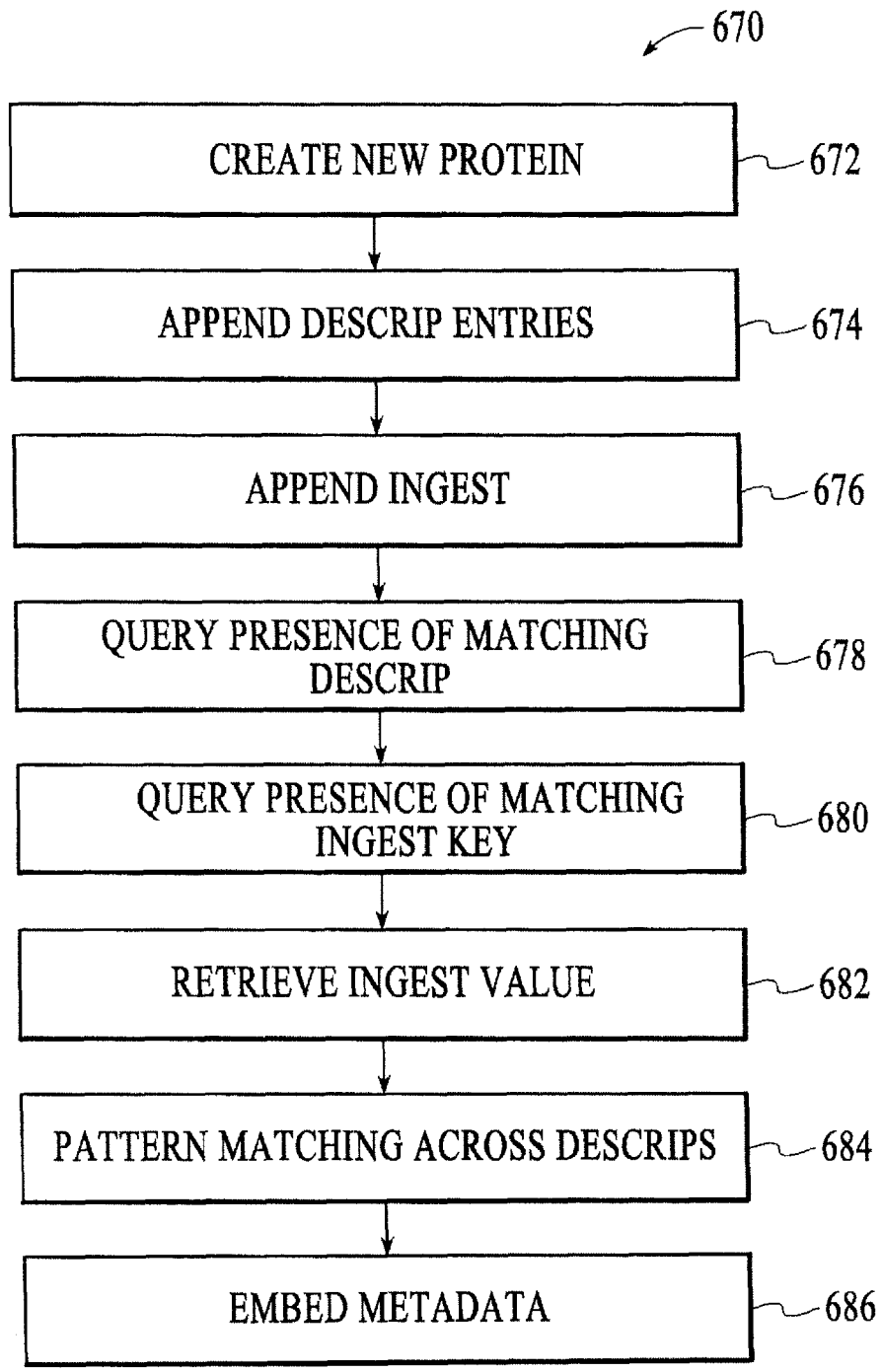
FIG. 23D is a flow diagram for constructing or generating proteins, under an embodiment.

The embodiments described herein also define basic methods allowing proteins to be constructed and filled with data, helper-methods that make common tasks easier for programmers, and hooks for creating optimizations. FIG. 23D is a flow diagram 670 for constructing or generating proteins, under an embodiment. Operation begins with creation 672 of a new protein. A series of descrips entries are appended 674. An ingest is also appended 676. The presence of a matching descrip is queried 678, and the presence of a matching ingest key is queried 680. Given an ingest key, an ingest value is retrieved 682. Pattern matching is performed 684 across descrips. Non-structured metadata is embedded 686 near the beginning of the protein.

As described above, slawx provide the lowest-level of data definition for inter-process exchange, proteins provide mid-level structure and hooks for querying and filtering, and pools provide for high-level organization and access semantics. The pool is a repository for proteins, providing linear sequencing and state caching. The pool also provides multi-process access by multiple programs or applications of numerous different types. Moreover, the pool provides a set of common, optimizable filtering and pattern-matching behaviors.

The pools of an embodiment, which can accommodate tens of thousands of proteins, function to maintain state, so that individual processes can offload much of the tedious bookkeeping common to multi-process program code. A pool maintains or keeps a large buffer of past proteins available—the Platonic pool is explicitly infinite—so that participating processes can scan both backwards and forwards in a pool at will. The size of the buffer is implementation dependent, of course, but in common usage it is often possible to keep proteins in a pool for hours or days.

The most common style of pool usage as described herein hews to a biological metaphor, in contrast to the mechanistic, point-to-point approach taken by existing inter-process communication frameworks. The name protein alludes to biological inspiration: data proteins in pools are available for flexible querying and pattern matching by a large number of computational processes, as chemical proteins in a living organism are available for pattern matching and filtering by large numbers of cellular agents.

Two additional abstractions lean on the biological metaphor, including use of "handlers", and the Golgi framework. A process that participates in a pool generally creates a number of handlers. Handlers are relatively small bundles of code that associate match conditions with handle behaviors. By tying one or more handlers to a pool, a process sets up flexible call-back triggers that encapsulate state and react to new proteins.

A process that participates in several pools generally inherits from an abstract Golgi class. The Golgi framework provides a number of useful routines for managing multiple pools and handlers. The Golgi class also encapsulates parent-child relationships, providing a mechanism for local protein exchange that does not use a pool.

A pools API provided under an embodiment is configured to allow pools to be implemented in a variety of ways, in order to account both for system-specific goals and for the available capabilities of given hardware and network architectures. The two fundamental system provisions upon which pools depend are a storage facility and a means of inter-process communication. The extant systems described herein use a flexible combination of shared memory, virtual memory, and disk for the storage facility, and IPC queues and TCP/IP sockets for inter-process communication.

Pool functionality of an embodiment includes, but is not limited to, the following: participating in a pool; placing a protein in a pool; retrieving the next unseen protein from a pool; rewinding or fast-forwarding through the contents (e.g., proteins) within a pool. Additionally, pool functionality can include, but is not limited to, the following: setting up a streaming pool call-back for a process; selectively retrieving proteins that match particular patterns of descrips or ingests keys; scanning backward and forwards for proteins that match particular patterns of descrips or ingests keys.

Figure 24:
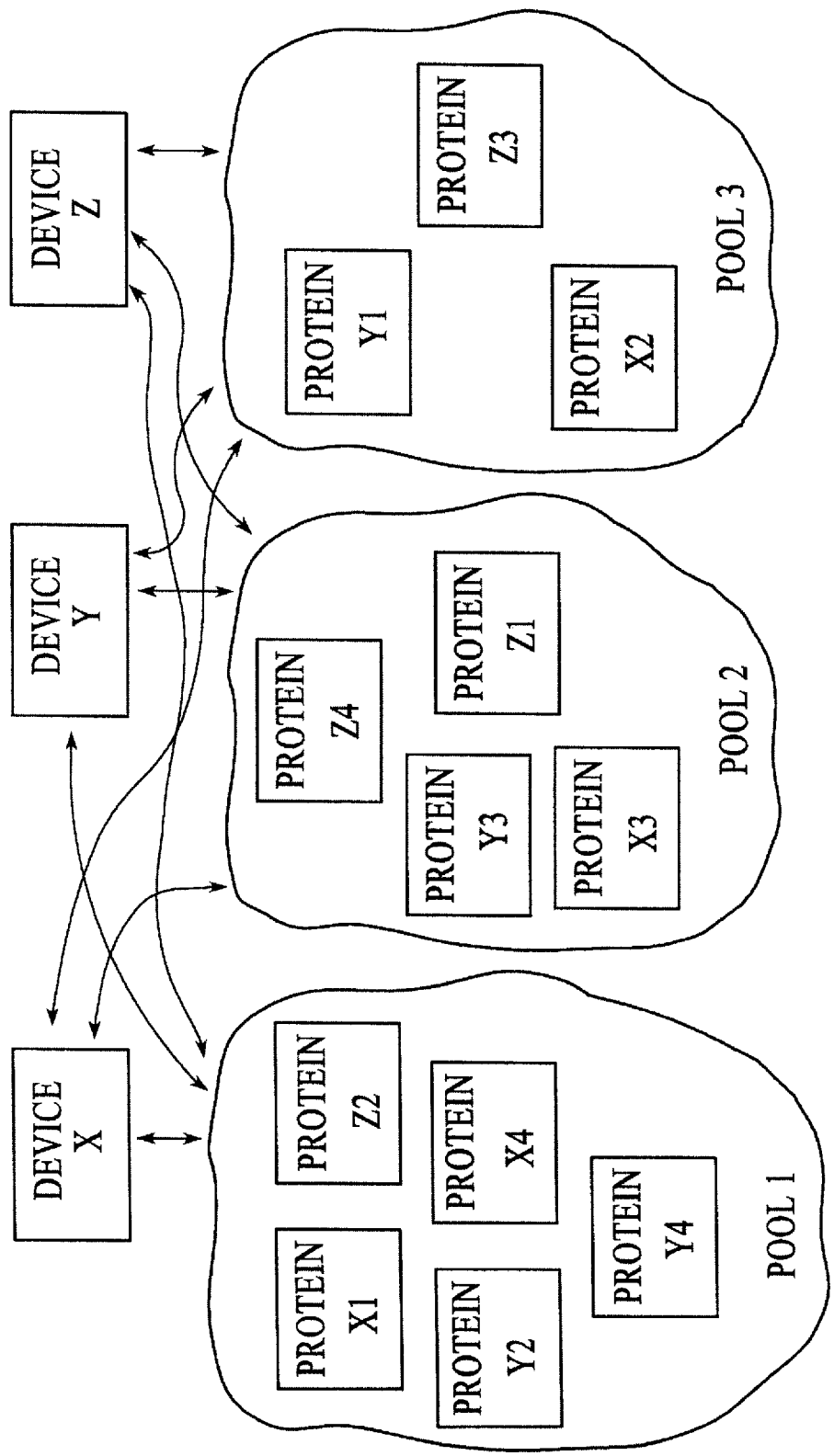
FIG. 24 is a block diagram of a processing environment including data exchange using slawx, proteins, and pools, under an embodiment.

The proteins described above are provided to pools as a way of sharing the protein data contents with other applications. FIG. 24 is a block diagram of a processing environment including data exchange using slawx, proteins, and pools, under an embodiment. This example environment includes three devices (e.g., Device X, Device Y, and Device Z, collectively referred to herein as the "devices") sharing data through the use of slawx, proteins and pools as described above. Each of the devices is coupled to the three pools (e.g., Pool 1, Pool 2, Pool 3). Pool 1 includes numerous proteins (e.g., Protein X1, Protein Z2, Protein Y2, Protein X4, Protein Y4) contributed or transferred to the pool from the respective devices (e.g., protein Z2 is transferred or contributed to pool 1 by device Z, etc.). Pool 2 includes numerous proteins (e.g., Protein Z4, Protein Y3, Protein Z1, Protein X3) contributed or transferred to the pool from the respective devices (e.g., protein Y3 is transferred or contributed to pool 2 by device Y, etc.). Pool 3 includes numerous proteins (e.g., Protein Y1, Protein Z3, Protein X2) contributed or transferred to the pool from the respective devices (e.g., protein X2 is transferred or contributed to pool 3 by device X, etc.). While the example described above includes three devices coupled or connected among three pools, any number of devices can be coupled or connected in any manner or combination among any number of pools, and any pool can include any number of proteins contributed from any number or combination of devices. The proteins and pools of this example are as described above with reference to FIGS. 18-23.

Figure 25:
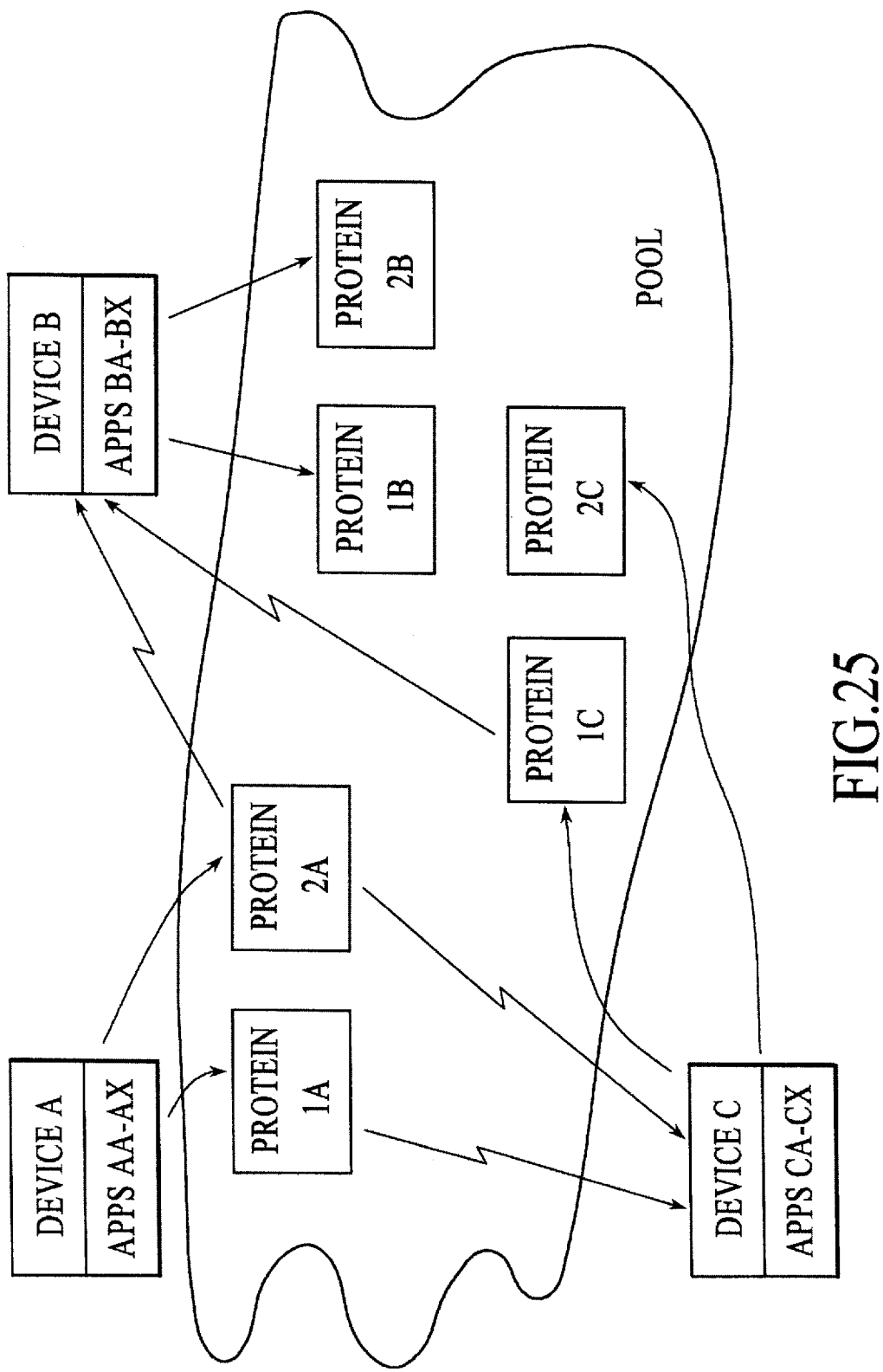
FIG. 25 is a block diagram of a processing environment including multiple devices and numerous programs running on one or more of the devices in which the Plasma constructs (i.e., pools, proteins, and slaw) are used to allow the numerous running programs to share and collectively respond to the events generated by the devices, under an embodiment.

FIG. 25 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an embodiment. This system is but one example of a multi-user, multi-device, multi-computer interactive control scenario or configuration. More particularly, in this example, an interactive system, comprising multiple devices (e.g., device A, B, etc.) and a number of programs (e.g., apps AA-AX, apps BA-BX, etc.) running on the devices uses the Plasma constructs (e.g., pools, proteins, and slaw) to allow the running programs to share and collectively respond to the events generated by these input devices.

In this example, each device (e.g., device A, B, etc.) translates discrete raw data generated by or output from the programs (e.g., apps AA-AX, apps BA-BX, etc.) running on that respective device into Plasma proteins and deposits those proteins into a Plasma pool. For example, program AX generates data or output and provides the output to device A which, in turn, translates the raw data into proteins (e.g., protein 1A, protein 2A, etc.) and deposits those proteins into the pool. As another example, program BC generates data and provides the data to device B which, in turn, translates the data into proteins (e.g., protein 1B, protein 2B, etc.) and deposits those proteins into the pool.

Each protein contains a descrip list that specifies the data or output registered by the application as well as identifying information for the program itself. Where possible, the protein descrips may also ascribe a general semantic meaning for the output event or action. The protein's data payload (e.g., ingests) carries the full set of useful state information for the program event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that devices may be controlled by one person or may be used simultaneously by several people (e.g., a Plasma-based input framework supports many concurrent users), while the resulting event streams are in turn visible to multiple event consumers.

As an example, device C can extract one or more proteins (e.g., protein 1A, protein 2A, etc.) from the pool. Following protein extraction, device C can use the data of the protein, retrieved or read from the slaw of the descrips and ingests of the protein, in processing events to which the protein data corresponds. As another example, device B can extract one or more proteins (e.g., protein 1C, protein 2A, etc.) from the pool. Following protein extraction, device B can use the data of the protein in processing events to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 26:
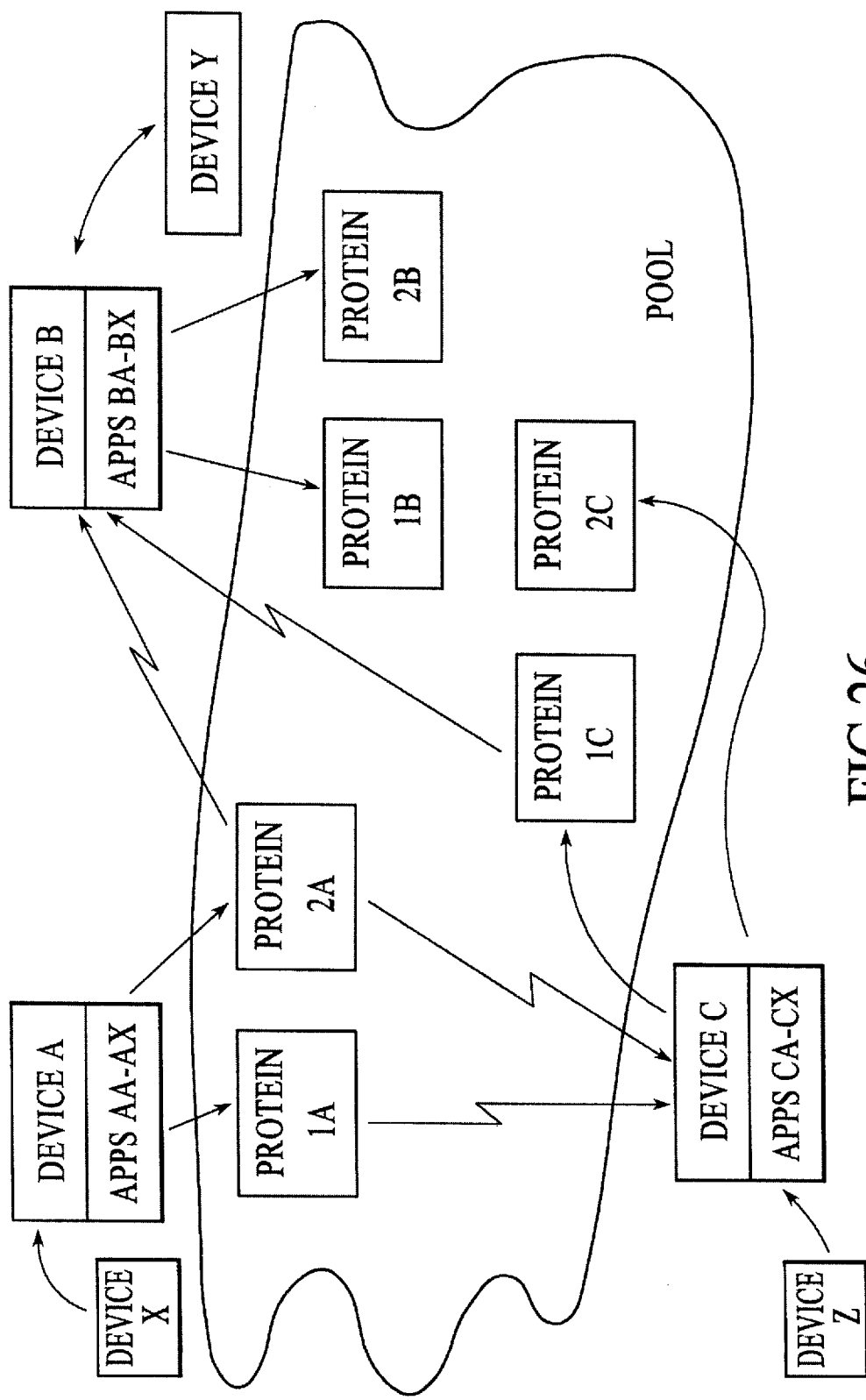
FIG. 26 is a block diagram of a processing environment including multiple devices and numerous programs running on one or more of the devices in which the Plasma constructs (i.e., pools, proteins, and slaw) are used to allow the numerous running programs to share and collectively respond to the events generated by the devices, under an alternative embodiment.

FIG. 26 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an alternative embodiment. This system is but one example of a multi-user, multi-device, multi-computer interactive control scenario or configuration. More particularly, in this example, an interactive system, comprising multiple devices (e.g., devices X and Y coupled to devices A and B, respectively) and a number of programs (e.g., apps AA-AX, apps BA-BX, etc.) running on one or more computers (e.g., device A, device B, etc.) uses the Plasma constructs (e.g., pools, proteins, and slaw) to allow the running programs to share and collectively respond to the events generated by these input devices.

In this example, each device (e.g., devices X and Y coupled to devices A and B, respectively) is managed and/or coupled to run under or in association with one or more programs hosted on the respective device (e.g., device A, device B, etc.) which translates the discrete raw data generated by the device (e.g., device X, device A, device Y, device B, etc.) hardware into Plasma proteins and deposits those proteins into a Plasma pool. For example, device X running in association with application AB hosted on device A generates raw data, translates the discrete raw data into proteins (e.g., protein 1A, protein 2A, etc.) and deposits those proteins into the pool. As another example, device X running in association with application AT hosted on device A generates raw data, translates the discrete raw data into proteins (e.g., protein 1A, protein 2A, etc.) and deposits those proteins into the pool. As yet another example, device Z running in association with application CD hosted on device C generates raw data, translates the discrete raw data into proteins (e.g., protein 1C, protein 2C, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 27:
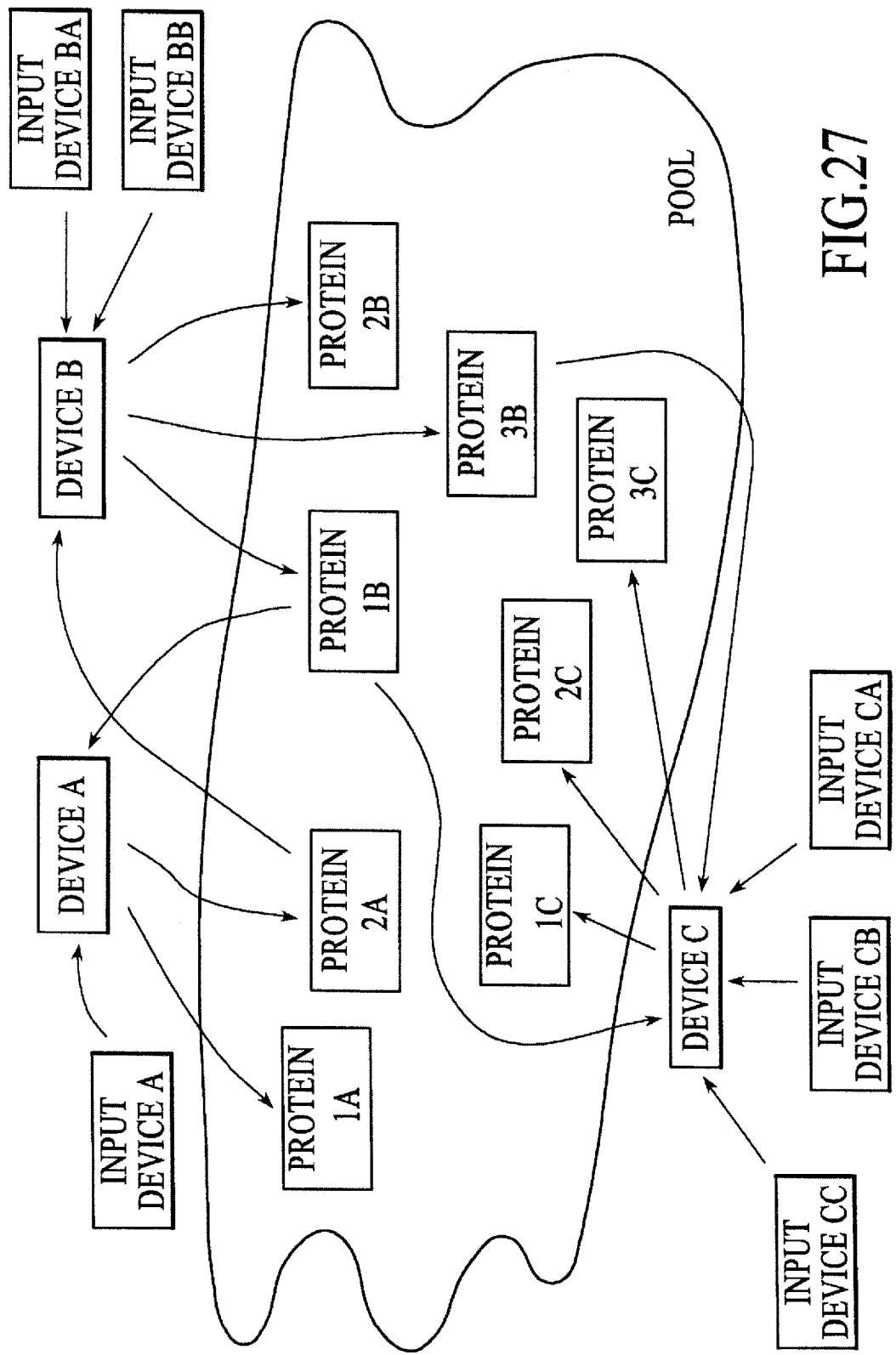
FIG. 27 is a block diagram of a processing environment including multiple input devices coupled among numerous programs running on one or more of the devices in which the Plasma constructs (i.e., pools, proteins, and slaw) are used to allow the numerous running programs to share and collectively respond to the events generated by the input devices, under another alternative embodiment.

FIG. 27 is a block diagram of a processing environment including multiple input devices coupled among numerous programs running on one or more of the devices in which the Plasma constructs (e.g., pools, proteins, and slaw) are used to allow the numerous running programs to share and collectively respond to the events generated by the input devices, under another alternative embodiment. This system is but one example of a multi-user, multi-device, multi-computer interactive control scenario or configuration. More particularly, in this example, an interactive system, comprising multiple input devices (e.g., input devices A, B, BA, and BB, etc.) and a number of programs (not shown) running on one or more computers (e.g., device A, device B, etc.) uses the Plasma constructs (e.g., pools, proteins, and slaw) to allow the running programs to share and collectively respond to the events generated by these input devices.

In this example, each input device (e.g., input devices A, B, BA, and BB, etc.) is managed by a software driver program hosted on the respective device (e.g., device A, device B, etc.) which translates the discrete raw data generated by the input device hardware into Plasma proteins and deposits those proteins into a Plasma pool. For example, input device A generates raw data and provides the raw data to device A which, in turn, translates the discrete raw data into proteins (e.g., protein 1A, protein 2A, etc.) and deposits those proteins into the pool. As another example, input device BB generates raw data and provides the raw data to device B which, in turn, translates the discrete raw data into proteins (e.g., protein 1B, protein 3B, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

To illustrate, here are example proteins for two typical events in such a system. Proteins are represented here as text however, in an actual implementation, the constituent parts of these proteins are typed data bundles (e.g., slaw). The protein describing a g-speak "one finger click" pose (described in the Related Applications) is as follows:

```
[ Descrips: { point, engage, one, one-finger-engage, hand,
    pilot-id-02, hand-id-23 }
  Ingests: { pilot-id => 02,
    hand-id => 23,
    pos => [ 0.0, 0.0, 0.0 ]
    angle-axis => [ 0.0, 0.0, 0.0, 0.707 ]
    gripe => .. ‖:vx
    time => 184437103.29}]
```

As a further example, the protein describing a mouse click is as follows:

```
[ Descrips: { point, click, one, mouse-click, button-one,
    mouse-id-02 }
  Ingests: { mouse-id => 23,
    pos => [ 0.0, 0.0, 0.0 ]
    time => 184437124.80}]
```

Either or both of the sample proteins foregoing might cause a participating program of a host device to run a particular portion of its code. These programs may be interested in the general semantic labels: the most general of all, "point", or the more specific pair, "engage, one". Or they may be looking for events that would plausibly be generated only by a precise device: "one-finger-engage", or even a single aggregate object, "hand-id-23".

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating 'input events' from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

As an example or protein use, device C can extract one or more proteins (e.g., protein 1B, etc.) from the pool. Following protein extraction, device C can use the data of the protein, retrieved or read from the slaw of the descrips and ingests of the protein, in processing input events of input devices CA and CC to which the protein data corresponds. As another example, device A can extract one or more proteins (e.g., protein 1B, etc.) from the pool. Following protein extraction, device A can use the data of the protein in processing input events of input device A to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Examples of input devices that are used in the embodiments of the system described herein include gestural input sensors, keyboards, mice, infrared remote controls such as those used in consumer electronics, and task-oriented tangible media objects, to name a few.

Figure 28:
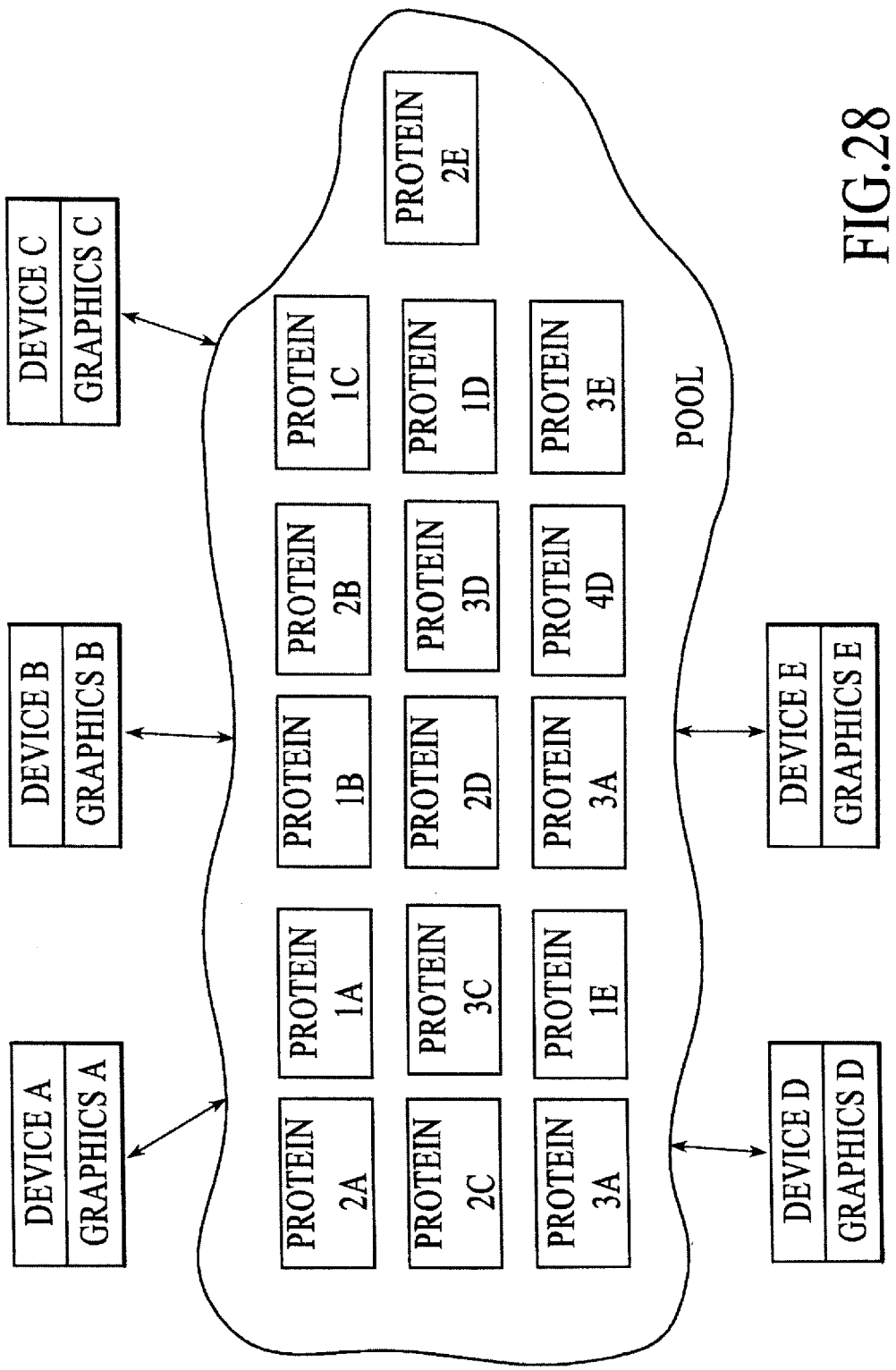
FIG. 28 is a block diagram of a processing environment including multiple devices coupled among numerous programs running on one or more of the devices in which the Plasma constructs (i.e., pools, proteins, and slaw) are used to allow the numerous running programs to share and collectively respond to the graphics events generated by the devices, under yet another alternative embodiment.

FIG. 28 is a block diagram of a processing environment including multiple devices coupled among numerous programs running on one or more of the devices in which the Plasma constructs (e.g., pools, proteins, and slaw) are used to allow the numerous running programs to share and collectively respond to the graphics events generated by the devices, under yet another alternative embodiment. This system is but one example of a system comprising multiple running programs (e.g. graphics A-E) and one or more display devices (not shown), in which the graphical output of some or all of the programs is made available to other programs in a coordinated manner using the Plasma constructs (e.g., pools, proteins, and slaw) to allow the running programs to share and collectively respond to the graphics events generated by the devices.

It is often useful for a computer program to display graphics generated by another program. Several common examples include video conferencing applications, network-based slideshow and demo programs, and window managers. Under this configuration, the pool is used as a Plasma library to implement a generalized framework which encapsulates video, network application sharing, and window management, and allows programmers to add in a number of features not commonly available in current versions of such programs.

Programs (e.g., graphics A-E) running in the Plasma compositing environment participate in a coordination pool through couplings and/or connections to the pool. Each program may deposit proteins in that pool to indicate the availability of graphical sources of various kinds. Programs that are available to display graphics also deposit proteins to indicate their displays' capabilities, security and user profiles, and physical and network locations.

Graphics data also may be transmitted through pools, or display programs may be pointed to network resources of other kinds (RTSP streams, for example). The phrase "graphics data" as used herein refers to a variety of different representations that lie along a broad continuum; examples of graphics data include but are not limited to literal examples (e.g., an 'image', or block of pixels), procedural examples (e.g., a sequence of 'drawing' directives, such as those that flow down a typical openGL pipeline), and descriptive examples (e.g., instructions that combine other graphical constructs by way of geometric transformation, clipping, and compositing operations).

On a local machine graphics data may be delivered through platform-specific display driver optimizations. Even when graphics are not transmitted via pools, often a periodic screen-capture will be stored in the coordination pool so that clients without direct access to the more esoteric sources may still display fall-back graphics.

One advantage of the system described here is that unlike most message passing frameworks and network protocols, pools maintain a significant buffer of data. So programs can rewind backwards into a pool looking at access and usage patterns (in the case of the coordination pool) or extracting previous graphics frames (in the case of graphics pools).

Figure 29:
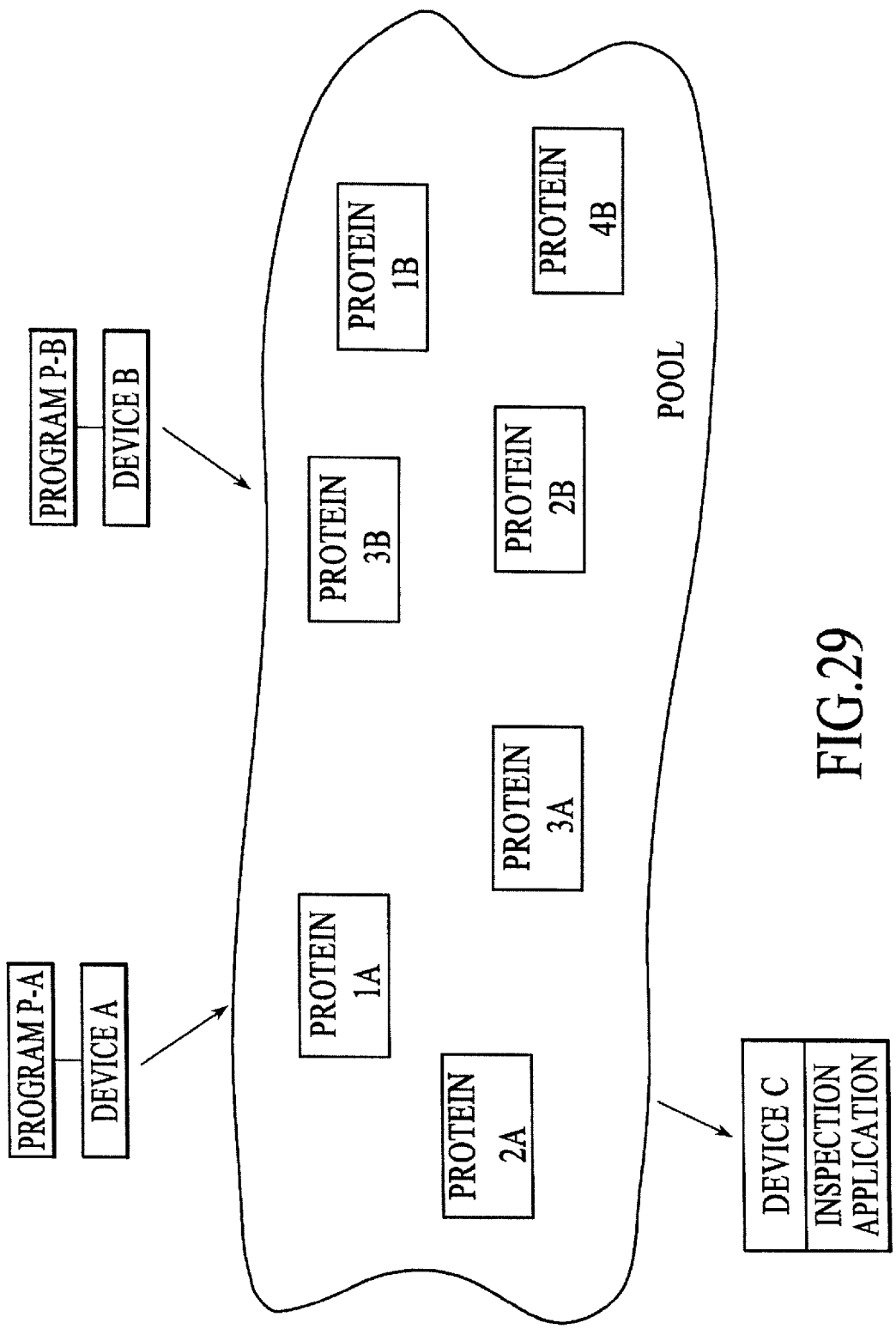
FIG. 29 is a block diagram of a processing environment including multiple devices coupled among numerous programs running on one or more of the devices in which the Plasma constructs (i.e., pools, proteins, and slaw) are used to allow stateful inspection, visualization, and debugging of the running programs, under still another alternative embodiment.

FIG. 29 is a block diagram of a processing environment including multiple devices coupled among numerous programs running on one or more of the devices in which the Plasma constructs (e.g., pools, proteins, and slaw) are used to allow stateful inspection, visualization, and debugging of the running programs, under still another alternative embodiment. This system is but one example of a system comprising multiple running programs (e.g. program P-A, program P-B, etc.) on multiple devices (e.g., device A, device B, etc.) in which some programs access the internal state of other programs using or via pools.

Most interactive computer systems comprise many programs running alongside one another, either on a single machine or on multiple machines and interacting across a network. Multi-program systems can be difficult to configure, analyze and debug because run-time data is hidden inside each process and difficult to access. The generalized framework and Plasma constructs of an embodiment described herein allow running programs to make much of their data available via pools so that other programs may inspect their state. This framework enables debugging tools that are more flexible than conventional debuggers, sophisticated system maintenance tools, and visualization harnesses configured to allow human operators to analyze in detail the sequence of states that a program or programs has passed through.

Referring to FIG. 29, a program (e.g., program P-A, program P-B, etc.) running in this framework generates or creates a process pool upon program start up. This pool is registered in the system almanac, and security and access controls are applied. More particularly, each device (e.g., device A, B, etc.) translates discrete raw data generated by or output from the programs (e.g., program P-A, program P-B, etc.) running on that respective device into Plasma proteins and deposits those proteins into a Plasma pool. For example, program P-A generates data or output and provides the output to device A which, in turn, translates the raw data into proteins (e.g., protein 1A, protein 2A, protein 3A, etc.) and deposits those proteins into the pool. As another example, program P-B generates data and provides the data to device B which, in turn, translates the data into proteins (e.g., proteins 1B-4B, etc.) and deposits those proteins into the pool.

For the duration of the program's lifetime, other programs with sufficient access permissions may attach to the pool and read the proteins that the program deposits; this represents the basic inspection modality, and is a conceptually "one-way" or "read-only" proposition: entities interested in a program P-A inspect the flow of status information deposited by P-A in its process pool. For example, an inspection program or application running under device C can extract one or more proteins (e.g., protein 1A, protein 2A, etc.) from the pool. Following protein extraction, device C can use the data of the protein, retrieved or read from the slaw of the descrips and ingests of the protein, to access, interpret and inspect the internal state of program P-A.

But, recalling that the Plasma system is not only an efficient stateful transmission scheme but also an omnidirectional messaging environment, several additional modes support program-to-program state inspection. An authorized inspection program may itself deposit proteins into program P's process pool to influence or control the characteristics of state information produced and placed in that process pool (which, after all, program P not only writes into but reads from).

Figure 30:
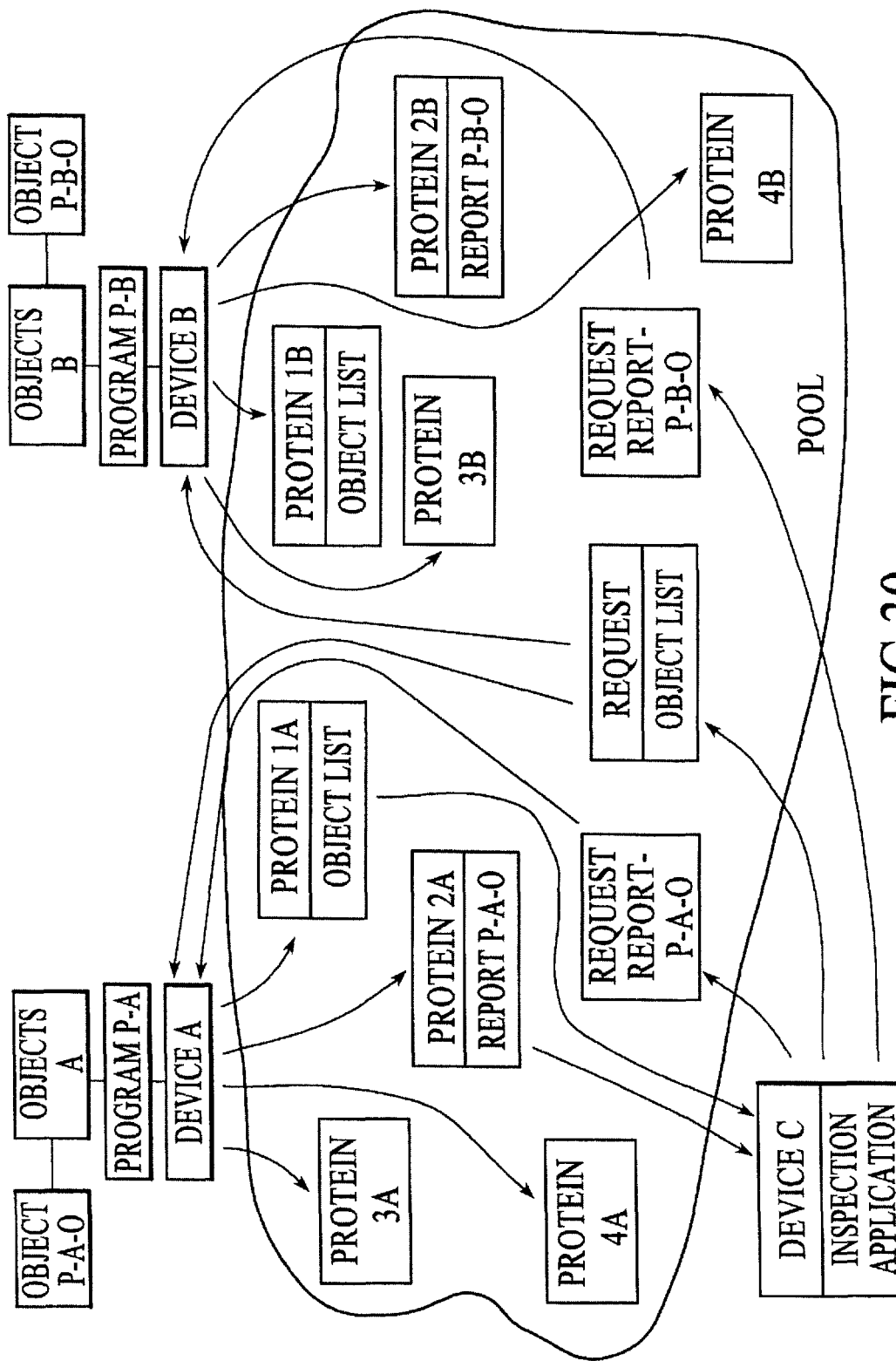
FIG. 30 is a block diagram of a processing environment including multiple devices coupled among numerous programs running on one or more of the devices in which the Plasma constructs (i.e., pools, proteins, and slaw) are used to allow influence or control the characteristics of state information produced and placed in that process pool, under an additional alternative embodiment.

FIG. 30 is a block diagram of a processing environment including multiple devices coupled among numerous programs running on one or more of the devices in which the Plasma constructs (e.g., pools, proteins, and slaw) are used to allow influence or control the characteristics of state information produced and placed in that process pool, under an additional alternative embodiment. In this system example, the inspection program of device C can for example request that programs (e.g., program P-A, program P-B, etc.) dump more state than normal into the pool, either for a single instant or for a particular duration. Or, prefiguring the next 'level' of debug communication, an interested program can request that programs (e.g., program P-A, program P-B, etc.) emit a protein listing the objects extant in its runtime environment that are individually capable of and available for interaction via the debug pool. Thus informed, the interested program can 'address' individuals among the objects in the programs runtime, placing proteins in the process pool that a particular object alone will take up and respond to. The interested program might, for example, request that an object emit a report protein describing the instantaneous values of all its component variables. Even more significantly, the interested program can, via other proteins, direct an object to change its behavior or its variables' values.

More specifically, in this example, inspection application of device C places into the pool a request (in the form of a protein) for an object list (e.g., "Request-Object List") that is then extracted by each device (e.g., device A, device B, etc.) coupled to the pool. In response to the request, each device (e.g., device A, device B, etc.) places into the pool a protein (e.g., protein 1A, protein 1B, etc.) listing the objects extant in its runtime environment that are individually capable of and available for interaction via the debug pool.

Thus informed via the listing from the devices, and in response to the listing of the objects, the inspection application of device C addresses individuals among the objects in the programs runtime, placing proteins in the process pool that a particular object alone will take up and respond to. The inspection application of device C can, for example, place a request protein (e.g., protein "Request Report P-A-O", "Request Report P-B-O") in the pool that an object (e.g., object P-A-O, object P-B-O, respectively) emit a report protein (e.g., protein 2A, protein 2B, etc.) describing the instantaneous values of all its component variables. Each object (e.g., object P-A-O, object P-B-O) extracts its request (e.g., protein "Request Report P-A-O", "Request Report P-B-O", respectively) and, in response, places a protein into the pool that includes the requested report (e.g., protein 2A, protein 2B, respectively). Device C then extracts the various report proteins (e.g., protein 2A, protein 2B, etc.) and takes subsequent processing action as appropriate to the contents of the reports.

In this way, use of Plasma as an interchange medium tends ultimately to erode the distinction between debugging, process control, and program-to-program communication and coordination.

To that last, the generalized Plasma framework allows visualization and analysis programs to be designed in a loosely-coupled fashion. A visualization tool that displays memory access patterns, for example, might be used in conjunction with any program that outputs its basic memory reads and writes to a pool. The programs undergoing analysis need not know of the existence or design of the visualization tool, and vice versa.

The use of pools in the manners described above does not unduly affect system performance. For example, embodiments have allowed for depositing of several hundred thousand proteins per second in a pool, so that enabling even relatively verbose data output does not noticeably inhibit the responsiveness or interactive character of most programs.

Embodiments described herein include a method comprising collating input data from a plurality of sources. The input data is semantically uncorrelated three-space data of an instantaneous spatial and geometric state of an object in a frame of reference of the object. The method of an embodiment comprises conforming the input data into a stream of spatiotemporal data. The spatiotemporal data of the stream is uniformly represented. The method of an embodiment comprises generating gestural events from the spatiotemporal data using a plurality of gesture descriptions. The method of an embodiment comprises representing the gestural events in a protoevent comprising a data format that is application-neutral and fully articulated. The method of an embodiment comprises distributing the gestural events and providing access to the gestural events via corresponding protoevents by at least one event consumer in a spatial-semantic frame of reference of the at least one event consumer.

Embodiments described herein include a method comprising: collating input data from a plurality of sources, wherein the input data is semantically uncorrelated three-space data of an instantaneous spatial and geometric state of an object in a frame of reference of the object; conforming the input data into a stream of spatiotemporal data, wherein the spatiotemporal data of the stream is uniformly represented; generating gestural events from the spatiotemporal data using a plurality of gesture descriptions; representing the gestural events in a protoevent comprising a data format that is application-neutral and fully articulated; and distributing the gestural events and providing access to the gestural events via corresponding protoevents by at least one event consumer in a spatial-semantic frame of reference of the at least one event consumer.

The input data of an embodiment comprises unconstrained freespace gestural data of the object.

The input data of an embodiment comprises proximal gestural data of the object when the object is at least one of within a proximate range relative to a surface and within a defined volume.

The input data of an embodiment comprises hover gestural data of the object when the object is within a plane adjacent to a surface.

The input data of an embodiment comprises surface-contact gestural data of the object when the object is in contact with a surface.

The input data of an embodiment comprises a plurality of data streams.

The method of an embodiment comprises temporally aligning the plurality of data streams.

The method of an embodiment comprises spatially seaming events from the plurality of data streams and generating a single synthetic event.

The method of an embodiment comprises performing semantic aggregation including collecting relevant events resulting from preceding operations.

The method of an embodiment comprises performing metainformation tagging.

The method of an embodiment comprises receiving the input data from at least one of an optical motion-tracking system, a time-of-flight tracking system, an electric field sensing system, and a touch screen device.

The method of an embodiment comprises receiving the input data from an optical motion-tracking system.

The method of an embodiment comprises receiving the input data from a time-of-flight tracking system.

The method of an embodiment comprises receiving the input data from a touch screen device.

The method of an embodiment comprises receiving the input data from an electric field sensing system.

The method of an embodiment comprises receiving the input data from a capacitive sensing system.

The method of an embodiment comprises receiving the spatiotemporal data comprising three-space position of the object.

The method of an embodiment comprises receiving the spatiotemporal data comprising three-space orientation of the object.

The method of an embodiment comprises receiving the spatiotemporal data comprising motion of the object.

The method of an embodiment comprises receiving the spatiotemporal data comprising bulk three-space position of at least one of a plurality of elements comprising the object and a plurality of elements coupled to the object.

The method of an embodiment comprises receiving the spatiotemporal data comprising bulk three-space orientation of at least one of a plurality of elements comprising the object and a plurality of elements coupled to the object.

The method of an embodiment comprises receiving the spatiotemporal data comprising bulk motion of at least one of a plurality of elements comprising the object and a plurality of elements coupled to the object.

The method of an embodiment comprises receiving the spatiotemporal data comprising a semantic digest of a pose of a plurality of elements comprising the object.

The method of an embodiment comprises comparing the spatiotemporal data to the gesture descriptions.

The method of an embodiment comprises generating the protoevent in response to a match between spatiotemporal data and a gesture description, wherein the protoevent includes a data format comprising a digest of matched spatiotemporal data, interpreted in a semantic context of matched gestural descriptions.

The method of an embodiment comprises providing a plurality of recognizers, wherein each recognizer comprises a gesture description.

The method of an embodiment comprises performing a plurality of operations on the plurality of recognizers, wherein the plurality of operations comprise ranking recognizers.

The method of an embodiment comprises performing a plurality of operations on the plurality of recognizers, wherein the plurality of operations comprise adding recognizers.

The method of an embodiment comprises performing a plurality of operations on the plurality of recognizers, wherein the plurality of operations comprise removing recognizers.

The method of an embodiment comprises performing a plurality of operations on the plurality of recognizers, wherein the plurality of operations comprise modifying recognizers.

The method of an embodiment comprises performing a plurality of operations on the plurality of recognizers, wherein the plurality of operations comprise reconfiguring recognizers.

A recognizer of an embodiment remains dormant prior to a match between spatiotemporal data and activation criteria of the recognizer.

A recognizer of an embodiment becomes active when geometric and spatiotemporal aspects of the spatiotemporal data match the activation criteria.

The recognizer of an embodiment remains active as long as the spatiotemporal data satisfy maintenance criteria of the recognizer.

The recognizer of an embodiment becomes inactive when the spatiotemporal data fail to satisfy the maintenance criteria.

The method of an embodiment comprises depositing the protoevents in at least one repository for access by the at least one event consumer.

The method of an embodiment comprises providing a list of the at least one event consumer.

The method of an embodiment comprises asynchronously transmitting each protoevent generated to each of the at least one event consumers.

The method of an embodiment comprises synchronously transmitting each protoevent generated to each of the at least one event consumers.

The method of an embodiment comprises transforming the gestural events among a plurality of spatial-semantic frames of reference corresponding to a plurality of event consumers.

The method of an embodiment comprises re-rendering the gestural events in a spatial-semantic frame of reference of the at least one event consumer.

The method of an embodiment comprises generating the protoevent by generating at least one data sequence comprising gestural event data specifying the gestural event and state information of the gestural event, and forming a data capsule to include the at least one data sequence, the data capsule having a data structure comprising an application-independent representation of the at least one data sequence.

The generating of the at least one data sequence comprises generating a first respective data set that includes first respective gestural event data. The generating of the at least one data sequence comprises generating a second respective data set that includes second respective state information. The generating of the at least one data sequence comprises forming a first data sequence to include the first respective data set and the second respective data set.

The generating of the at least one data sequence comprises generating a first respective data set that includes first respective gestural event data. The generating of the at least one data sequence comprises generating a second respective data set that includes second respective state information. The generating of the at least one data sequence comprises forming a second data sequence to include the first respective data set and the second respective data set.

The generating of the first respective data set of an embodiment includes generating a first respective data set offset, wherein the first respective data set offset points to the first respective data set of the second data sequence.

The generating of the second respective data set of an embodiment includes generating a second respective data set offset, wherein the second respective data set offset points to the second respective data set of the second data sequence.

The first respective data set of an embodiment is a description list, the description list including a description of the data.

The method of an embodiment comprises generating at least one offset. The method of an embodiment comprises forming the data capsule to include the at least one offset.

The method of an embodiment comprises generating a first offset having a first variable length. The first offset points to the gestural event data of a first data sequence of the at least one data sequence.

The method of an embodiment comprises generating a second offset having a second variable length. The second offset points to the state information of a first data sequence of the at least one data sequence.

The method of an embodiment comprises forming a first code path through the data capsule using a first offset of the at least one offset. The method of an embodiment comprises forming a second code path through the data capsule using a second offset of the at least one offset. The first code path and the second code path are different paths.

At least one of the first offset and the second offset of an embodiment include metadata, the metadata comprising context-specific metadata.

The at least one event consumer of an embodiment is at least one interactive system of a plurality of interactive systems, wherein the plurality of interactive systems comprise a plurality of frames of reference.

The at least one event consumer of an embodiment consumes the protoevents using an application type specific to the at least one event consumer.

The at least one event consumer of an embodiment comprises a first interactive system having a first frame of reference and a second interactive system having a second frame of reference.

The first interactive system of an embodiment consumes the protoevents using a first application type and the second interactive system consumes the protoevents using a second application type.

The object of an embodiment is a human hand.

The object of an embodiment is at least one finger of a human hand.

The object of an embodiment includes at least one human hand and at least one finger of a human hand.

Embodiments described herein include a method comprising collating input data from a plurality of sources. The input data is semantically uncorrelated three-space data corresponding to an object. The plurality of sources comprises disparate sources. The method of an embodiment comprises rendering a plurality of spatial events of the object from the input data. The plurality of spatial events comprises a conformed-coordinate representation relative to a global room space. The method of an embodiment comprises generating aggregates of the spatial events from the spatial events. The aggregates are logical aggregates including literal geometric and semantic characteristics of the object. The method of an embodiment comprises detecting and disambiguating gestures from the aggregates of the spatial events. The method of an embodiment comprises generating data bundles representing the gestures. The data bundles are neutrally descriptive. The method of an embodiment comprises distributing the data bundles for consumption by a plurality of disparate applications.

Embodiments described herein include a method comprising: collating input data from a plurality of sources, wherein the input data is semantically uncorrelated three-space data corresponding to an object, wherein the plurality of sources comprise disparate sources; rendering a plurality of spatial events of the object from the input data, wherein the plurality of spatial events comprise a conformed-coordinate representation relative to a global room space; generating aggregates of the spatial events from the spatial events, wherein the aggregates are logical aggregates including literal geometric and semantic characteristics of the object; detecting and disambiguating gestures from the aggregates of the spatial events; generating data bundles representing the gestures, wherein the data bundles are neutrally descriptive; and distributing the data bundles for consumption by a plurality of disparate applications.

Embodiments described herein include a system comprising a data funnel coupled to a processor. The data funnel collates input data from a plurality of sources. The input data is semantically uncorrelated three-space data of an instantaneous spatial and geometric state of an object in a frame of reference of the object. The plurality of sources comprises disparate sources. The data funnel conforms the input data into a stream of spatiotemporal data. The spatiotemporal data of the stream is uniformly represented. The system of an embodiment comprises a gesture engine coupled to the data funnel. The gesture engine generates gestural events from the spatiotemporal data using a plurality of gesture descriptions. The gesture engine represents the gestural events in a protoevent comprising a data format that is application-neutral and fully articulated. The system of an embodiment comprises a distributor coupled to the gesture engine. The distributor provides access to the gestural events by at least one event consumer via corresponding protoevents in a spatial-semantic frame of reference of the at least one event consumer.

Embodiments described herein include a system comprising: a data funnel coupled to a processor, wherein the data funnel collates input data from a plurality of sources, wherein the input data is semantically uncorrelated three-space data of an instantaneous spatial and geometric state of an object in a frame of reference of the object, wherein the plurality of sources comprise disparate sources, wherein the data funnel conforms the input data into a stream of spatiotemporal data, wherein the spatiotemporal data of the stream is uniformly represented; a gesture engine coupled to the data funnel, wherein the gesture engine generates gestural events from the spatiotemporal data using a plurality of gesture descriptions, wherein the gesture engine represents the gestural events in a protoevent comprising a data format that is application-neutral and fully articulated; and a distributor coupled to the gesture engine, wherein the distributor provides access to the gestural events by at least one event consumer via corresponding protoevents in a spatial-semantic frame of reference of the at least one event consumer.

The input data of an embodiment comprises unconstrained freespace gestural data of the object.

The input data of an embodiment comprises proximal gestural data of the object when the object is at least one of within a proximate range relative to a surface and within a defined volume.

The input data of an embodiment comprises hover gestural data of the object when the object is within a space immediately adjacent to a surface.

The input data of an embodiment comprises surface-contact gestural data of the object when the object is in contact with a surface.

The input data of an embodiment comprises a plurality of data streams.

The data funnel of an embodiment temporally aligns the plurality of data streams.

The data funnel of an embodiment spatially seams events from the plurality of data streams and generates a single synthetic event.

The data funnel of an embodiment performs semantic aggregation including collecting relevant events resulting from preceding operations of the data funnel.

The data funnel of an embodiment performs metainformation tagging.

The input data of an embodiment is received from at least one of an optical motion-tracking system, a time-of-flight tracking system, an electric field sensing system, and a touch screen device.

The input data of an embodiment is received from an optical motion-tracking system.

The input data of an embodiment is received from a time-of-flight tracking system.

The input data of an embodiment is received from a touch screen device.

The input data of an embodiment is received from an electric field sensing system.

The input data of an embodiment is received from a capacitive sensing system.

The gesture engine of an embodiment receives the spatiotemporal data comprising three-space position of the object.

The gesture engine of an embodiment receives the spatiotemporal data comprising three-space orientation of the object.

The gesture engine of an embodiment receives the spatiotemporal data comprising motion of the object.

The gesture engine of an embodiment receives the spatiotemporal data comprising bulk three-space position of at least one of a plurality of elements comprising the object and a plurality of elements coupled to the object.

The gesture engine of an embodiment receives the spatiotemporal data comprising bulk three-space orientation of at least one of a plurality of elements comprising the object and a plurality of elements coupled to the object.

The gesture engine of an embodiment receives the spatiotemporal data comprising bulk motion of at least one of a plurality of elements comprising the object and a plurality of elements coupled to the object.

The gesture engine of an embodiment receives the spatiotemporal data comprising a semantic digest of a pose of a plurality of elements comprising the object.

The gesture engine of an embodiment compares the spatiotemporal data to the gesture descriptions.

The gesture engine of an embodiment generates the protoevent in response to a match between spatiotemporal data and a gesture description, wherein the protoevent includes a data format comprising a digest of matched spatiotemporal data, interpreted in a semantic context of matched gestural descriptions.

The gesture engine of an embodiment comprises a plurality of recognizers, wherein each recognizer comprises a gesture description.

The gesture engine of an embodiment performs a plurality of operations on the plurality of recognizers, wherein the plurality of operations comprise ranking recognizers.

The gesture engine of an embodiment performs a plurality of operations on the plurality of recognizers, wherein the plurality of operations comprise adding recognizers.

The gesture engine of an embodiment performs a plurality of operations on the plurality of recognizers, wherein the plurality of operations comprise removing recognizers.

The gesture engine of an embodiment performs a plurality of operations on the plurality of recognizers, wherein the plurality of operations comprise modifying recognizers.

The gesture engine of an embodiment performs a plurality of operations on the plurality of recognizers, wherein the plurality of operations comprise reconfiguring recognizers.

The recognizer of an embodiment remains dormant prior to a match between spatiotemporal data and activation criteria of the recognizer.

The recognizer of an embodiment becomes active when geometric and spatiotemporal aspects of the spatiotemporal data match the activation criteria.

The recognizer of an embodiment remains active as long as the spatiotemporal data satisfy maintenance criteria of the recognizer.

The recognizer of an embodiment becomes inactive when the spatiotemporal data fail to satisfy the maintenance criteria.

The distributor of an embodiment deposits the protoevents in at least one repository for access by the at least one event consumer.

The distributor of an embodiment comprises a list of the at least one event consumer.

The distributor of an embodiment asynchronously transmits each protoevent generated by the gesture engine to each of the at least one event consumers.

The distributor of an embodiment synchronously transmits each protoevent generated by the gesture engine to each of the at least one event consumers.

The system of an embodiment comprises a transformer coupled to a remote client device of the at least one consumer, wherein the transformer re-renders the gestural events in a spatial-semantic frame of reference of the at least one event consumer.

The distributor of an embodiment includes the transformer.

The gesture engine of an embodiment generates the protoevent by generating at least one data sequence comprising gestural event data specifying the gestural event and state information of the gestural event, and forming a data capsule to include the at least one data sequence, the data capsule having a data structure comprising an application-independent representation of the at least one data sequence.

The generating of the at least one data sequence of an embodiment comprises generating a first respective data set that includes first respective gestural event data. The generating of the at least one data sequence of an embodiment comprises generating a second respective data set that includes second respective state information. The generating of the at least one data sequence of an embodiment comprises forming a first data sequence to include the first respective data set and the second respective data set.

The generating of the at least one data sequence of an embodiment comprises generating a first respective data set that includes first respective gestural event data. The generating of the at least one data sequence of an embodiment comprises generating a second respective data set that includes second respective state information. The generating of the at least one data sequence of an embodiment comprises forming a second data sequence to include the first respective data set and the second respective data set.

The generating of the first respective data set of an embodiment includes generating a first respective data set offset, wherein the first respective data set offset points to the first respective data set of the second data sequence.

The generating of the second respective data set of an embodiment includes generating a second respective data set offset, wherein the second respective data set offset points to the second respective data set of the second data sequence.

The first respective data set of an embodiment is a description list, the description list including a description of the data.

The system of an embodiment comprises generating at least one offset. The system of an embodiment comprises forming the data capsule to include the at least one offset.

The system of an embodiment comprises generating a first offset having a first variable length. The first offset points to the gestural event data of a first data sequence of the at least one data sequence.

The system of an embodiment comprises generating a second offset having a second variable length. The second offset points to the state information of a first data sequence of the at least one data sequence.

The system of an embodiment comprises forming a first code path through the data capsule using a first offset of the at least one offset. The system of an embodiment comprises forming a second code path through the data capsule using a second offset of the at least one offset. The first code path and the second code path are different paths.

At least one of the first offset and the second offset of an embodiment include metadata, the metadata comprising context-specific metadata.

At least one event consumer of an embodiment is at least one interactive system of a plurality of interactive systems, wherein the plurality of interactive systems comprises a plurality of frames of reference.

At least one event consumer of an embodiment consumes the protoevents using an application type specific to the at least one event consumer.

At least one event consumer of an embodiment comprises a first interactive system having a first frame of reference and a second interactive system having a second frame of reference.

The first interactive system of an embodiment consumes the protoevents using a first application type and the second interactive system consumes the protoevents using a second application type.

The object of an embodiment is a human hand.

The object of an embodiment is at least one finger of a human hand.

The object of an embodiment includes at least one human hand and at least one finger of a human hand.

Embodiments described herein include a system comprising a data funnel coupled to a processor. The data funnel collates input data from a plurality of sources and conforms the input data into a spatiotemporal data stream. The input data is absolute three-space location data of an instantaneous state of a body at a point in time and space. The system of an embodiment comprises a gesture engine coupled to the data funnel. The gesture engine generates gestural events from the spatiotemporal data stream using a plurality of gesture descriptions. The gesture engine represents each gestural event in a protoevent comprising a data format that is application-neutral. The system of an embodiment comprises a distributor coupled to the gesture engine. The distributor provides access to the gestural events through access by a plurality of event consumers to a plurality of protoevents. The access to the gestural events is in a spatial-semantic frame of reference of the plurality of event consumers.

Embodiments described herein include a system comprising: a data funnel coupled to a processor, wherein the data funnel collates input data from a plurality of sources and conforms the input data into a spatiotemporal data stream, wherein the input data is absolute three-space location data of an instantaneous state of a body at a point in time and space; a gesture engine coupled to the data funnel, wherein the gesture engine generates gestural events from the spatiotemporal data stream using a plurality of gesture descriptions, wherein the gesture engine represents each gestural event in a protoevent comprising a data format that is application-neutral; and a distributor coupled to the gesture engine, wherein the distributor provides access to the gestural events through access by a plurality of event consumers to a plurality of protoevents, wherein the access to the gestural events is in a spatial-semantic frame of reference of the plurality of event consumers.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the processing environment is not intended to be exhaustive or to limit the systems and methods described to the precise form disclosed. While specific embodiments of, and examples for, the processing environment are described herein for illustrative purposes, various equivalent modifications are possible within the scope of other systems and methods, as those skilled in the relevant art will recognize. The teachings of the processing environment provided herein can be applied to other processing systems and methods, not only for the systems and methods described above.

The elements and acts of the various embodiments described above can be combined to provide further embodiments. These and other changes can be made to the processing environment in light of the above detailed description.

In general, in the following claims, the terms used should not be construed to limit the embodiments to the specific embodiments disclosed in the specification and the claims, but should be construed to include all systems that operate under the claims. Accordingly, the embodiments are not limited by the disclosure herein, but instead the scope of the embodiments is to be determined entirely by the claims.

While certain aspects of the embodiments are presented below in certain claim forms, the inventors contemplate the various aspects of the embodiments in any number of claim forms. Accordingly, the inventors reserve the right to add additional claims after filing the application to pursue such additional claim forms for other aspects of the embodiments.

What is claimed is:

1. A method comprising:
   collating input data from a plurality of sources, wherein the input data includes data of a state of an object in a frame of reference of the object;
   conforming the input data into a stream of spatiotemporal data;
   generating data events from the spatiotemporal data using a plurality of event descriptions;
   representing the data events in a data format that is application-neutral; and
   distributing the data events and providing access to the data events by at least one event consumer in a spatial-semantic frame of reference of the at least one event consumer.

2. The method of claim 1, wherein the input data comprises data generated by the object.

3. The method of claim 1, wherein the input data comprises proximal gestural data of the object when the object is at least one of within a proximate range relative to a surface and within a defined volume.

4. The method of claim 1, wherein the input data comprises hover gestural data of the object when the object is within a plane adjacent to a surface.

5. The method of claim 1, wherein the input data comprises surface-contact gestural data of the object when the object is in contact with a surface.

6. The method of claim 1, wherein the input data comprises a plurality of data streams.

7. The method of claim 6, comprising temporally aligning the plurality of data streams.

8. The method of claim 6, comprising spatially seaming the data events from the plurality of data streams and generating a single synthetic event.

9. The method of claim 6, comprising performing semantic aggregation including collecting relevant data events resulting from preceding operations.

10. The method of claim 6, comprising performing metainformation tagging.

11. The method of claim 6, comprising receiving the input data from at least one of an input/output device, a touchscreen device, a sensor, a detector, an imager, and a tracking system.

12. The method of claim 1, wherein the plurality of sources include an input/output device.

13. The method of claim 1, wherein the plurality of sources include a touchscreen device.

14. The method of claim 1, wherein the plurality of sources include a sensor.

15. The method of claim 1, wherein the plurality of sources include a detector.

16. The method of claim 1, wherein the plurality of sources include an imager.

17. The method of claim 1, wherein the plurality of sources include a tracking system.

18. The method of claim 1, comprising receiving the spatiotemporal data comprising position of the object.

19. The method of claim 1, comprising receiving the spatiotemporal data comprising orientation of the object.

20. The method of claim 1, comprising receiving the spatiotemporal data comprising motion of the object.

21. The method of claim 1, comprising receiving the spatiotemporal data comprising position of at least one of a plurality of elements comprising the object and a plurality of elements coupled to the object.

22. The method of claim 1, comprising receiving the spatiotemporal data comprising orientation of at least one of a plurality of elements comprising the object and a plurality of elements coupled to the object.

23. The method of claim 1, comprising receiving the spatiotemporal data comprising motion of at least one of a plurality of elements comprising the object and a plurality of elements coupled to the object.

24. The method of claim 1, comprising receiving the spatiotemporal data comprising data events of at least one of a plurality of elements comprising the object and a plurality of elements coupled to the object.

25. The method of claim 1, comprising comparing the spatiotemporal data to the plurality of event descriptions.

26. The method of claim 25, comprising representing the data events in a capsule generated in response to a match between spatiotemporal data and an event description, wherein the capsule includes a data format comprising a digest of matched spatiotemporal data, interpreted in a semantic context of matched event descriptions.

27. The method of claim 1, comprising executing a plurality of recognizers, wherein each recognizer comprises an event description.

28. The method of claim 27, comprising performing a plurality of operations on the plurality of recognizers, wherein the plurality of operations comprise ranking recognizers.

29. The method of claim 27, comprising performing a plurality of operations on the plurality of recognizers, wherein the plurality of operations comprise adding recognizers.

30. The method of claim 27, comprising performing a plurality of operations on the plurality of recognizers, wherein the plurality of operations comprise removing recognizers.

31. The method of claim 27, comprising performing a plurality of operations on the plurality of recognizers, wherein the plurality of operations comprise modifying recognizers.

32. The method of claim 27, comprising performing a plurality of operations on the plurality of recognizers, wherein the plurality of operations comprise reconfiguring recognizers.

33. The method of claim 27, wherein a recognizer remains dormant prior to a match between spatiotemporal data and activation criteria of the recognizer.

34. The method of claim 33, wherein a recognizer becomes active when parameters of the spatiotemporal data match the activation criteria.

35. The method of claim 34, wherein the recognizer remains active as long as the spatiotemporal data satisfy maintenance criteria of the recognizer.

36. The method of claim 34, wherein the recognizer becomes inactive when the spatiotemporal data fail to satisfy the maintenance criteria.

37. The method of claim 1, comprising representing the data events in capsules and depositing the capsules in at least one repository for access by the at least one event consumer.

38. The method of claim 37, comprising providing a list of the at least one event consumer.

39. The method of claim 38, comprising asynchronously transmitting each capsule generated to each of the at least one event consumers.

40. The method of claim 38, comprising synchronously transmitting each capsule generated to each of the at least one event consumers.

41. The method of claim 1, comprising transforming the data events among a plurality of spatial-semantic frames of reference corresponding to a plurality of event consumers.

42. The method of claim 1, comprising re-rendering the data events in a spatial-semantic frame of reference of the at least one event consumer.

43. The method of claim 1, comprising representing the data events in a capsule and generating the capsule by generating at least one data sequence comprising data representing the data event and state information of the data event, and forming the capsule to include the at least one data sequence, the capsule having a data structure comprising an application-independent representation of the at least one data sequence.

44. The method of claim 43, wherein the generating of the at least one data sequence comprises:
generating a first respective data set that includes first respective data representing the data event;
generating a second respective data set that includes second respective state information; and
forming a first data sequence to include the first respective data set and the second respective data set.

45. The method of claim 44, wherein the generating of the at least one data sequence comprises:
generating a first respective data set that includes first respective data representing the data event;
generating a second respective data set that includes second respective state information; and
forming a second data sequence to include the first respective data set and the second respective data set.

46. The method of claim 45, wherein the generating of the first respective data set includes generating a first respective data set offset, wherein the first respective data set offset points to the first respective data set of the second data sequence.

47. The method of claim 45, wherein the generating of the second respective data set includes generating a second respective data set offset, wherein the second respective data set offset points to the second respective data set of the second data sequence.

48. The method of claim 44, wherein the first respective data set is a description list, the description list including a description of the data.

49. The method of claim 43, comprising:
generating at least one offset; and
forming the capsule to include the at least one offset.

50. The method of claim 49, comprising:
generating a first offset having a first variable length;
wherein the first offset points to the data representing the data event of a first data sequence of the at least one data sequence.

51. The method of claim 49, comprising:
generating a second offset having a second variable length;
wherein the second offset points to the state information of a first data sequence of the at least one data sequence.

52. The method of claim 49, comprising:
forming a first code path through the capsule using a first offset of the at least one offset;
forming a second code path through the capsule using a second offset of the at least one offset;
wherein the first code path and the second code path are different paths.

53. The method of claim 49, wherein at least one of the first offset and the second offset include metadata, the metadata comprising context-specific metadata.

54. The method of claim 1, representing the data events in a capsule comprising the data format and distributing the data events and providing access to the data events via corresponding capsules, wherein the at least one event consumer is at least one interactive system of a plurality of interactive systems, wherein the plurality of interactive systems comprise a plurality of frames of reference.

55. The method of claim 54, wherein the at least one event consumer consumes the capsules using an application type specific to the at least one event consumer.

56. The method of claim 55, wherein the at least one event consumer comprises a first interactive system having a first frame of reference and a second interactive system having a second frame of reference.

57. The method of claim 56, wherein the first interactive system consumes the capsules using a first application type and the second interactive system consumes the capsules using a second application type.

\* \* \* \* \*